United States Patent
Shimizu et al.

(12) 
(10) Patent No.: US 6,393,164 B2
(45) Date of Patent: *May 21, 2002

(54) IMAGE PROCESSING APPARATUS

(76) Inventors: Katsuichi Shimizu; Tadashi Yoshida; Shinobu Arimoto; Katsuyoshi Maeshima; Nao Nagashima; Asao Watanabe, all of c/o Canon Kabushiki Kaisha, 30-2, 3-chome, Shimomaruko, Ohta-ku, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 85 days.

(21) Appl. No.: 09/098,325

(22) Filed: Jun. 17, 1998

Related U.S. Application Data

(62) Division of application No. 09/000,817, filed on Dec. 30, 1997, which is a division of application No. 08/425,350, filed on Apr. 19, 1995, which is a continuation of application No. 08/126,005, filed on Sep. 24, 1993, now abandoned, which is a continuation of application No. 07/745,405, filed on Aug. 15, 1991, now abandoned, which is a division of application No. 07/320,792, filed on Mar. 7, 1989, now Pat. No. 5,109,434, which is a continuation of application No. 07/041,634, filed on Apr. 23, 1987, now abandoned, which is a continuation of application No. 06/537,020, filed on Sep. 29, 1983, now abandoned.

(30) Foreign Application Priority Data

Oct. 5, 1982 (JP) .................................... 57-173861

(51) Int. Cl.[7] ................................................ G06K 9/00
(52) U.S. Cl. .................... 382/325; 358/436; 358/442
(58) Field of Search .................... 382/282, 283, 382/284, 176, 180, 295, 325; 358/426, 442, 443, 448, 468, 409, 470, 484, 1.2; 455/49, 103

(56) References Cited

U.S. PATENT DOCUMENTS

| | | | |
|---|---|---|---|
| 3,496,543 A | 2/1970 | Greenly | 382/9 |
| 3,582,884 A | 6/1971 | Shepard | 382/56 |
| 3,976,982 A | 8/1976 | Eiselen | 382/284 |
| 3,995,106 A | 11/1976 | Wern et al. | 382/56 |
| 4,215,374 A | 7/1980 | Mizuno | 355/260 |
| 4,447,824 A | 5/1984 | Schayes et al. | 355/260 |
| 4,447,829 A | 5/1984 | Schayes et al. | 355/260 |

(List continued on next page.)

FOREIGN PATENT DOCUMENTS

| | | |
|---|---|---|
| DE | 3137903 A1 | 6/1982 |
| DE | 3141450 A1 | 6/1982 |
| JP | 52-114331 | 9/1977 |
| JP | 56-60161 | 5/1981 |
| JP | 56-164672 | 12/1981 |
| JP | 5745777 | 3/1982 |
| JP | 57-160847 | 10/1982 |
| JP | 57-173861 | 4/1984 |
| JP | 2575570 | 10/1996 |

OTHER PUBLICATIONS

"Textfax, funktionelle Integration im Buro der Zukunft" in: Siemens Forsch–und Entwickl. Ber. vol. 8 (1979) No. 1, Springer Verlag 1979 pp. 41–44.

*Primary Examiner*—Joseph Mancuso

(57) ABSTRACT

There is disclosed an image recording apparatus having reader for photoelectrically reading an original and generating image information, a first transmitter for transmitting the image information from said reader, after compressing treatment, to an outside apparatus, a second transmitter for transmitting the image information from said reader without compressing treatment to an outside apparatus, and selecter for selecting either said first or second transmitters according to the destination of said image information.

8 Claims, 37 Drawing Sheets

U.S. PATENT DOCUMENTS

| | | | |
|---|---|---|---|
| 4,520,400 A | 5/1985 | Koumura et al. | 358/256 |
| 4,531,184 A | 7/1985 | Mosier et al. | 382/56 |
| 4,545,068 A | 10/1985 | Tabata et al. | 382/44 |
| 4,547,810 A | 10/1985 | Rutherford et al. | 358/256 |
| 4,553,261 A | 11/1985 | Froessel | 382/57 |
| 4,566,127 A | 1/1986 | Sekiya et al. | 382/57 |
| 4,616,269 A | 10/1986 | Nori | 380/282 |
| 4,760,608 A | 7/1988 | Suzuki | 282/61 |
| 5,008,760 A | 4/1991 | Shimizu et al. | 282/9 |
| 5,058,189 A | 10/1991 | Kanno | 382/282 |
| 5,150,434 A | 9/1992 | Hori et al. | 382/282 |

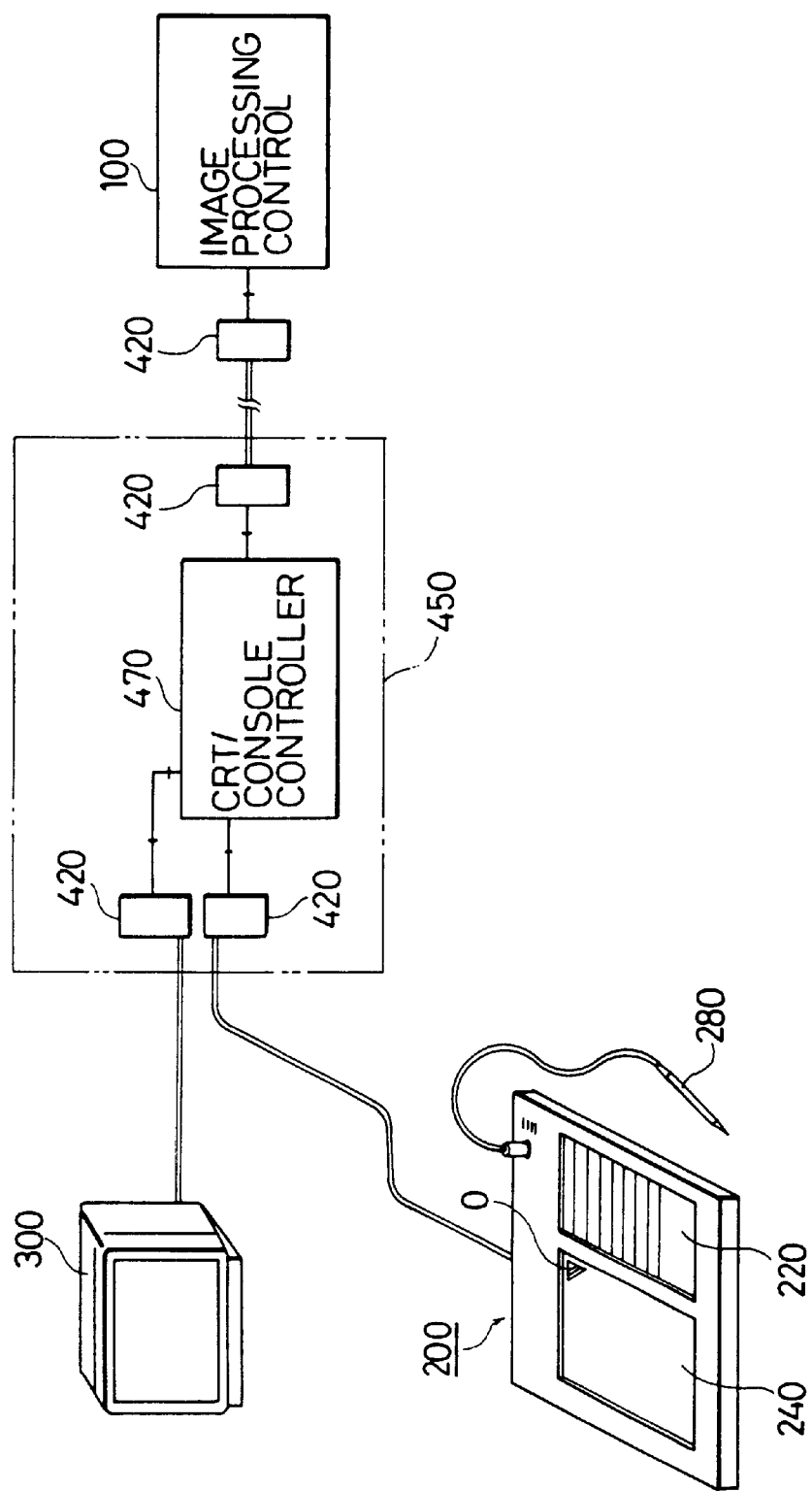

|    | 0 | 1 | 2 |     | 353  |
|----|---|---|---|-----|------|
| 0  | 0 | 3 | 6 |     | 1059 |
| 1  | 1 | 4 | 7 |     | 1060 |
| 2  | 2 | 5 | 8 |     | 1061 |

| INTERCONNECTION CCT | | SIGNAL DIRECTION | | INTERCONNECTION CCT | | SIGNAL DIRECTION | |
|---|---|---|---|---|---|---|---|
| NAME | SIGNAL | IMAGE PROCESSING SECTION 10 | DDX INTERFACE 60 | NAME | SIGNAL | IMAGE PROCESSING SECTION 10 | DDX INTERFACE 60 |
| EARTH FOR MAINT | FG | — | — | XMSN MODE | MDS | ←— | ←— |
| EARTH FOR SIGNAL | SG | — | — | RECEIVING MODE | MDR | ←— | ←— |
| CALL REQ | CRQP | —→ | —→ | TRANSFERABLE | RDT | —→ | —→ |
| CALL | CIP | ←— | ←— | XMSN DATA REQ | RQS | ←— | ←— |
| CONNECTION REQ | CNQ | —→ | —→ | XMSN DATA EFFECTIVE | SVA | —→ | —→ |
| INCOMING UNABLE | NRYP | —→ | —→ | RECEIVING DATA EFFECTIVE | RVA | ←— | ←— |
| CONNECTION UNABLE | NRYD | ←— | ←— | XMSN DATA | SDT | —→ | —→ |
| UNDER CONNECTION | CND | ←— | ←— | XMSN CLOCK | SCK | —→ | —→ |
| XMNS ABLE | RDS | —→ | —→ | RECEIVING DATA | RDT | ←— | ←— |
| RECEIVABLE | RDR | —→ | —→ | RECEIVING CLOCK | RCK | ←— | ←— |
| DIAL NO. | DLN | —→ | —→ | | | | |

| CALL | | CALLED | | DIRECTION | |
|---|---|---|---|---|---|
| RDS | RDR | RDS | RDR | CALL | CALLED |
| × | × | × | × | × | |
| × | × | × | ○ | × | |
| × | × | ○ | × | × | |
| × | × | ○ | ○ | × | |
| × | ○ | × | × | × | |
| × | ○ | × | ○ | × | |
| × | ○ | ○ | × | ← | |
| × | ○ | ○ | ○ | ← | |
| ○ | × | × | × | × | |
| ○ | × | × | ○ | → | |
| ○ | × | ○ | × | × | |
| ○ | × | ○ | ○ | → | |
| ○ | ○ | × | × | × | |
| ○ | ○ | × | ○ | → | |
| ○ | ○ | ○ | × | ← | |
| ○ | ○ | ○ | ○ | → | |

E R R O R ␣ ○○ (CR)
              EN
○○ .... ERROR COMMENT .... ○ (CR)
                                  EC

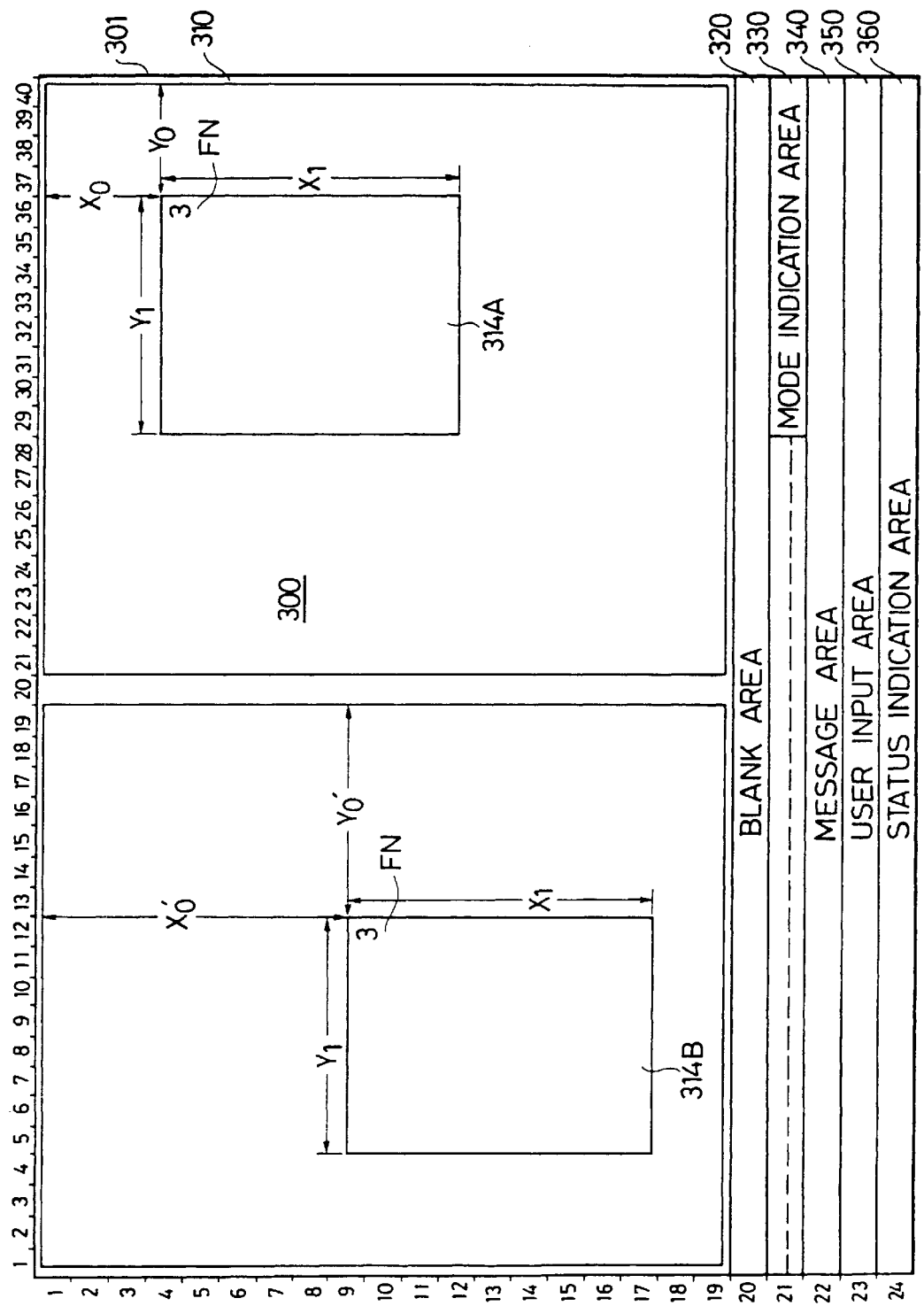

IMAGE PROCESSING APPARATUS

This application is a division of application Ser. No. 09/000,817 filed Dec. 30, 1997, which is a division of application Ser. No. 08/425,350, filed Apr. 19, 1995, which is a continuation of application Ser. No. 08/126,005 filed Sep. 24, 1993, abandoned, which is a continuation of application Ser. No. 07/745,405 filed Aug. 15, 1991, abandoned, which is a division of application Ser. No. 07/320,792 filed Mar. 7, 1989, issued as U.S. Pat. No. 5,109,434 on Apr. 28, 1992, which is a continuation of application Ser. No. 07/041,634 filed Apr. 23, 1987, abandoned, which is a continuation of application Ser. No. 06/537,020 filed Sep. 29, 1983, abandoned.

BACKGROUND OF THE INVENTION

1. Field of the Invention

The present invention relates to an image processing apparatus capable of various image processings through electric handling of image information.

2. Description of the Prior Art

There are already widely employed copiers as means for reproducing original images, and facsimile apparatus as means for transmitting original images to distant locations. Currently available copiers are capable, in reproducing the original images, of producing copies in the same size as or in larger or smaller size than that of the original images. Also they are capable of changing the image density over the entire reproduced image if such image density change is required. Such image processing functions are however often unable to meet the requirement of the users.

On the other hand there has been proposed a copier provided with additional image processing functions such as reproducing only a part of the original image, synthesizing plural images and changing the image density only in a part of the original image by means of converting the original image into electrical signals and applying suitable processes to the image information thus transformed into electrical signals. Such diversified functions of the copier however leads inevitably to a complicated structure and a complicated copying operation, giving rise to a longer image processing time.

Facsimile apparatus is only designed to transmit the original image to a distant location through a telephone line, and a suitable copier is additionally required in case copying is necessary in addition to image transmission. Also since such facsimile apparatus lack any image editing function, manual editing work, requiring considerable labor and time, is indispensable if the transmission is to be made after image editing. Furthermore the facsimile apparatus often requires a high operating cost as telephone lines have to be utilized even in so-called short-distance communications within a factory or a building.

SUMMARY OF THE INVENTION

In consideration of the foregoing, an object of the present invention is to provide an image processing apparatus capable of effective functions in the transmission and reception of image information.

Another object of the present invention is to provide an image processing apparatus capable of transmitting image information in a form adapted to the destination.

Still another object of the present invention is to provide an image processing apparatus capable of suitable processing in response to an abnormality in the image transmission.

Still another object of the present invention is to provide an image processing apparatus capable of achieving efficient transmission of image transmission.

Still another object of the present invention is to provide an image processing apparatus capable of suitable recording operation at the recording of transmitted image information.

Still another object of the present invention is to provide an image processing apparatus capable of correctly identifying the direction of image transmission.

The foregoing and still other objects and the advantages of the present invention will become fully apparent from the following description.

BRIEF DESCRIPTION OF THE DRAWINGS

FIG. 3-1 is a block diagram showing an embodiment of an editing station;

FIG. 3-2 is a plan view showing an example of key arrangement in the command menu section of an operating console;

FIG. 3-3 is a block diagram showing an example of a control unit of the editing station;

FIG. 6-1 is a block diagram showing an example of a buffer memory circuit block;

FIG. 6-2 is a block diagram showing an example of a memory controller for controlling the buffer memory circuit block:

FIG. 9-1 is a chart showing an example of the address map of the buffer memory;

FIG. 9-2 is a chart showing an example of the address map when the buffer memory is seen from the multi-bus;

FIG. 10-1A is a chart showing an example of the physical address structure of a disk memory;

FIG. 10-1B is a chart showing the sequence of making continuous access to data by changing addresses of the disk memory;

FIG. 10-2 is a chart showing an example of an index table;

FIGS. 10-3 and 10-4 are charts respectively showing examples of a sector bit map table and a file index table;

FIG. 10-5 is a schematic view showing area designation on an image to be edited;

FIG. 12-1 is a block diagram showing an example of a DDX interface;

FIG. 12-2 is a chart explaining the direction of signal transmission between the image processing unit and the DDX interface;

FIG. 12-3 is a chart explaining the direction of signal transmission in the DDX communication between the apparatus of the present invention with another system;

FIG. 12-4 is a chart showing an example of signal transmission procedure in the DDX communication;

FIG. 17 is a chart showing an example of the command input format;

FIG. 18 is a chart showing an example of error display format;

FIGS. 22-1 to 22-6 are schematic views showing examples of area divided displays on a cathode ray tube.

DETAILED DESCRIPTION OF THE PREFERRED EMBODIMENTS

Now the present invention will be clarified in detail by embodiments thereof shown in the attached drawings.

Figure 1:
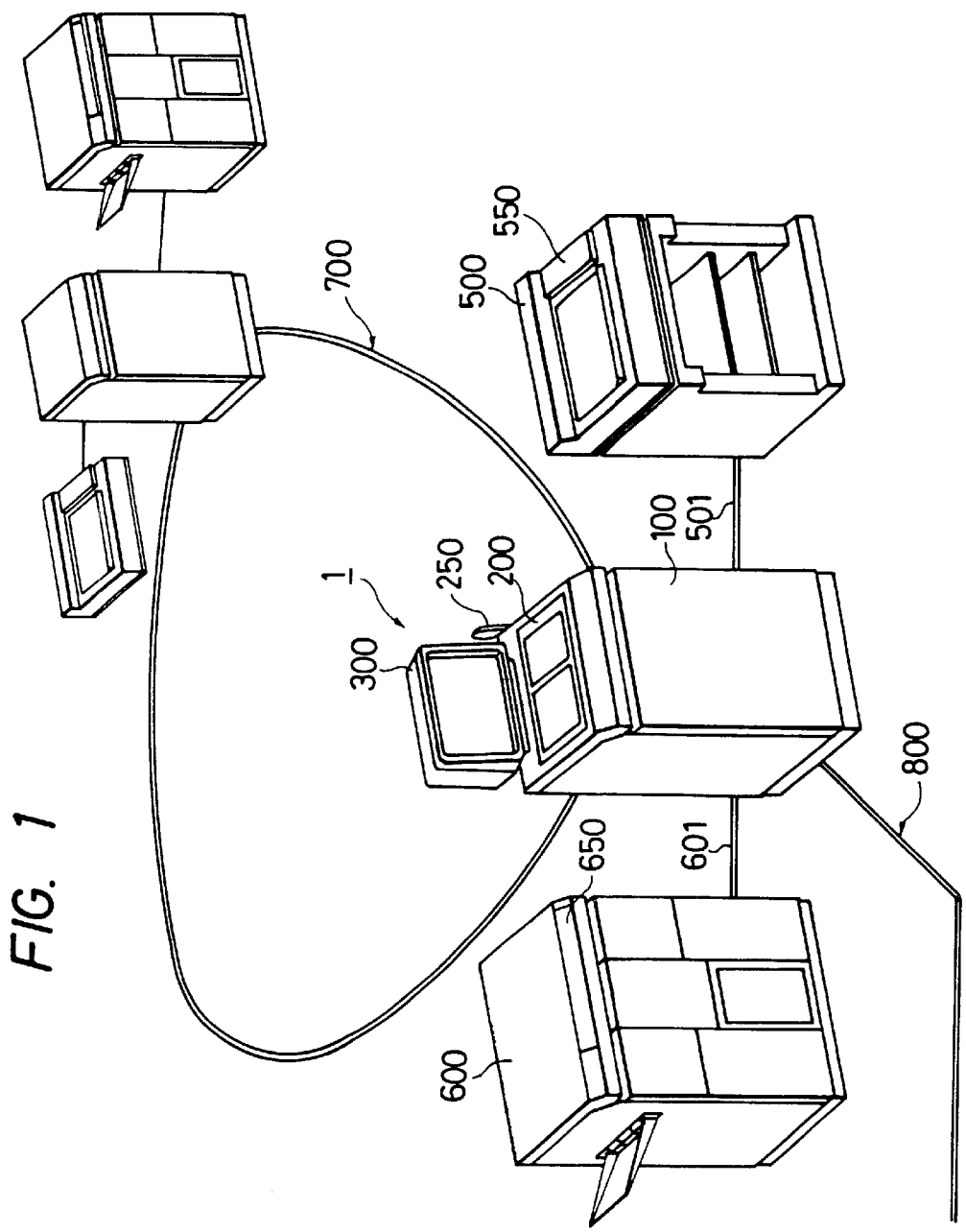
FIGS. 1 and 2 are respectively a perspective view and a block diagram showing an embodiment of the image processing apparatus of the present invention.

FIG. 1 shows an embodiment of the structure of the image processing apparatus of the present invention, which is principally composed of an image information generating unit 1, a reader unit 500 and a printer unit 600. The image information generating unit 1 performs editing, storage, transmission and reception of image information, and controls the functions of the reader unit 500 and the printer unit 600. The image information generating unit 1 is composed of an image processing control unit 100 for controlling the image processing procedure and for storing the processed image, and an editing station 400 to be utilized by the operator for image editing.

The reader unit 500 reads an original image with a linear sensor such as a charge-coupled device (CCD), photoelectrically converts said image and transmits the image information obtained as electric signals to the image information generating unit 1 through a signal line. A reader operating unit 550 is used when the operator wishes to directly control the reader unit 500 for reading an original image.

The printer unit 600, composed for example of a laser beam printer, prints an image on a recording material such as paper in response to the image information transmitted from the image information generating unit 1 through a signal line. A printer status display unit 650 indicates copying conditions such as the number of prints.

The image processing apparatus (hereinafter referred to as the system) consisting of the image information generating unit 1, reader unit 500 and printer unit 600 is connected through optical fiber cables 700 with other similar systems at short distances to constitute an optical fiber network for mutual communication of image information.

A digital data exchange (DDX) line 800 is used for communication of image information or the like with other unrepresented systems at long distances.

Figure 2:
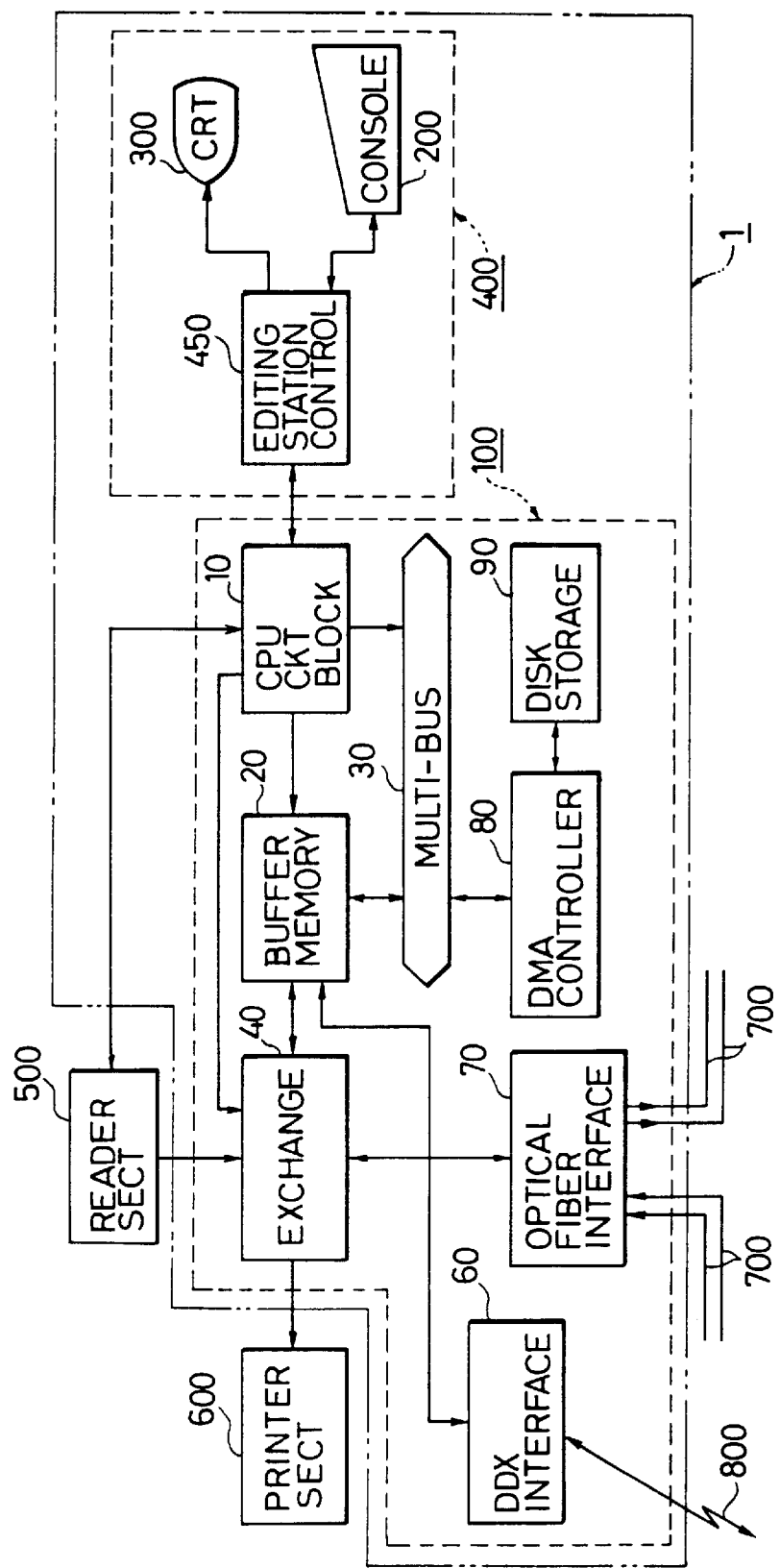

FIG. 2 is a block diagram showing the outline of the system principally including the image information generating unit 1. In an image processing control unit 100, there are provided an image processing unit 10 composed of a CPU circuit block for controlling other units listed below; a buffer memory for temporarily storing image information in the unit of an original of a determined size; a bus line 30; a DMA controller 80 for controlling direct memory access (DMA) between the buffer memory 20 and a disk memory 90; a DDX interface 60 provided between the system and the DDX line; an optical fiber interface provided between the system and the optical fiber network; and an exchange 40 for switching the channel of the image information to effect the transmission of image information between the optical fiber interface 70 or reader unit 500 or printer unit 600 and the buffer memory 20.

In an editing station 40 there are provided an editing station control unit 450 connected with the image processing unit 10 and adapted for controlling the following units; an editing station console 200 preferably constructed in the form of a console, wherein the operator enters editing commands and other instructions with a stilus pen 280 through light, pressure or electrostatic capacity; and a cathode ray tube 300 for displaying the commands entered by the operator, messages from the image processing unit 10 etc.

Figures 2, 3:
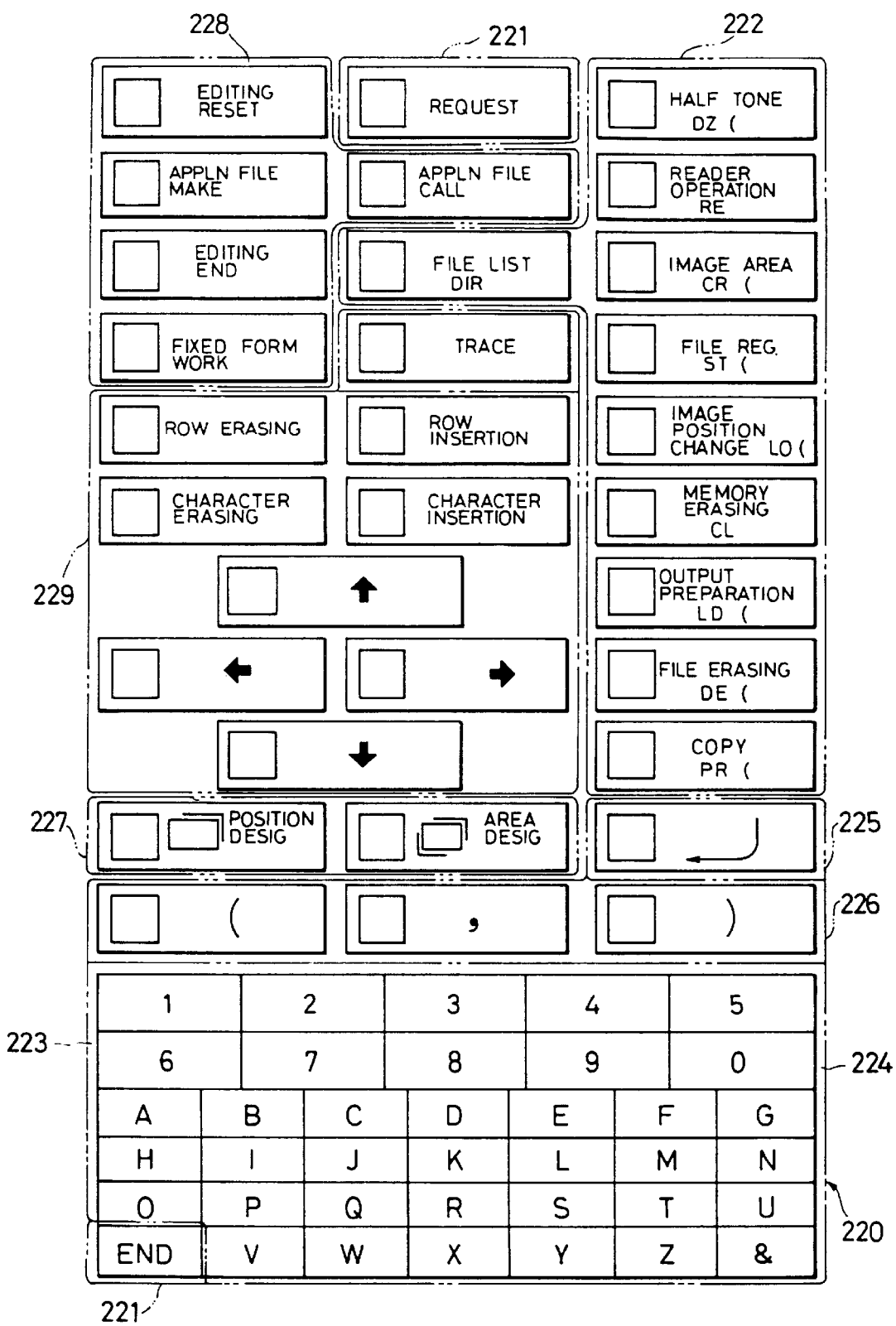
Figure 3:
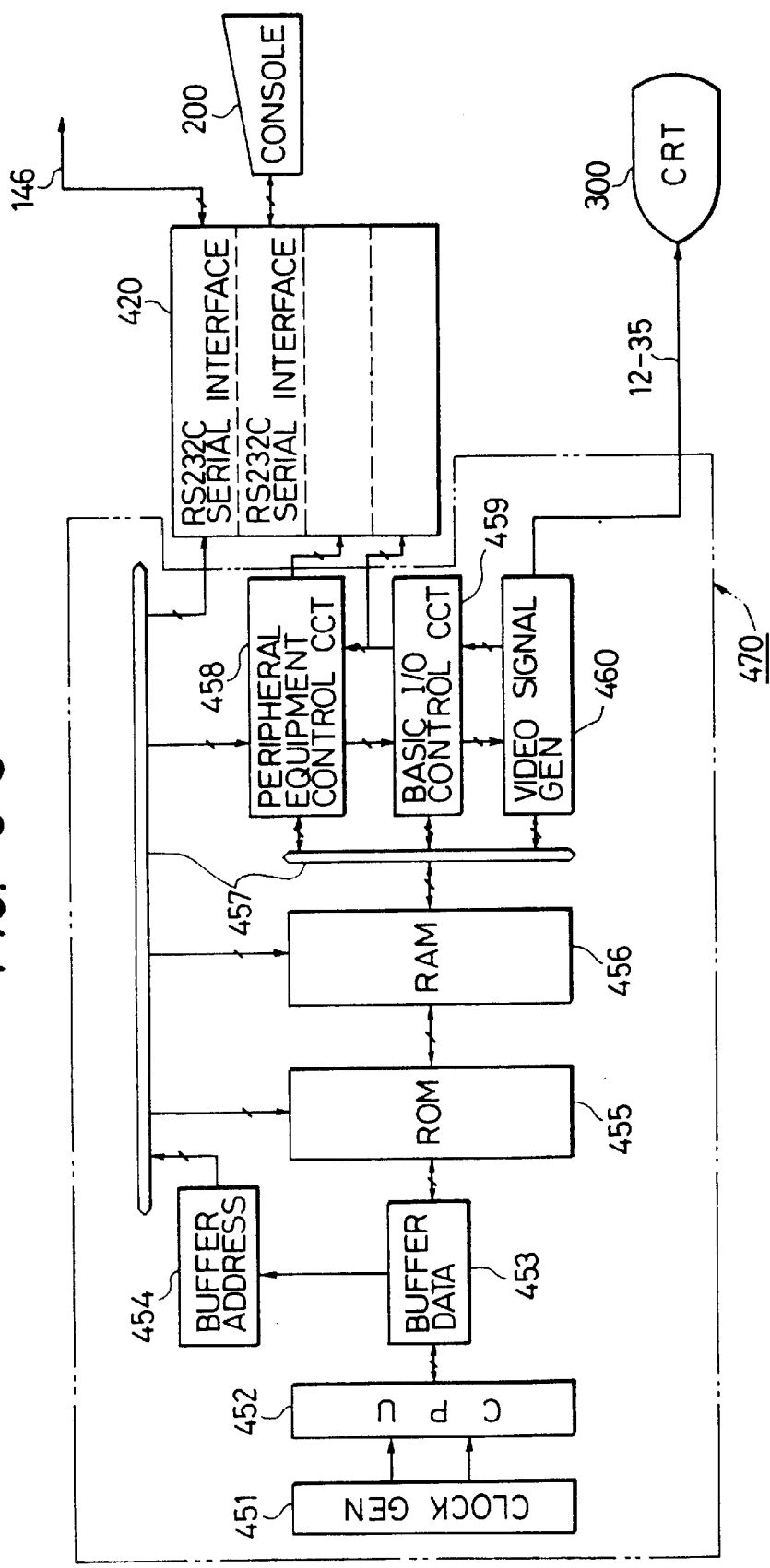

In the following there will be given an additional explanation on the editing station. FIG. 3-1 shows an example of the structure of the editing station 400, including the editing station control unit 450, the console 200, the stiluspen 280 and the cathode ray tube 300. The console 200 is provided with a digitizer 240 on which the operator can designate and enter areas on the original image with the stilus pen 280, and a command menu section 220 including command keys 221–228 for image editing as shown in FIG. 3-2, whereby the operator can effect image editing and preparation of editing programs. The digitizer 240 can read the position of a point designated thereon with a precision of one millimeter with respect to an original point O at the upper right corner. The command menu section 220 for example comprises, as shown in FIG. 3-2, a command key group 221 consisting of a REQUEST key for requesting the start of the editing station 400 and an END key for requesting the end of function; image editing command keys 222 to be explained later; alphabet keys 223 for entering characters; numeral keys 224 for entering numerals; a carriage return key 225; parameter input keys 226 for entering parameters subsequent to commands; command keys 227 for requesting the entry of coordinates and designating the mode of said entry prior to said entry on the digitizer 240; command keys 228 for preparation, correction and execution of editing programs (application files); and command keys 229 for screen editing on the cathode ray tube 300.

The display area on the cathode ray tube 300 is divided according to the instruction by the editing station control unit 450, and each divided area displays the coordinates, commands etc. instructed by the console 200.

The method of image editing through the console 200 and the cathode ray tube 300 will be explained later.

The editing station control unit 450 is composed of a CRT/console controller 470 and of an RS232C interface 420 and may consist for example of Apple II supplied by Apple Inc.

FIG. 3-3 is a block diagram of the editing station control unit 450, comprising a clock generator 451; a central processing unit 452 of the editing station control unit 450; a data buffer 453; an address buffer 454; a read-only memory (ROM) 455 for storing a dialog program language, for example BASIC; a random access memory (RAM) 456 for storing the image editing program etc.; a bus line 457; a peripheral equipment control circuit 458; a basic input/output control circuit 459; and a video signal generator 460.

The editing commands and the coordinates on the original image entered by the operator through the use of the stilus pen 280 and the console 200 are supplied to the editing station control unit 450 through the RS232C interface 420, then identified in the CRT/console controller 470 and are converted into ASCII codes for supply to the image processing unit 10 through said RS232C interface.

Now there will be given an additional explanation on the image processing control unit.

Figure 4:
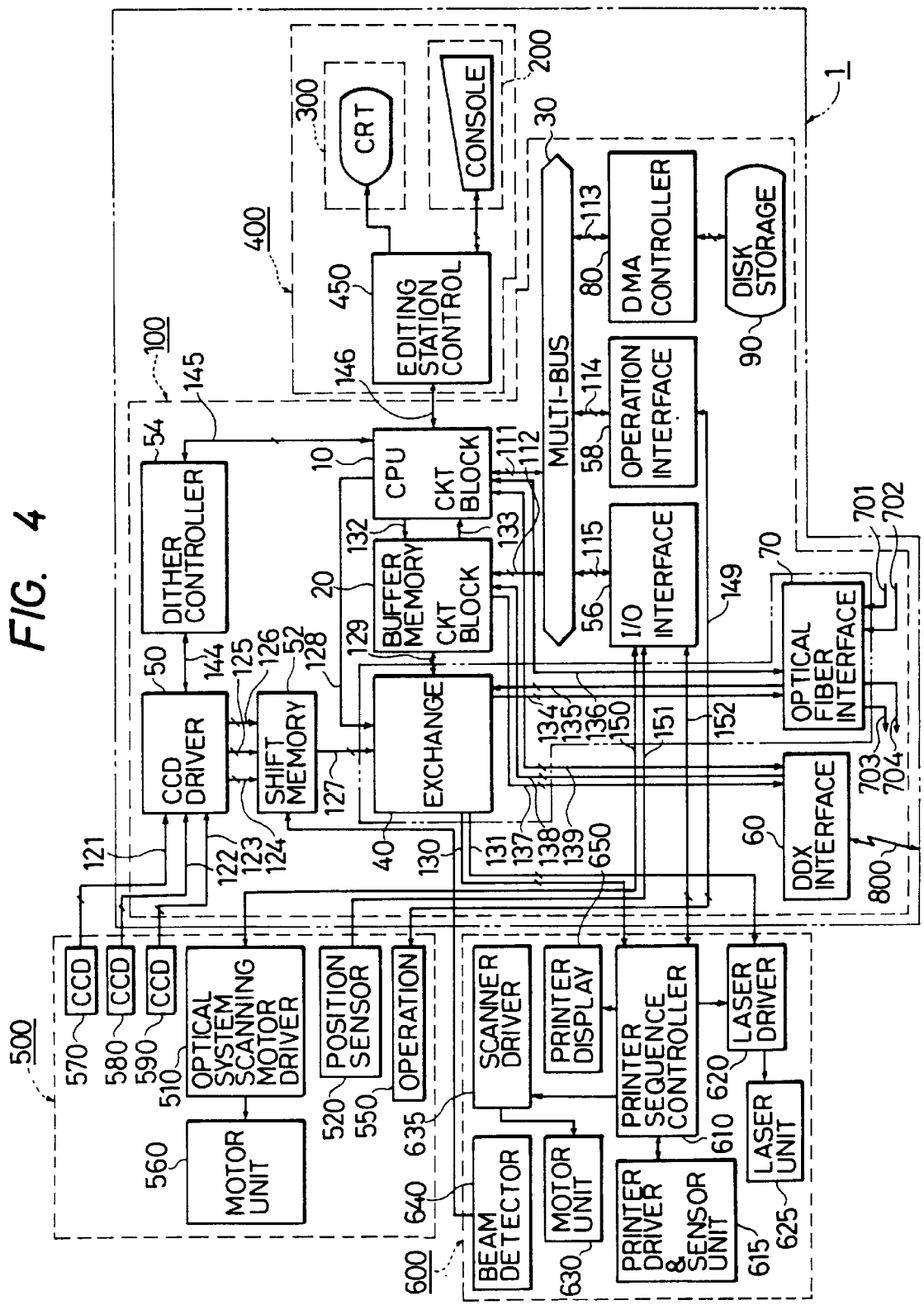
FIG. 4 is a detailed block diagram showing an embodiment of the apparatus including an image processing control unit 100.

FIG. 4 is a block diagram showing a detailed example of the image processing control unit 100 shown in FIGS. 1 and 2, wherein the image processing unit (CPU circuit block) 10, buffer memory circuit block 20, input/output interface 56, reader operation interface 58 and DMA controller 80 are connected to the multi-bus line 30 respectively through bus lines 111, 112, 115, 114 and 113.

Among these five circuit blocks connected to the multi-bus line 30, the CPU circuit block 10 and the DMA controller 80 have the master function for occupying the multi-bus line 30 and controlling other circuit blocks. On the other hand the buffer memory circuit block 20, input/output interface 56 and reader operation interface 58 have the slave function of being controlled by the master function blocks and are of unilateral access from the multi-bus line 30. The master function blocks connected to the multi-bus line 30 have a predetermined order or priority for using the multi-bus line 30. In the present embodiment. the CPU circuit block 10 has a higher priority than that of the DMA controller 80.

In the following explained are the functions of the CPU circuit block 10, including signal lines extending from or reaching said block 10.

In FIG. 4, a signal line 132 is used for releasing, from the CPU circuit block 10, a signal for selecting a memory bank in the buffer memory circuit block 20 to be explained later. A signal line 133 is used for entering, to the CPU circuit block 10, a signal indicating the period of signal write-in into or signal read-out from the buffer memory circuit block 20. A signal line 128 is used for supplying a control signal for switching the address of the image information from the CPU circuit block 10 to the exchange 40. Signal lines 136 and 139 respectively connect the CPU circuit block 10 with the optical fiber interface 70 and the DDX interface 60 for enabling the communication of control information between the CPU circuit block 10 with other systems. A signal line 145 is used for supplying a control signal on the dither process in the image processing from the CPU circuit block 10 to a dither controller 54. A signal line 146 connects the CPU circuit block 10 with the editing station control unit 450 for supplying the image processing information designated in the console 200 to the CPU circuit block 10 and for displaying the application file etc. stored in the disk memory 90 on the cathode ray tube 300. Also the CPU circuit block 10 controls the DMA controller through the bus line 111, multi-bus line 30 and bus line 113 to execute the DMA transmission of the image information between the buffer memory 20 and the disk memory 90.

The input/output interface 56 is provided between the CPU circuit block 10 and the reader unit 500 and printer unit 600, and is connected, respectively through signal lines 150, 151 and 152, to an optical scanning driver 510 for driging a motor 560 for controlling an optical system in the reader unit 500, a position sensor 520 for detecting the position of said optical system, and a printer sequence controller block 610 for controlling the copying sequence of the printer unit 600.

The reader operation interface 58 is used, among others, for supplying the information on the operation status to be entered from the operation unit 550 of the reader unit 500 as will be explained later to the CPU circuit block 10 through the multi-bus line 30.

A CCD driver 50 effects analog-to-digital conversion on the analog image signals supplied through signal lines 121, 122 and 123 in parallel manner from lines sensors 570, 580 and 590, for example CCD's, provided in the reader unit 500 for reading the image information of a line in divided manner, and supplies thus obtained digital signals in parallel manner to a shift memory 52 through signal lines 124, 125 and 126. Said shift memory 52 converts said parallel image signals into serial image signals representing a line and supplies said image signals to the exchange 40 through a signal line 127. A tone control unit 54, composed for example of a dither controller, supplies information on the image tone processing, for example information on dither processing, or information on the designation of an area for locally changing the copy density, to the CCD driver 50 through a signal line 144.

The exchange 40 can be composed of gate circuits for supplying image signals and control signals selectively to various units, and switches the addresses of said image signals and control signals by controlling said gates in response to the control signals to be supplied from the CPU circuit block 10 through a signal line 128. A signal line 129 is used for communication of the image signals and control signals between the exchange 40 and the buffer memory 20. Signal lines 130 and 131 are used respectively for transmitting control signals and image signals from the exchange 40 to the printer unit 600 and are connected to the printer sequence controller block 610 and a laser driver 620 therein. There are also provided a printer driver and sensor unit 615, a laser unit 625 for generating a laser beam modulated in response to the image signals, a polygonal motor unit 630 for rotating a polygonal mirror for deflecting said laser beam, a scanner driver 635 for rotating the polygonal mirror at a stable speed, and a beam detector 640 for determining the timing of modulation of the laser beam.

A signal line 134 is used for supplying control signals and image signals from the exchange 40 to the optical fiber interface 70. A signal line 135 is used for supplying the control signals and image signals from the optical fiber interface 70 to the exchange 40.

Optical fibers 701, 702 are respectively used for receiving the control signals and image signals and the corresponding clock signals to be supplied from other systems to the optical fiber interface 70, and optical fibers 703, 704 are used respectively for transmitting the control signals and image signals, and the corresponding clock signals from the optical fiber interface 70 to other systems.

Signal lines 137, 138 are used for communication of image signals between the buffer memory 20 and the DDX interface 60.

The flows of image information in the image processing apparatus of the present invention, constructed as shown in FIG. 4, can be summarized as follows:

(1) In case of reading image information with the reader unit 500 and printing said information with the printer unit 600:

The analog image signals read by the line sensors 570, 580 and 590 in the reader unit 500 are supplied, in parallel manner, to the CCD driver 50 for analog-to-digital conversion, and the obtained digital signals are supplied in parallel manner to the shift memory 52, in which the parallel image signals are converted into serial image signals representing a line and supplied to the exchange 40. The CPU circuit block 10 connects the gate of the exchange 40 to the printer unit 600, whereby the serial image signals are supplied to the laser driver of the printer unit 600 in sequential manner in synchronization with beam detection signals from the beam detector 640 for effecting the copying operation in the printer unit 600.

(2) In case of transmission through the DDX line 800:

The image signals temporarily stored in the buffer memory 20 are transferred through a signal line 137 to the DDX interface 60, and supplied, after data compression therein, to the DDX line 800.

(3) In case of reception through the DDX line 800:

The received image signals are subjected to data expansion in the DDX interface 60, then temporarily stored in the buffer memory 20 through the signal line 138, and transmitted through the exchange 40 to the printer unit 600 for copying.

(4) In case of image signal transmission through the optical fiber network 700:

The image signals read in the reader unit 500 are supplied to the exchange 40 in the same manner as in the case (1), and are transmitted to the optical fiber interface 70 through the signal line 134 according to the instruction of the CPU circuit block 10. Said signals are subjected to electrooptical conversion in said interface and supplied to other systems connected in the optical fiber network 700.

(5) In case of receiving image signals from the optical fiber network 700:

The optical image signals supplied from other systems in the optical fiber network 700 are supplied, after opto-electric conversion in the optical fiber interface 70, to the exchange 40 through the signal line 135. The CPU circuit block 10 analyzes the address data of said image signals, and, if said image signals are addressed to another system, the received image signals are again subjected to electro-optical conversion in the optical fiber interface 70 and transmitted to the optical fiber network 700. If said image signals are addressed to the present system, they are transmitted through the exchange 40 to the printer unit 600 for effecting the copying operation therein.

(6) In case of image editing:

The image signals corresponding to an original image read in the reader unit 500 are temporarily stored in the buffer memory 20 through the exchange 40, and are subjected to image editing by DMA transmission between the buffer memory 20 and the disk memory 90 according to the editing information prepared in the console 200, as will be detailedly explained later. After such editing, the edited image signals stored in the buffer memory 20 are transferred to a destination indicated by the CPU circuit block 10.

Now there will be given detailed explanations on the structure of principal circuit blocks in the image processing control unit 100 shown in FIG. 4.

Figure 5:
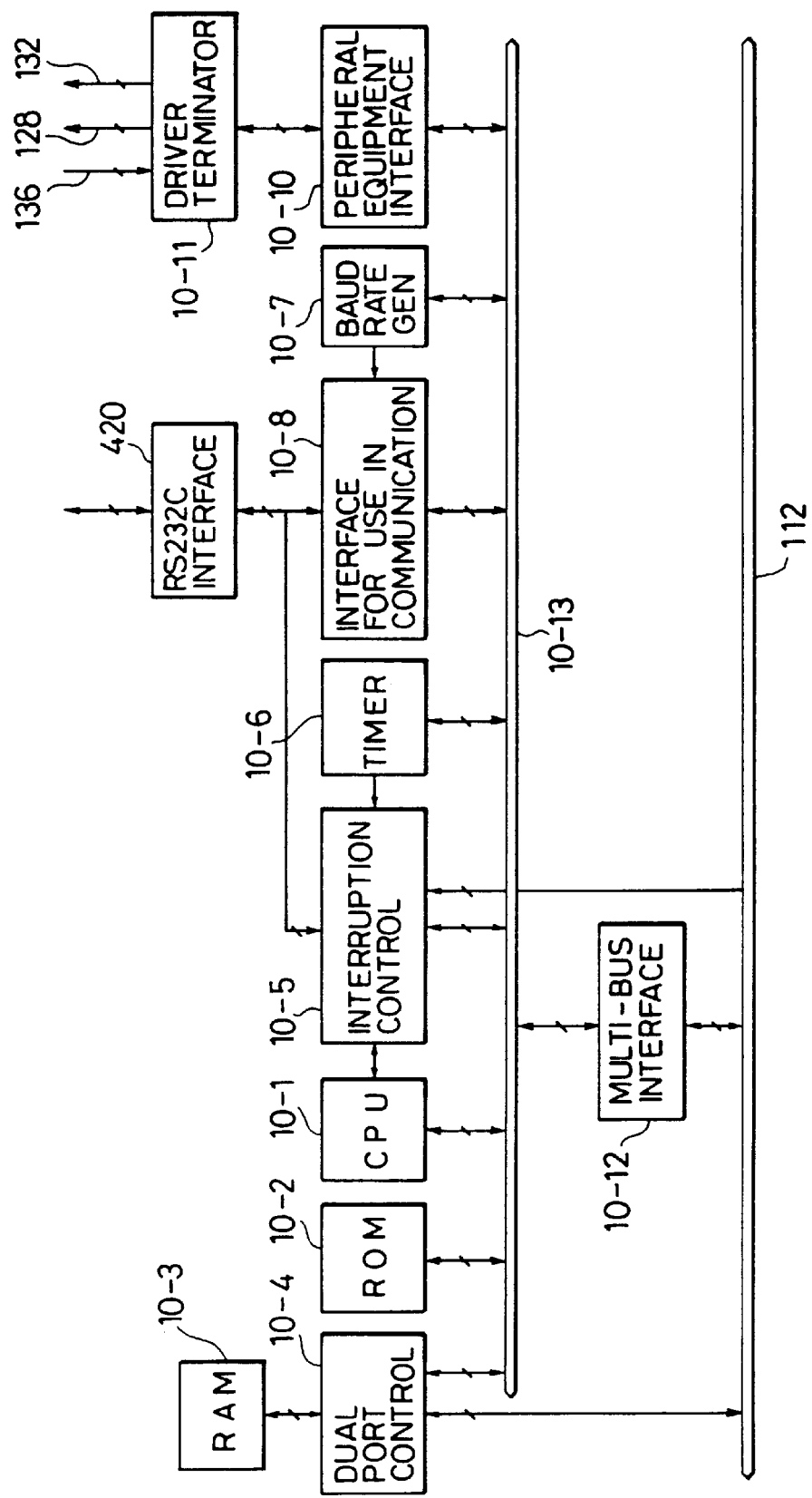
FIG. 5 is a block diagram showing an example of an image processing unit (CPU block)

At first explained is the CPU circuit block 10, which can for example be composed of a single board computer SBC86/12 manufactured by Intel Corp. of a structure shown in FIG. 5, wherein provided are a CPU unit 10-1; a ROM 10-2; a RAM 10-3 which is used not only for storing the system program of the present system but also for reading the applications files to be stored in the disk memory 90 as will be explained later; a dual port controller 10-4, an interruption controller 10-5; a timer 10-6; a baud rate generator 10-7; a communication interface 10-8 connected with the editing station 400 through the RS232C interface 420; a peripheral equipment interface 10-10 connected to the buffer memory block 20 and exchange 40 through a driver terminator 10-11; and a multi-bus interface 10-12 provided between the bus line 112 and an internal bus 10-13 in the CPU circuit block 10.

Figures 1, 6:
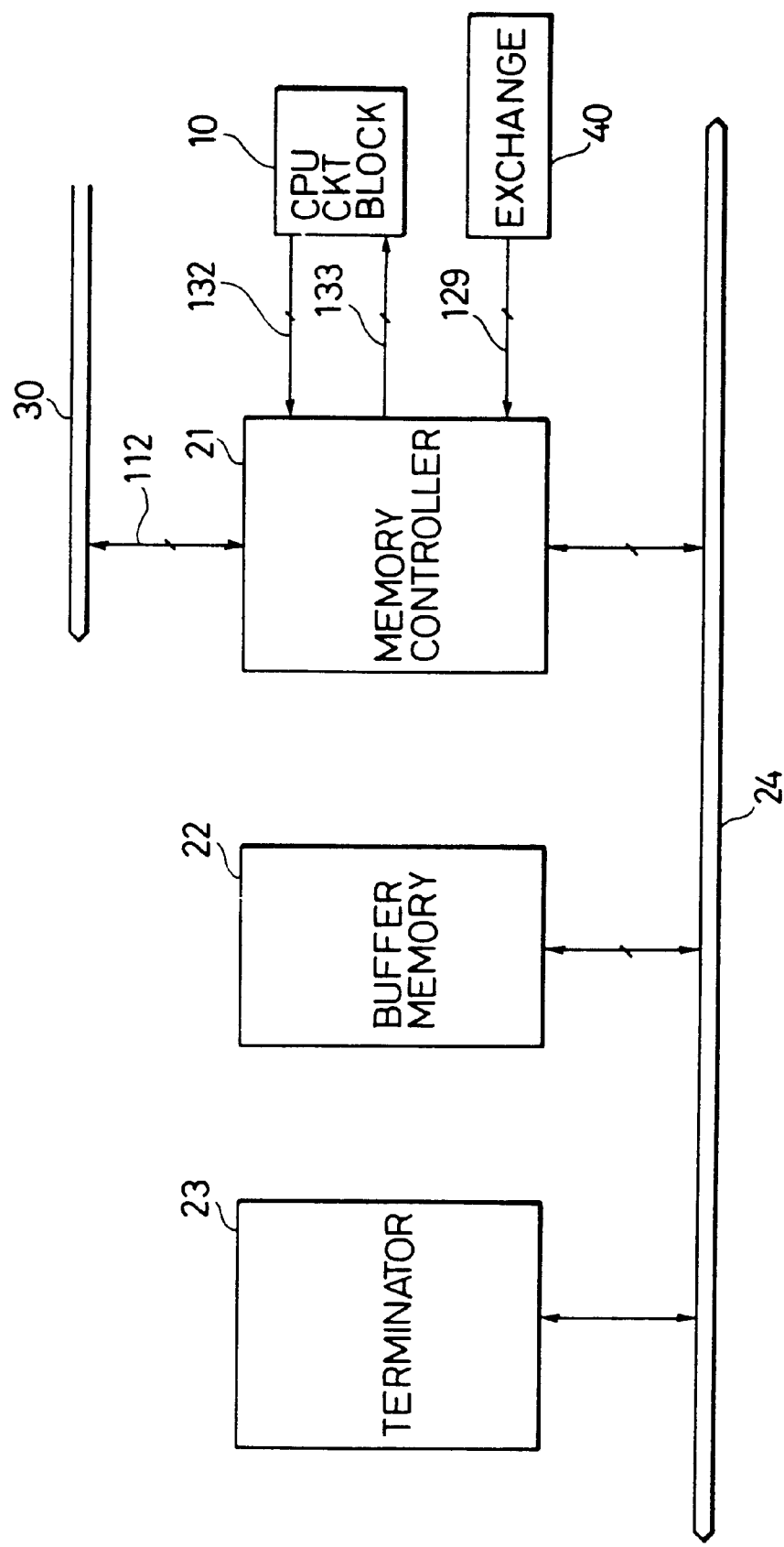
Figures 2, 6:
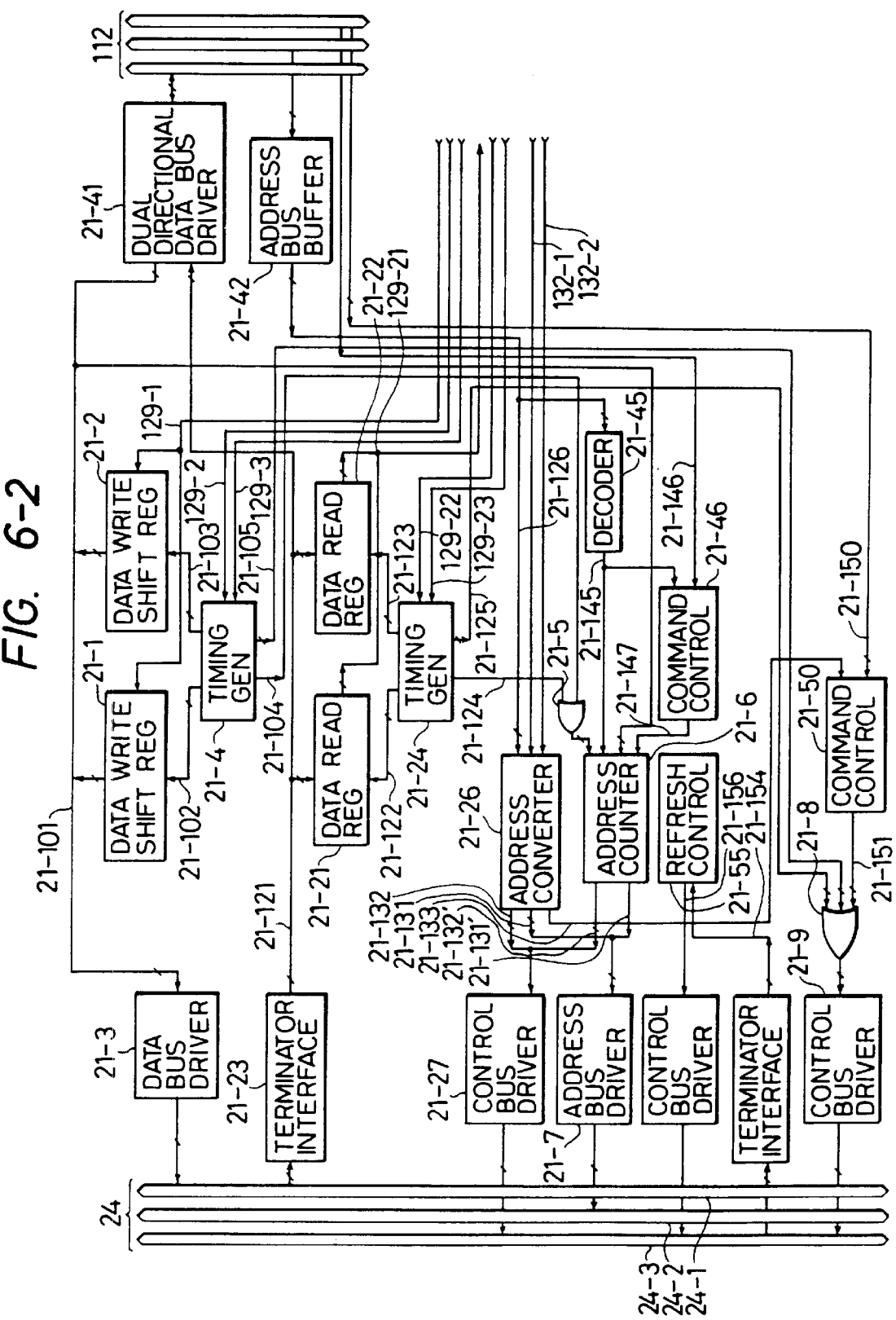

Now there will be explained the buffer memory circuit block 20 of which structure is shown in FIG. 6-1. Said block is provided with a memory controller 21, a buffer memory 22 and a terminator 23 which are mutually connected with an internal bus line 24. The memory controller 21 is connected through the bus line 112 to the multi-bus line 30 to make access to the buffer memory 22 under the control of the CPU circuit block 10. The memory controller 21 is further connected through a signal line 129 to the exchange 40 and through signal lines 132, 133 to the CPU circuit block 10.

The buffer memory 22 is composed of a group of dynamic random access memories. In the present embodiment the image reading is conducted for an original of A4 size (297×210 mm) with a resolving power of 16 bits/mm, so that the buffer memory should have a capacity at least equal to (297×16)×(210×16)=15966720 bits. If the image information per millimeter, namely information of 16 bits, is taken as one word, the capacity of the buffer memory 22 is equal to 997920 words or approximately 1 megawords.

The terminator 23 stabilizes the signal level immediately after the start or end of a signal.

The internal bus line 24 transmits address signals, data signals, read-out signals, write-in signals, memory refresh signals, memory status signals and acknowledge signals.

FIG. 6-2 is a circuit diagram of the memory controller 21 provided in the buffer memory block 20 for controlling the access to the buffer memory 22. In said controller, 16-bit data write-in shift registers 21-1, 21-2 convert the serial image signals of a scanning line supplied to the buffer memory block 20 through a signal line 129-1 into parallel 16-bit signals and release said signals to a data bus line 24-1 through a write-in data signal line 21-101 and a data bus driver 21-3. A write-in timing generator 21-4 laternately selects the write-in shift registers 21-1 and 21-2 in response to write-in synchronization signals supplied through a signal line 129-2 and write-in clock signals supplied through a signal line 129-3, thus supplying write-in instruction signals and output enabling signals respectively through signal lines 21-102 and 21-103. As an example, when the shift register 21-1 is selected at first, the first 16 bits are supplied to the shift register 21-1. Then the shift register 21-2 is selected, and, when the next 16 bits of the image signals are supplied to said shift register 21-2, the write-in timing generator 21-4 supplies the output enabling signal to the shift register 21-1 to release the first 16 bits of the image signals already stored therein to a signal line 21-101.

The image signals supplied from the exchange 40 are stored in the buffer memory 20 without interruption by repeating the above-described procedure over the image information corresponding to an original image. In synchronization with the parallel output of 16-bit image signals from the data write-in shift register 21-1 or 21-2 to the signal line 21-101, the write-in timing generator 21-4 supplies a clock pulse to an address counter 21-6 through a signal line 21-104 and an OR gate 21-5, whereby the address counter 21-6 is stepped up and releases, through an address bus driver 21-7 to an address bus line 24-2, an address of the memory 22 where said image signals of 16 bits (1 word) are to be stored. The write-in timing generator 21-4 releases clock pulses in such a manner that the address counter 21-6 is stepped up by 16 bits during the release of the image signals from the shift register 21-1 or 21-2 to the signal line 21-101, whereby address counter 21-6 always indicate addresses with an interval of 16 bits such as 00000H, 00010H, 00020H, . . . in which "H" indicates a hexadecimal number. Also in synchronization with the release of image signals from the shift register 21-1 or 21-2 to the signal line 21-101, the write-in timing generator 21-4 releases a write-in signal to a control bus line 24-3 through a signal line 21-105, an OR gate 21-8 and a control bus driver 21-9.

16-bit data read-out shift registers 21-21 and 21-22 convert parallel image signals of 16 bits (1 word) read from the memory 22 through a data bus line 24-1, a terminator interface 21-23 and a signal line 21-121 into serial image signals of 16 bits and release said signals to a signal line 129-21. A read-out timing generator 21-24 alternately selects the data read-out shift register 21-21 or 21-22 in response to read-out synchronization signals supplied through a signal line 129-22 and read-out clock signals supplied through a signal line 129-23, and supply read-out instruction signals or output enabling signals respectively through signal line 21-122 or 21-123, thereby transmitting the image signals to the exchange 40 without interruption through a signal line 129-21. Immediately before the release of image signals from the data read-out shift register 21-21 or 21-22 to the signal line 129-21, the read-out timing generator 21-24 supplies clock pulses to the address counter 21-6 through a signal line 21-124 and an OR gate 21-5, whereby said address counter 21-6 is stepped up and releases, through the address bus driver 21-7 to the address bus 24-2, an address of the memory 22 where the image signals to be read are stored. The read-out timing generator 21-24 releases clock pulses in such a manner that the address counter 21-6 is stepped by 16 bits during the release of the image signals from the shift register 21-21 or 21-22 to the signal line 21-121. Also in synchronization with the release of image signals from the data read-out shift register 21-21 or 21-22 to the signal line 21-121, the read-out timing generator 21-24 releases a read-out signal to the control bus line 24-3 through a signal line 21-125, an OR gate 21-8 and the control bus driver 21-9.

An address converter 21-26 converts, at the storage of the image signals into the buffer memory 22 from the disk memory 90 and through a dual directional data bus driver 21-41 under the control of the DMA controller 80, the addresses of the image signals transmitted through the address bus 32, address bus buffer 21-42 and signal line 21-126 into the addresses distributed over said memory 22, and releases said addresses to the address bus 24-2 through a signal line 21-131 and the address bus driver 21-7 as will be explained later. At the same time a memory write-in/read-out signal is supplied through a signal line 21-126 to the address converter 21-26, which thus releases a write-in/read-out enabling signal to a signal line 21-133. Also the CPU circuit block 10 supplies a binary memory bank selection signal to the address converter 21-26 through signal lines 132-1 and 132-2. In response thereto the address converter 21-26 supplies a binary signal corresponding to a memory bank 0, 1 or 2, to the control bus line 24-3 through a signal line 21-132 and a control bus driver 21-27.

In case of entering the image signals from the CCD's 570, 580 and 590, the initial address of each line to be read by said CCD's is preset in the address counter 21-6 by the CPU circuit block 10 through the multi-bus line 30, a bus line 112 and a dual directional data bus driver 21-41. Said address is also supplied through an address bus buffer 21-42 and a signal line 21-126 to a decoder 21-45 for decoding, and a resulting chip selection signal is supplied to the address counter 21-6 through a signal line 21-145. On the other hand, an input/output write-in command signal supplied through a control bus line of the bus line 112 is guided through a signal line 21-146 to a command control circuit 21-46, which selects said command signal according to the chip selection signal, and, in case a chip selection is requested, the preset data on a signal line 21-101 are supplied in parallel manner to the address counter 21-6 in response to said command signal. Upon storage of the initial address in this manner, the address counter 21-6 counts the clock pulses supplied through a signal line 21-104 or 21-124 up to said address, and releases the selection signal of the memory 22 to a signal line 21-132' and the address in the memory 22 to a signal line 21-131' in a similar manner as explained before in relation to the address converter 21-26.

A signal line 21-150 is used for transmitting a memory write-in signal and a memory read-out signal which are released when the CPU circuit block 10 or the DMA controller makes an access to the memory 22. Said signals are controlled in a command control circuit 21-50 by the write-in/read-out enabling signal supplied through a signal line 21-133, and, in case an access to the memory 22 is required, the memory write-in signal or memory read-out signal is supplied through a signal line 21-151, an OR gate 21-8 and a control bus driver 21-9 to the internal bus line 24.

A signal line 21-154 is used for supplying a refresh control circuit 21-55 with a memory busy (MB) signal indicating that the memory 22 is in the course of read-out or write-in operation, and a memory cycle enabling (MCE) signal indicating that the memory 22 is in the course of read-out/write-in operation or of refreshing operation, to be supplied from the bank 0, 1 or 2 of the memory 22 to the control bus line 21-3. In the absence of said MB or MCE signal, the refresh control circuit 21-55 supplies a refreshing pulse through a signal line 21-156 to the buffer memory 22, thus refreshing the dynamic PR1A therein. In case a MB or MCE signal is detected during the period of said refreshing pulse, it is interrupted until the completion of access to the memory 22.

Figure 7:
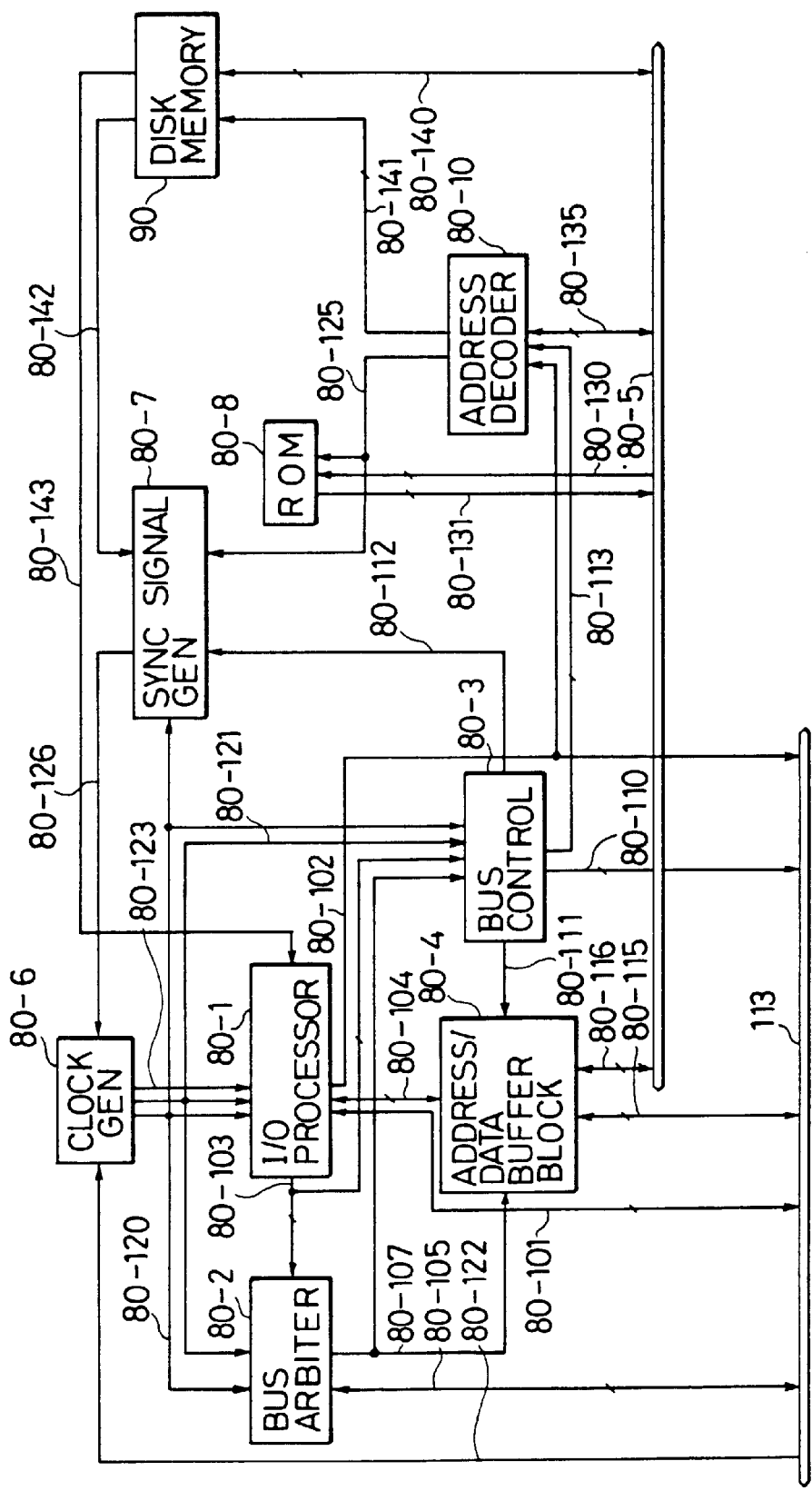
FIG. 7 is a block diagram showing an example of a DMA controller.

In the following explained is the DMA controller. FIG. 7 shows the structure of the DMA controller 80 and the disk memory 90 in a block diagram. An input/output processor 80-1 with DMA function controls the following units, and is composed, in the present embodiment, of Intel 8089 supplied by Intel Corp. Said I/O processor 80-1 is connected with the multi-bus line 30 through a signal line 80-101, which transmits a channel attention (CA) signal requesting the DMA transmission from the CPU circuit block 10 and a system interruption (SINTR) signal from the DMA controller 80 indicating the completion of the DMA transmission. At the access to a ROM 80-8 in the DNA controller 80, the I/O processor 80-1 releases a signal for selecting said ROM 80-8 and a signal indicating the address of instruction code of the program stored in said ROM 80-8 to an internal bus line 80-5 through a signal line 80-105. A signal line 80-103 leading from the I/O processor 80-1 to a bus arbiter 80-2 and to a bus controller 80-3 transmits thereto a status signal of the I/O processor 80-1. A signal line 80-104 connecting the I/O processor 80-1 with an address/data buffer block 80-4 transmits address information signals and data information signals released by the I/O processor 80-1 in multiplex mode. The I/O processor 80-1 divides the time of the address information signals and of the data information signals, and supplies an address/data buffer block 80-4 at first with the address information signals and then with the data information signals.

The bus arbiter 80-2 becomes connected with the multi-bus line 30 to acquire the right of use thereof through a signal line 80-106 according to a status signal to be supplied from the I/O processor 80-1, and simultaneously releases an address information transmission enabling (AEN) signal through a signal line 80-107 to the bus controller 80-3 and to an address/data buffer 80-4. In the present embodiment said bus arbiter is composed of Intel 8289 supplied by Intel Corp.

In response to said AEN signal from the bus arbiter 80-2, the bus controller 80-3 releases, through a signal line 80-110 to the multi-bus line 30, a memory read (MRDC) signal in case of a read-out mode with DMA transmission from the buffer memory 20 to the disk memory 90, or a memory write-in (MWTC) signal in case of a write-in mode with DMA transmission from the disk memory 90 to the buffer memory 20. According to the status signal to be supplied from the I/O processor 80-1, the bus controller 80-3 also supplies the address/data buffer block 80-4 through a signal line 80-111, with an address latch enable (P-E) signal for causing the address/data buffer block to latch the address information to be released by the I/O processor 80-1, a data enable (DEN) signal for causing the release of the address information and data information to the multi-bus line 30, a peripheral data enable (PDEN) signal for causing the release of said information to an internal bus line 80-5, and a data transmit/read (DT/R) signal for causing the address/data buffer block 80-4 to select whether the transmission of data information to the multi-bus line 30 or to the internal bus (transmit mode), or the data reading from said bus lines (read mode). A signal line 80-112 leading from the bus controller 80-3 to a synchronization signal generator 80-7 transmits an I/O read command (IORC) signal to be released from the bus controller 80-3 when the I/O processor 80-1 makes an access to the internal bus line 80-5 in the read-out mode, an interruption acknowledge signal (INTA) signal to be released from the bus controller 80-3 when the I/O processor 80-1 fetches a microprogram stored in the ROM 80-8, and the above-described ALE signal. Said bus controller 80-3 may be composed for example Intel 8288 supplied by Intel Corp.

The address/data buffer block 80-4 is provided with two address/data buffers, which are respectively connected, through signal lines 80-115 and 80-116, with the multi-bus line 30 and the internal bus line 80-5 for passing the address information and data information with said bus lines.

The internal bus line 80-5 of the DMA controller 80 is equipped with a 16-bit address bus with a 64 kilobyte address space and an 8-bit data bus.

A clock generator 80-6 supplies, in response to reference oscillation output signals for example from an external crystal oscillator, clock signals of a determined frequency through a signal line 80-120 to the I/O processor 80-1, bus arbiter 80-2, bus controller 80-3 and synchronization signal generator 80-7, and also supplies a reset signal at the start of power supply and a manual reset signal through a signal line 80-121 to the I/O processor 80-1, bus arbiter 80-2 and bus controller 80-3. A clock generator 80-4 receives a transfer acknowledge (XACK) signal responding to the MWTC and MRDC signals from the multi-bus 30 through a signal line 80-122, thus discriminating whether the multi-bus line 30 enters or terminates the waiting state, and supplies a bus ready signal to the I/O processor 80-1 through a signal line 80-123 according to the result of said discrimination.

A synchronization signal generating circuit 80-7 generates a signal confirming the response of the ROM 80-8 in response to the aforementioned IORC and INTA signals and also to the chip selection signal supplied from the address decoder 80-10 through a signal line 80-125, and supplies thus generated signal to the clock generator 80-6 through a signal line 80-126, thereby enabling the I/O processor 80-1 to proceed to a succeeding operation.

The ROM 80-8 stores a microprogram of the I/O processor 80-1. A signal line 80-130 leading from an internal bus 80-5 to the ROM 80-8 is used as an address signal line for transmitting, when the I/O processor 80-1 fetches the microprogram stored in the ROM 80-8, a signal indicating the address of thus fetched instruction, and a signal line 80-131 leading to the ROM 80-8 is used as a data signal line therefor.

The address decoder 80-10 supplies a signal for selecting the ROM 80-8 through a signal line 80-125 to the ROM 80-8 and to the synchronization signal generating circuit 80-7 in response to the chip selection signal of the I/O processor 80-1 to be supplied through the internal bus 80-5 and a signal line 80-135. A signal line 80-113 leading from the bus controller 80-3 to the address decoder 80-10 transmits a status information signal S2 indicating whether the address information latched in the address/data buffer block 80-4 is for the internal bus 80-5 or for the multi-bus line 30, and said signal is discriminated by the address decoder 80-10.

In the following explained is the operation of transfer of address information and data information between the DMA controller 80 and the multi-bus line 30 or the internal bus 80-5. At first, in relation to the function of the multi-bus line 30, the address/data buffer 80-4 latches the address information, supplied from the I/O processor 80-1, in the address buffer in response to the ALE signal supplied from the bus controller 80-3 to the address/data buffer 80-4. When the bus arbiter 80-2 acquires the right of using the multi-bus line 30 after said latching, the bus arbiter 80-2 supplies the AEN signal to the address/data buffer 80-4, whereby it releases the latched address information to the multi-bus line 30. If the DMA controller 80 is in the write-in mode and the multi-bus line 30 is already secured in this state, the I/O processor 80-1 supplies the data information to the address/data buffer 80-4, which, in response to the DEN signal supplied from the bus controller 80-3, transmits said data information to the multi-bus line 30. On the other hand, if the DMA controller 80 is in the read-out mode, the address/data buffer 80-4 transmits the data information on the multi-bus line 30 to the I/O processor 80-1. The write-in operation of the data information by the I/O processor 80-1 is conducted upon confirmation of the XACK signal to be supplied from the disk memory 90 to the I/O processor 80-1.

The function of the address bus buffer 80-4 to be connected with the internal bus 80-5 is similar to the foregoing case, but the AEN signal from the bus arbiter 80-2 is not required for supplying the address information to the internal bus 80-5. Also the supply of the data information to the internal bus 80-5 is controlled by the PDEN signal to be supplied from the bus controller 80-3.

The disk memory 90 is for example composed of a model WDS-10 supplied by Sord Computer Co., and is equipped therein with an unrepresented disk controller circuit, which is connected with the internal bus 80-5 of the DMA controller 80 through a data bus 80-140, and also with the synchronization signal generating circuit 80-7 and the I/O processor 80-1 respectively through signal lines 80-142 and 80-143.

The data bus 80-140 transmits the command information, result information, data information and status information, of which the first three are combined as a set under a single address and are sequentially handled by the disk controller circuit. On the other hand, each status information is given an independent address. The command information indicates the address and the number of bytes on the disk memory 90, and the result information indicates the result of error check in the transmission of information between the DMA controller 80 and the disk memory 90.

A signal line 80-142 a command busy (CBUSY) signal, and the synchronization signal generating circuit 80-7 discriminates the above-mentioned three information from the status information. The abovementioned set consisting of the command information, result information and data information and the status information have different ready timings both in the read-out mode and in the write-in mode. Consequently the synchronization signal generating circuit 80-7 generates four different waiting times by means of the IORC signal transmitted through a signal line 80-112 and the CBUSY signal transmitted through a signal line 80-142, and provides said waiting times to the clock generator 80-6 through a signal line 80-126, whereby the above-mentioned various information are read by the I/O processor 80-1 under the discrimination by the timing of clock signals supplied from the clock generator 80-6.

A signal line 80-143 transmits a data request (DREQ) signal indicating that the disk memory 90 is ready, and an external terminate (EXT) signal indicating the completion of DMA transmission.

The flow of image signals in the DMA transmission is conducted in the following order:

(1) The CPU circuit block 10 supplies the I/O processor 80-1 with the CA signal through the signal line 80-101, thus requesting the DMA transmission:

(2) I/O processor 80-1 makes an access to the RAM (FIG. 5) in the CPU circuit block 10 through the signal line 80-104, address/data buffer block 80-4 and signal line 80-115 to obtain information on the read-out/write-in mode and on the address of the DMA transmission. In the following it is assumed that the read-out mode is identified:

(3) The I/O processor 80-1 makes an access to the buffer memory 20 through the signal line 80-104, address/buffer block 80-4, signal line 80-115, bus line 113 and muiti-bus line 20;

(4) Data of 16 bits read from the buffer memory 20 are supplied to the I/O processor 80-1 along the signal lines inverse to those in (3):

(5) The I/O processor 80-1 transfers the upper 8 bits, and then the lower 8 bits of said 16-bit data to the disk memory 90 through the signal line 80-104, address/data buffer block 80-4, signal line 80-116, internal bus 80-5 and data bus 80-140:

(6) The above-described steps (3) to (5) are repeated until the EXT signal appears on the signal line 80-143:

(7) The I/O processor 80-1 interrupts the function of the CPU circuit block 10 through the signal line 80-101, bus line 113 and multi-bus line 30, thus indicating the completion of the DMA transmission.

Figure 8:
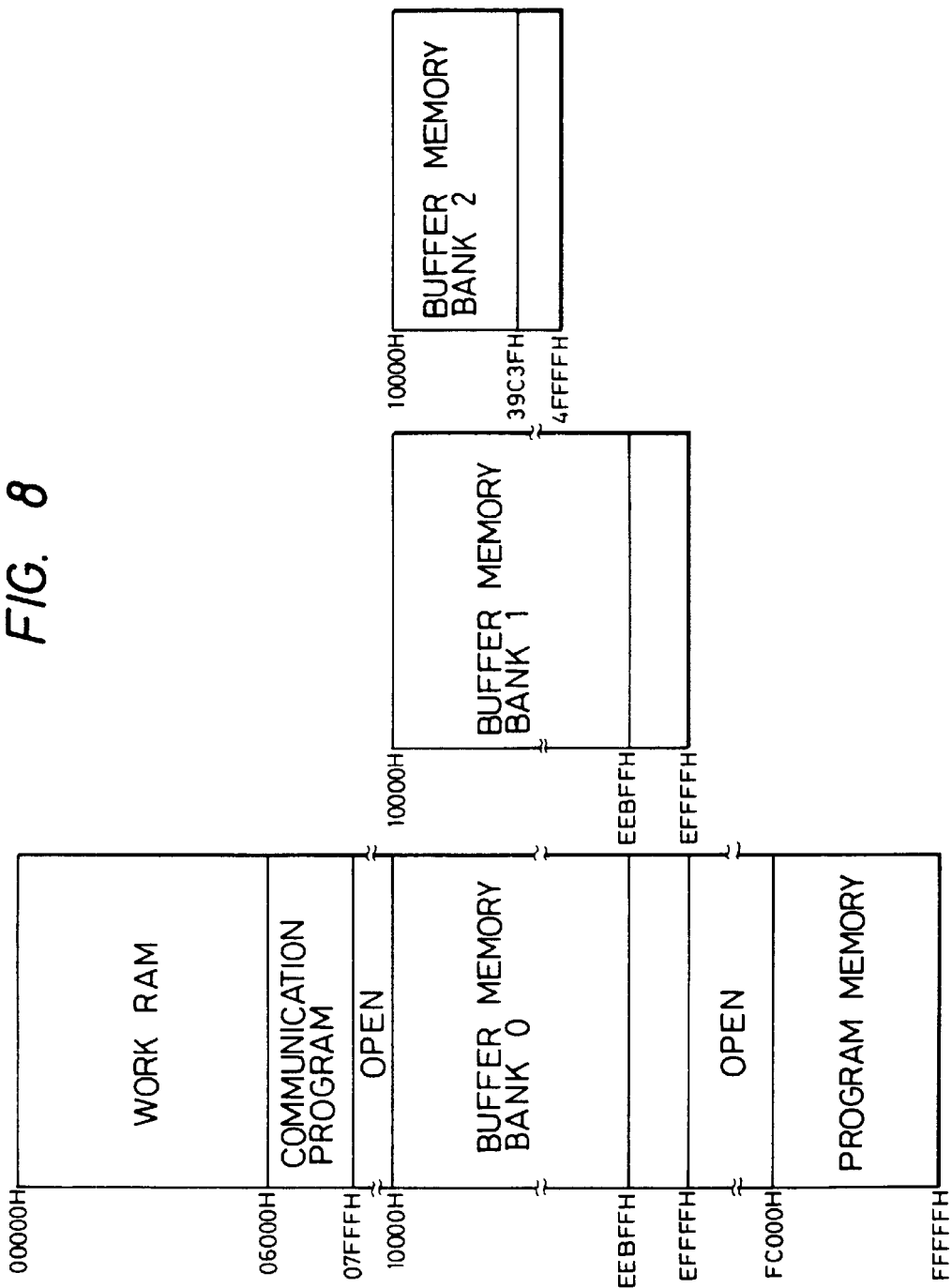
FIG. 8 is a chart showing an example of the multi-bus memory map.

Now there will be given an explanation on the memory space of the multi-bus line. FIG. 8 shows the memory map of the CPU circuit block 10, buffer memory circuit block 20 and DMA controller 80 relating to the multi-bus line 30. The multi-bus 30 has an address space of 1 megabytes from 00000H to FFFFFH as a mapped memory space, which is divided, as shown in FIG. 8, into an area of FC000H to FFFFFH as a program memory space of the CPU 10-1 of the CPU circuit block 10, an area of 10000H to EFFFFH as a bank space of the buffer memory to be explained later, an area of 06000H to 07FFFH as a program space between the CPU circuit block 10 and the DMA controller 80, and an area of 00000H to 05FFFH as a work RAM space for the CPU circuit block 10. Each address space will be explained in the following.

The program memory space is used as the memory space for the RAM 10-3 provided in the CPU circuit block 10 and used for storing the control program of the present apparatus.

The bank space of the buffer memory has a capacity of 896 kilobytes from 10000H to EFFFFH, which is smaller than the memory capacity of 1995840 bytes required for the buffer memory circuit block 20 as explained in the foregoing. For this reason the buffer memory is divided into three banks 0, 1 and 2, which are selected by a bank switching signal supplied from the CPU circuit block 10 through the signal line 132 (FIGS. 4 and 6-2), and thus selected banks are allotted to the memory map as shown in FIG. 8. The procedure of said division and allotment will be explained later in relation to FIGS. 9-1 and 9-2.

The communication program space utilizes a capacity of 8 kilobytes in the RAM 10-3 of 32 kilobytes in the CPU circuit block 10. The work RAM space utilizes the remaining capacity of 24 kilobytes in said RAM 10-3.

Figures 1, 9:
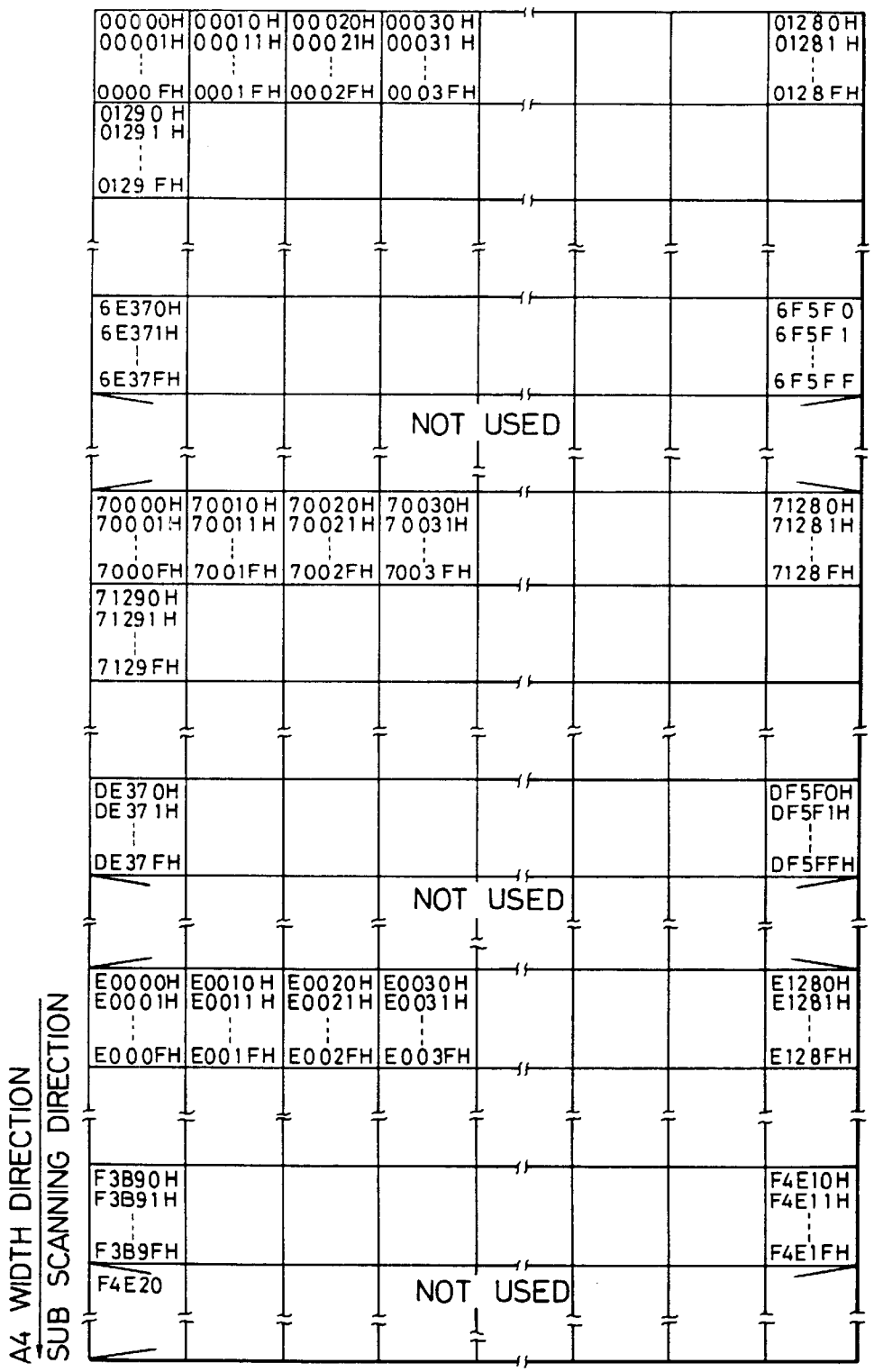
Figures 2, 9:
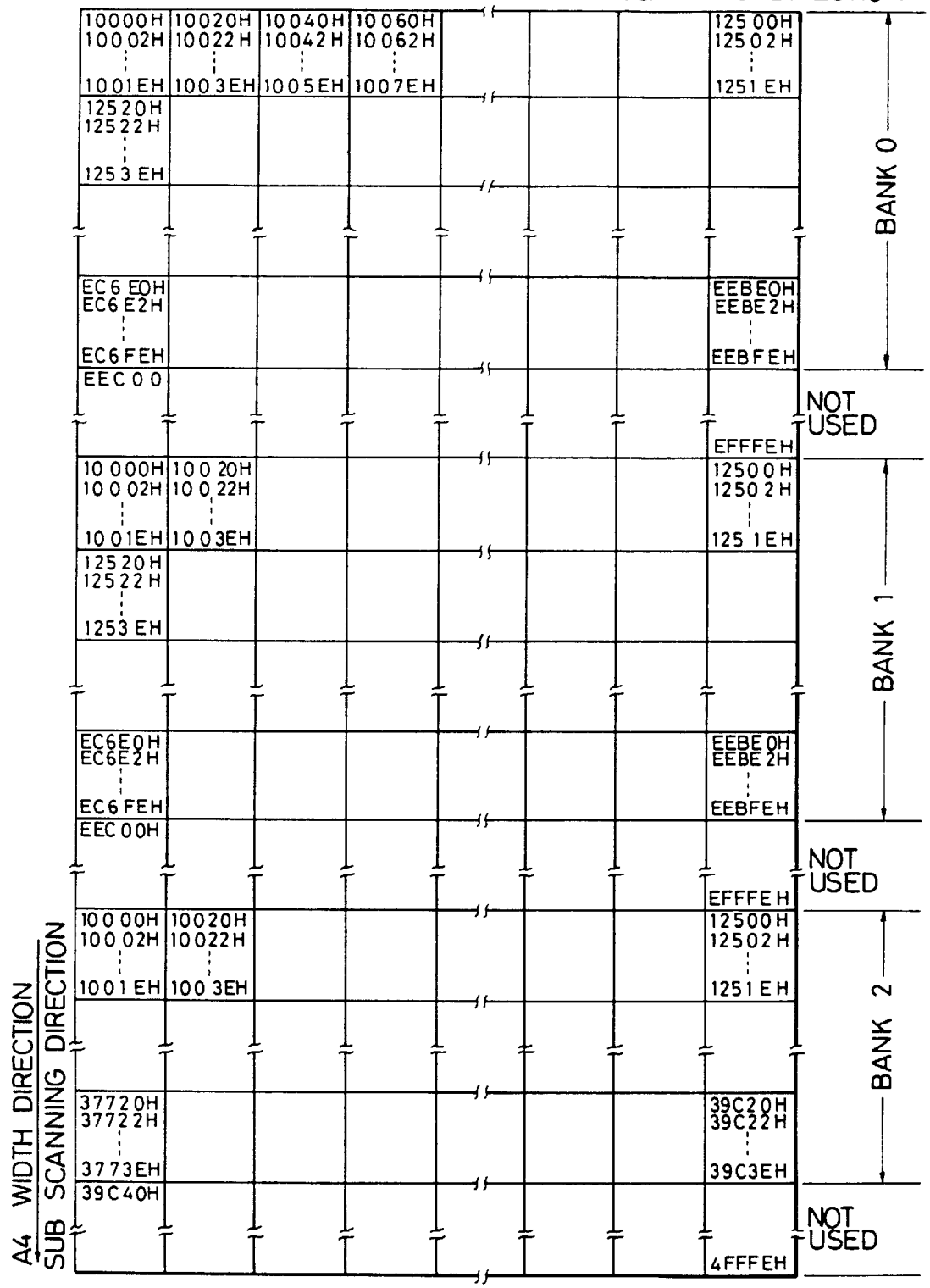

FIG. 9-1 shows the address map of the buffer memory 22 provided in the buffer memory circuit block 20 and having a memory capacity of storing the information of an original of A4 size (297×210 mm) with a resolving power of 16 pixels/mm. The reader unit 500 performs the main in the direction of longer side of said A4-sized original, whereby the CCD's 570, 580, 590 read said original with a resolving power of 16 pixels/mm and provide the image processing control unit 100 with pixel signals of 4752 bits per scanning. The subsidiary scanning of the reader unit 500 is effected in the direction of shorter side of the a original, wherein the CCD's 570, 580, 590 have a resolving power of 16 lines/mm, so that the original is scanned by 3360 lines in said direction. Consequently the original of A4 size is divided into 159966720 pixels, and the image processing control unit 100 receives the serial signals of 4752 bits 3360 times.

The image signals supplied in this manner are stored in the buffer memory 22 in the following procedure. The original of A4 size is divided into 62370 square unit blocks of 1 mm×1 mm each. Each unit block contains image signals of 16 bits by 16 lines, or 256 bits. Pixels of 16 bits in the longitudinal direction constitute a word having an address. Consequently a unit block is composed of pixel groups of 16 addresses. The serial image signals of 4752 bits in the first line, to be scanned at first, in the original are supplied to the image processing control unit 100 in the unit of a group of 16 pixels corresponding to a length of 1 mm on the longitudinal direction on the original. A first group of pixel signals of 16 bits is stored in an address 00000H of the buffer memory 22, and a second group of 16 bits is stored in an address 00010H. The following groups are stored in a similar manner in addresses 00020H, 00030H, . . . , 01280H.

This addressing for each line in the buffer memory 22 is achieved, as explained before, by setting an initial value in the address counter 21-6 through the CPU circuit block 10. The supply of image signals from the buffer memory 22 to the printer unit 600 is also achieved in the unit of 16 bits from a designated initial address in the same manner as in the storage of image signals.

The image signals of 4752 bits in the second line are stored in the same manner in addresses from 00001H to 01281H. In this manner the image signals of 1536 lines from the 1st to 1536th line, corresponding to a width of 96 mm, are stored in addresses from 00000H to 6F5FFH, and this bank space is called the bank 0 in the buffer memory 22.

Subsequently the subsequent 1536 lines, from 1537th to 3072nd line, are stored in a similar manner in addresses from 70000H to DF5FFH, which constitute the bank 1 in the buffer memory 22. Then the subsequent 288 lines, from 3073rd to 3360th line, are stored in addresses from E0000H to F4E1FH, which constitute the bank 2 in the buffer memory 22.

The above-described procedure of storing image signals of a word with an address allows to store the entire area of the original of A4 size in consecutive addresses in the buffer memory 22, with unit square blocks of 1 mm×1 mm. Thus, in case the operator registers an image processing area in the disk memory 90 in the unit of millimeter through the console 200, a high-speed DMA transmission of image signals without passing through the CPU circuit block 10 is rendered possible simply by designating the first and final addresses of said area.

More specifically, a designation of a set of the first and final addresses enables the DMA transmission of image signals of a width of 1 millimeter. Consequently the DMA transmission can be achieved with fewer address settings and can therefore be conducted faster.

Also such procedure of image signal storage is particularly effective for image editing with extracted image signals, since the image signals to be extracted have consecutive addresses from right to left in a width of 1 mm. As an example, the extraction of image signals covering a length of 20 mm in the longitudinal direction can be achieved with twenty address settings by the CPU circuit block 10.

Besides, at the image editing, the operator can conveniently designate the positions on the original in the unit of millimeter, since the addresses correspond to the positions on the original image in the unit of millimeter. In the present embodiment an address is allotted to 16 bits in the longitudinal direction since the CCD's 570, 580, 590 employed therein have a resolving power of 16 bits/mm, but the number of bits per address may naturally be selected otherwise according to the ability of the CCD's, and a similar effect can naturally be obtained if each address is defined in terms of another unit, for example in terms of inches.

FIG. 9-2 shows an address map of the buffer memory 22 seen from the multi-bus line 30. The address space from 00000H to 6F5FFH constituting the bank 0 in the buffer memory 22 in FIG. 9-1, the address space from 70000H to DF5FFH constituting the bank 1 and the address space from E0000H to F4E1FH constituting the bank 2 respectively correspond to address spaces of 10000H to EEBFEH, 10000H to EFBFEH and 10000H to 39C3EH on the multi-bus as shown in FIG. 8. The multi-bus 30 is equipped with a 16-bit data bus and a 20-bit address bus, and has an ability of making access to an area of 1 megabytes, or to $10^6$ 8-bit data. In case of access to 16-bit data occupying 2 addresses, the 16-bit data are allotted consecutive even addresses, and the input or output of 16-bit signals is enabled only when an access is made to an even address.

The actual addresses of the buffer memory circuit block 20 shown in FIG. 9-1 are converted by the address converter 21-26 provided therein as explained before to the addresses shown in FIG. 9-2. In this manner it is rendered possible to select the address area of the buffer memory 22 in an arbitrary address space.

Figures 1A, 1B, 10:
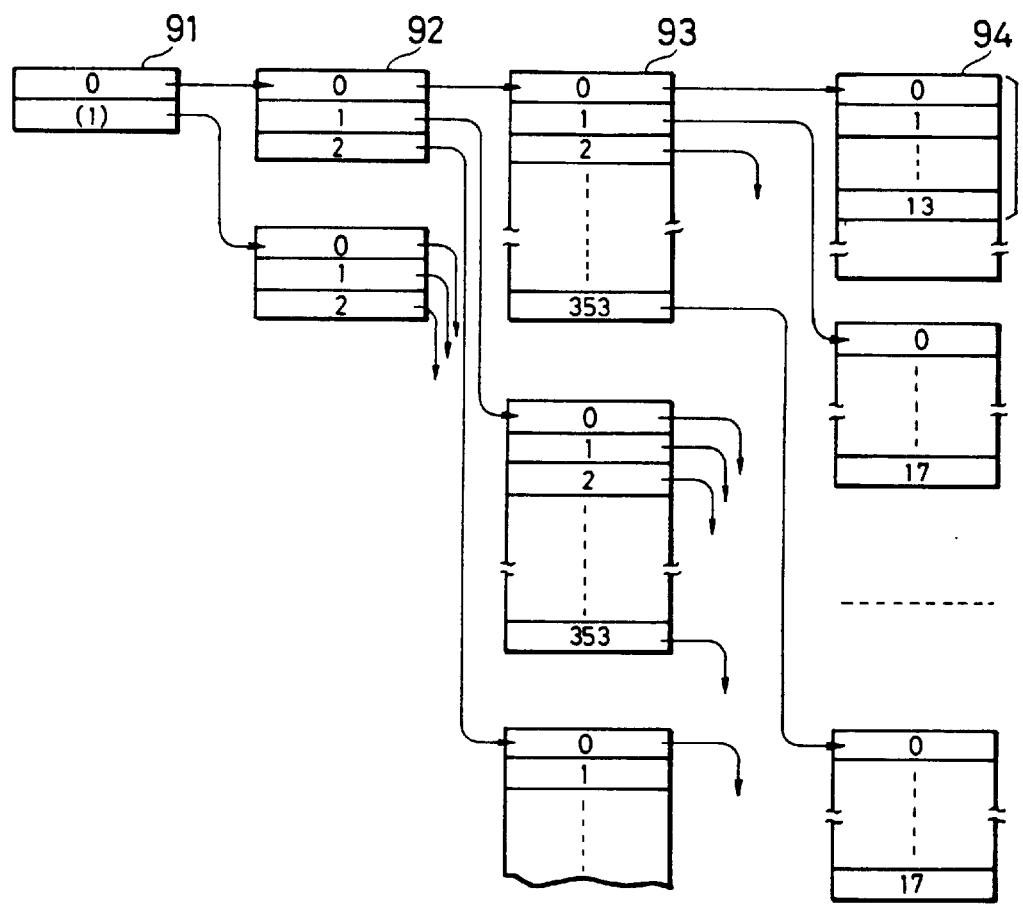
Figures 2, 10:
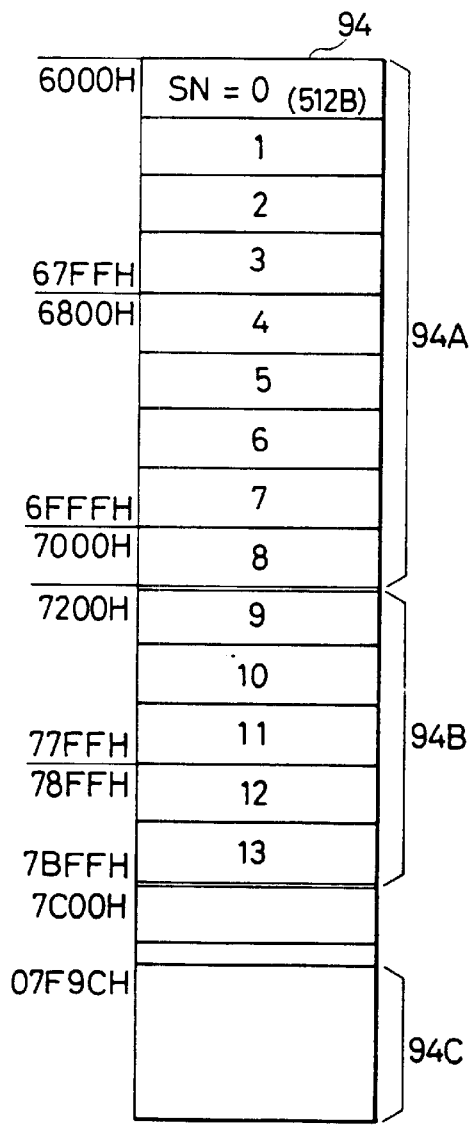
Figures 3, 10:
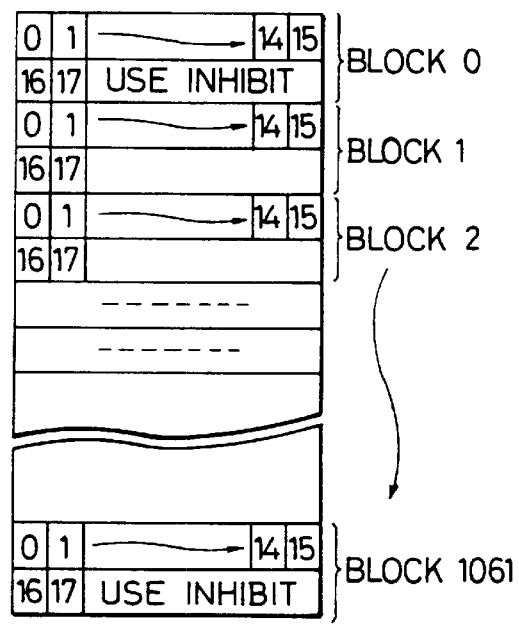
Figures 4, 10:
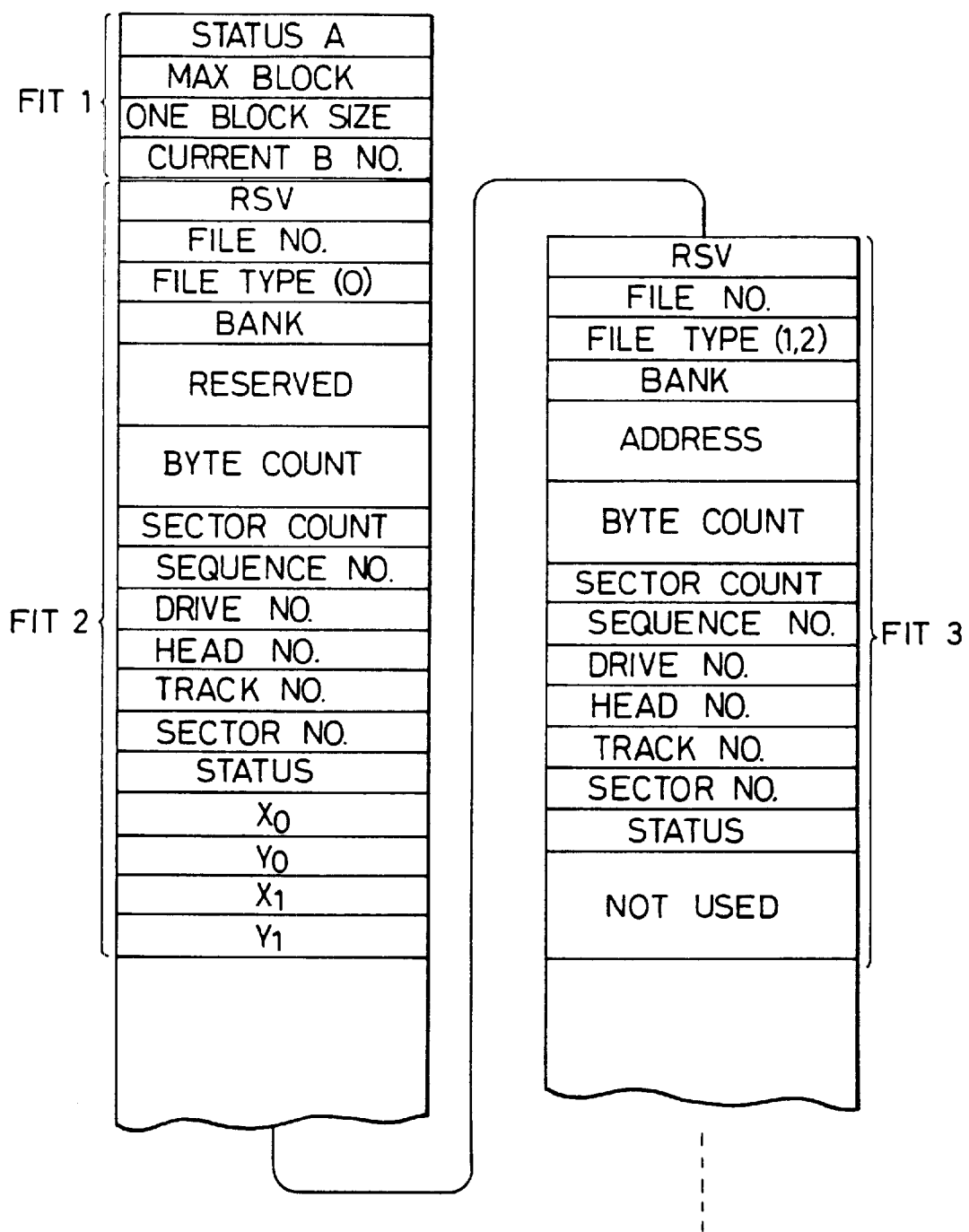
Figures 5, 10:
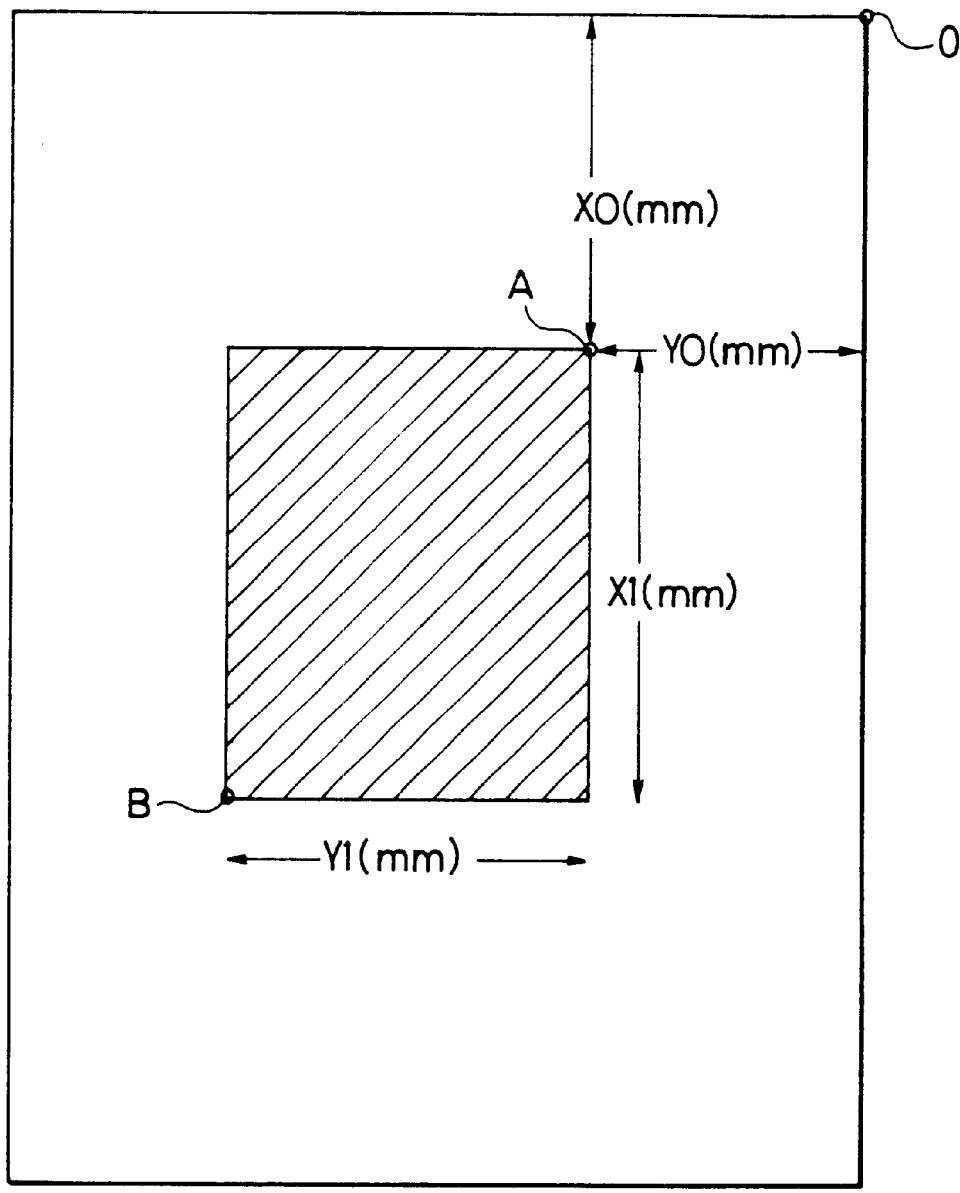

FIG. 10-1A shows the address structure of the disk memory 90, in which disk drives 91 are numbered as 0, 1, . . . In the present embodiment there is employed only one drive 0. The disk drive 91 is equipped with three heads 92, each covering 354 tracks 93, each of which is composed of 18 sectors 94, each of a memory capacity of 512 bytes. Consequently the disk memory 90 has a memory capacity of approximately 10 megabytes.

In such disk memory 90, continuous access to the data is made by changing the addresses in the disk memory 90 according to a determined sequence as shown in FIG. 10-1, wherein sequence number SN, head number HN and track number TN are correlated by the following equation (1):

$$SN=3\times TN+HN \tag{1}$$

wherein HN=0–2 and TN=0–353. Thus the track number TN and the head number HN are determined for a given sequence number SN, and the head 92 and the track 93 to be used in a succeeding access are determined corresponding to a sequence number SN+1 stepwise increased from the preceding sequence number SN. Access to the sectors 94 in a track 93 is conducted in the increasing order of the sector number SCTN.

FIG. 10-2 shows an index table provided in a determined area in the disk memory 90 and used for controlling the status of use thereof. In the present embodiment, sectors SCTN=0–13 in a track TN=0 for a head HN=0 are assigned as the area of said index table, in which sectors SCTN=0–8 are designated as a sector bit map table 94A indicating the status of use of each sector in the disk memory 90 while sectors SCTN=9–13 are designated as a file index table for file administration. Signals of the sectors SCTN=0–13 are transferred to a fixed area 6000H–7BFFH of the RAM 10-3 according to an open program for writing the index table into the RAM 10-3 of the CPU circuit block 10, and, after a determined processing, are written into the disk memory 90 again according to a closed program for storing a determined area of the RAM 10-3 into the disk memory 90.

The sector bit map table 94A is divided, as shown in FIG. 10-3, into 1062 blocks of 4 bytes each, which are successively allotted to the sequence numbers SN=0–1061 and each of which stored data indicating the status of use of a track or 18 sectors, by means of a 1-bit signal for each sector. More specifically a sector bit stores "1" or "0" respectively when the corresponding sector is already used or not.

When a new data file is to be registered in the disk memory 90, a continuous empty area including a number of sectors required for said registration, then the sequence numbers SN and the sector numbers SCTN corresponding to said area are found, and signals "1" are stored in the sector bits corresponding to said sectors. On the other hand, in case of erasing a data file, signals "0" are stored in the corresponding sector bits. However, signals "0" are previously stored in the bits corresponding to the index table or the block 0, thereby prohibition erroneous entry of a data file into the index table.

The file index table controls three different files, i.e. image data file, application file and control program of the present system, to be stored in the disk memory 90. FIG. 10-4 shows the status of control of such files by the file index table, in which the file type 0 or 2 respectively indicates an image file or an application file.

A file index block FIT1 consists of 4 blocks of 2 bytes each, which are named as STATUS A, MAX BLOCK, ONE BLOCK SIZE and CURRENT B NUMBER, and is formed at the initializing of the disk memory 90 for storing data indicating the status of use of the entire file index table. The block STATUS A is used when the system is expanded but is not used in the present embodiment. The block MAX BLOCK stores data indicating the total number of the files which can be registered in the disk memory 90, said number being selected as 50 (or 32H) in the present embodiment. The block ONE BLOCK SIZE indicates the length per file of index of various data relating to said file, said length being selected as 38 (or 26H) bytes in the present embodiment. The block CURRENT B NUMBER stores the number of files already stored in the disk memory 90. At the registration of a new file, said number is compared with the number stored in the block MAX BLOCK, and, if the former number is smaller than the latter, the new file registration is permitted with an increment of the former number, while such new registration is prohibited if the former number is equal to or larger than the latter. On the other hand, at the erasure of a file already registered, the number stored in the block CURRENT B NUMBER is reduced by one simultaneously with said erasure.

File index blocks FIT2 and FIT3 respectively for the file type 0 and 2 store data of 38 bytes each. In these blocks, there are provided a 2-byte area RSV for use in the system expansion but not in use in the present embodiment; a 2-byte area FILE NO. for identifying the file number arbitrarily determined by the operator in a range from 1 to 99; and a 2-byte area FILE TYPE for storing data indicating the above-mentioned file type "0" or "2". A 2-byte area BANK and a 4-byte area ADDRESS in the block FIT 3 store data indicating the bank and the address of the RAM 10-3 in the CPU circuit block 10 for use in allocating the application file in the RAM 10-3. A 6-byte area BYTE COUNT stores data indicating the data length of the registered files.

There are further provided a 2-byte area SECTOR COUNT for storing data indicating the number of sectors to be used by the registered file; 2-byte areas SEQUENCE NO., DRIVE NO., HEAD NO., TRACK NO. and SECTOR NO. respectively store the sequence number, drive number, head number, track number and sector number at the leading end of the storage area of the registered file. 2-byte areas X0, Y0, X1 and Y1 in the block FIT2 store coordinate data indicating the position, on the copy sheet, of the editing area of the image information, in case of the file type "0". As shown in FIG. 10-5, an original is placed on an original support area 240, and a closest point A and a farthest point point P in the hatched editing area with respect to an original point O are indicated by the stilus pen 280, whereby the coordinates X0 and Y0 of the point A as well as the longitudinal length X1 and the transversal length Y1 of the editing area are determined and stored in hexadecimal numbers in the aforementioned areas X0, Y0, X1 and Y1. In the block FIT3 for the file type 2, the areas corresponding to the areas X0, Y0, X1 and Y1 in the block FIT1 are not used.

In case of transferring an image data file from the disk memory 90 to the buffer memory 20, the corresponding file number is at first designated whereby the index table is transferred by the open program to the RAM 10-3 to obtain the index block corresponding to the designated file number. Then the address in the buffer memory 22 is calculated from the data stored in the areas X0, Y0, X1 and Y1 of said index block, whereby the image signals stored in the disk memory 90 is supplied by DMA transmission to a corresponding area of the buffer memory 22.

A change in the position of the editing area on the copy sheet can be achieved by modifying the data X0 and Y0 through the console 200 by means of a modifying instruction to be explained later, as the data X1 and Y1 remain unchanged in this case.

The disk memory 90 also stored the control program of the present system as a file type 1, of which corresponding file index block is constructed same as the block FIT3.

Figure 11A:
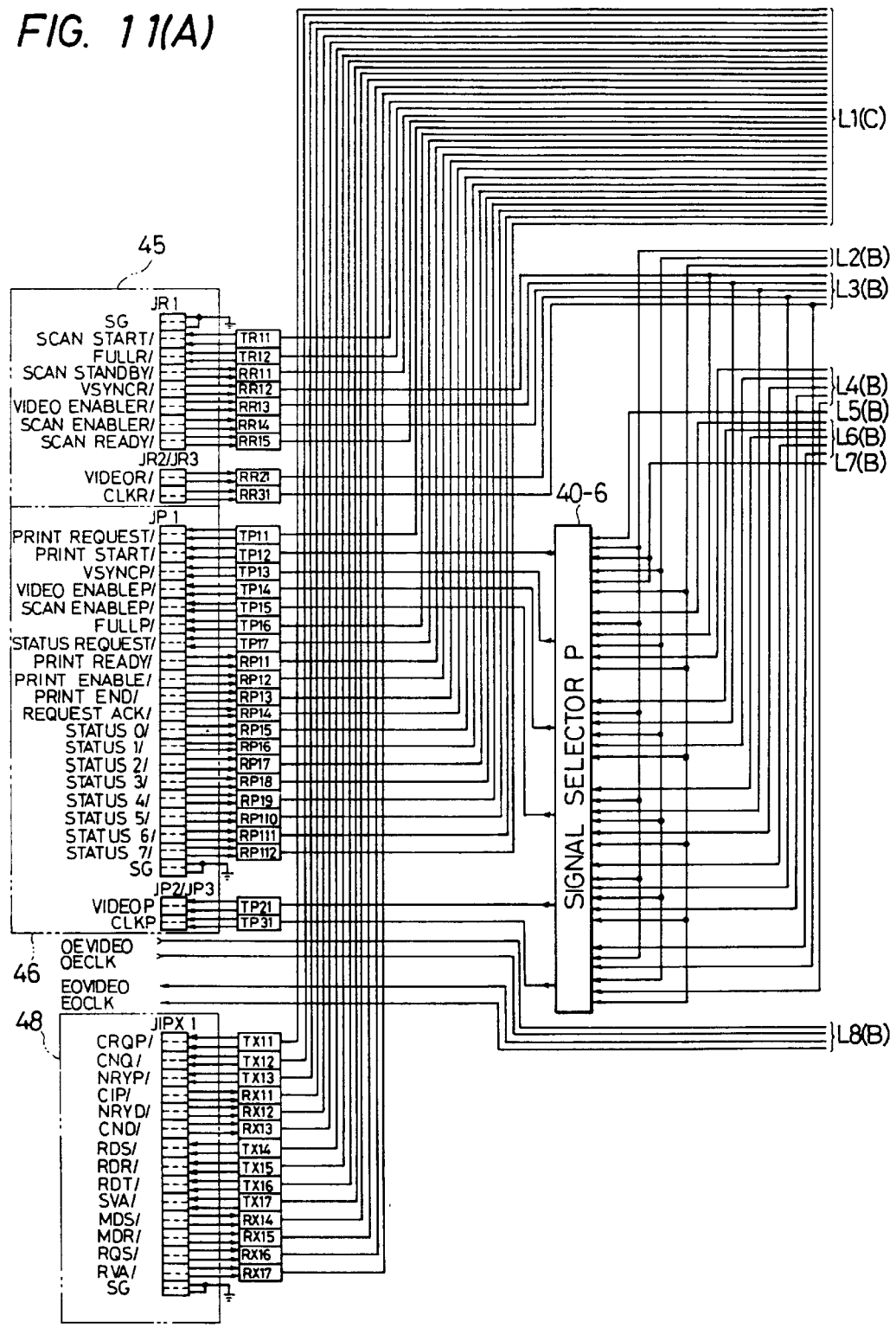
FIGS. 11A, 11B and 11C are block diagram, divided into three parts, showing an example of a circuit including an exchanger and an optical fiber interface.
Figure 11B:
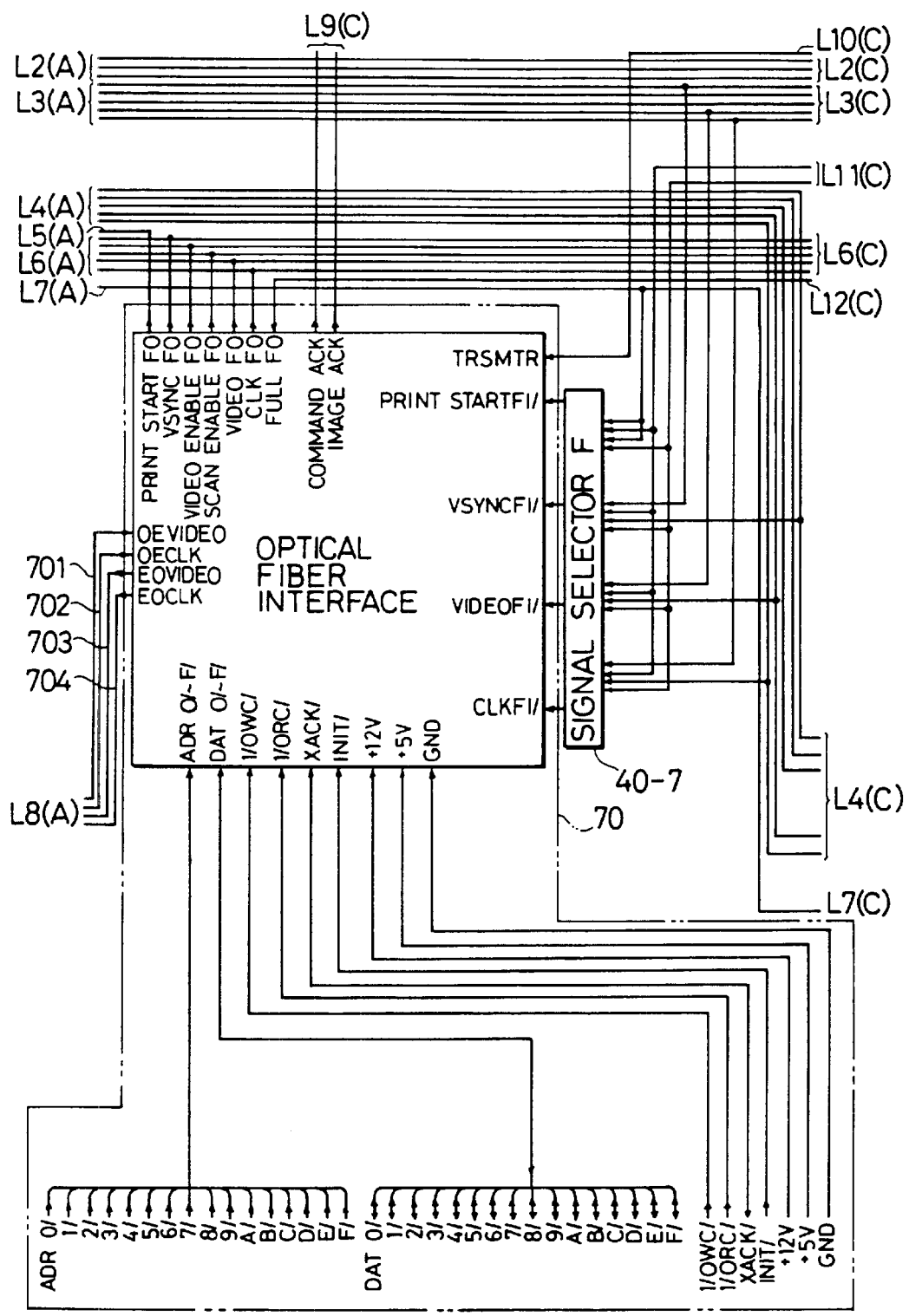
Figure 11C:
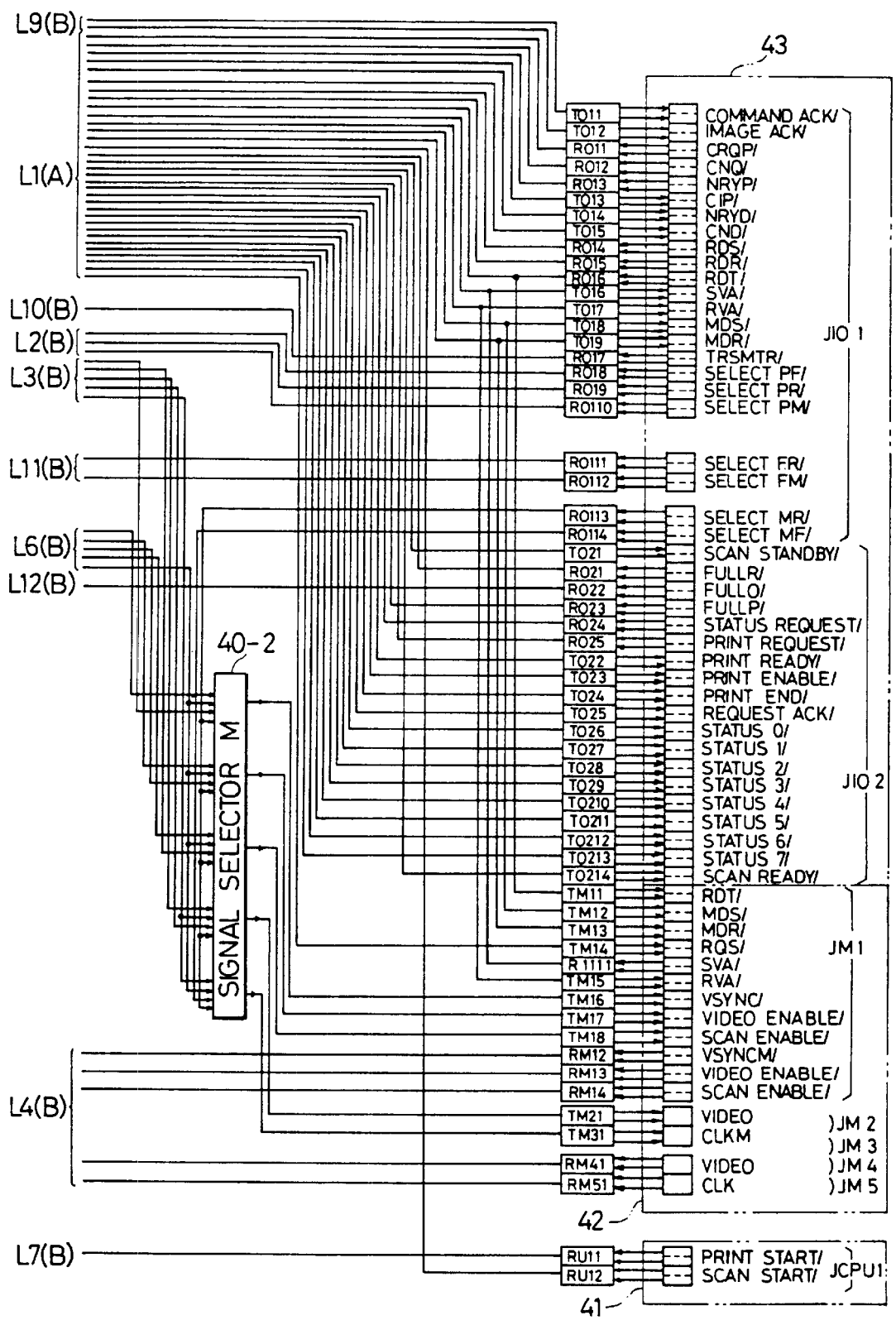

Now there will be given an explanation on the exchange. FIGS. 11A, 11B and 11C are block diagrams, divided into three portions, of a circuit including the exchange 40, optical fiber interface 70 etc., wherein the symbols L1–L12 indicate signal lines or groups of signal lines, and the ensuing parenthesized character (A), (B) or (C) indicate that the corresponding signal line or group of signal lines is connected to a signal line or a group of signal lines appearing in FIG. 11A, 11B or 11C corresponding to said character.

In said circuit, a signal selector M40-2 is composed of an exchange for selecting various signals supplied from the optical fiber interface 70 and reader unit 500, and supplying image signals to a memory controller 21 of the buffer memory 22 for storage therein. A signal selector P40-6 is composed of an exchange for selecting various signals supplied from the buffer memory 20, optical fiber interface 70 1lo and reader unit 500 and supplying image signals to the printer unit 600 for the copying of said image signals. A signal selector F40-7 is composed of an exchange for selecting various signals supplied from the buffer memory 20 and reader unit 500 and supplying said signals to the optical fiber interface 70 for supply to the optical fiber network 700.

There are provided connectors 41, 42, 43, 45, 46 and 48 respectively for the CPU circuit block 10, buffer memory 22, I/O interface 56, reader unit 500, printer unit 600 and DDX interface 60, wherein a slash symbol "/", if attached to the symbol of a signal, indicates a negative logic signal.

There are employed following signals: a signal SCAN START for instructing the start of a scanning operation in the reader unit 500; a signal FULL designating the size (for example A3 or A4) of the copy image; a signal SCAN STANDBY to be released by the reader unit 500 indicating the stand-by state for scanning therein; a vertical synchronization signal VSYNC indicating the start of image signals; a signal VIDEO ENABLE indicating the effective output period of the image signals of a line; a signal SCAN ENABLE indicating the effective output period of the image signals of an original; a signal SCAN READY indicating the completion of preparation for scanning in the reader unit 500; an image signal VIDEO; and a clock signal CLOCK.

There are further employed a signal PRINT REQUEST for demanding a copying operation to the printer unit 600; a signal PRINT START for instructing the start of printing operation; a signal STATUS REQUEST requesting the output of the status of the printer unit 600; signals PRINT READY, PRINT ENABLE and PRINT END respectively indicating the completion of preparation, the period of printing operation and the completion of printing operation of the printer unit 600; an acknowledgement signal REQUEST ACK to be supplied by the printer unit 600 in response to the PRINT REQUEST signal; and 8-bit signals STATUS0–7 indicating the status of the printer unit 600, wherein a suffix R, P or M respectively indicates that the corresponding signal is released by or supplied to the reader unit 500, printer unit 600 or buffer memory 20.

A signal SELECT PF, SELECT PR or SELECT PM is supplied by the CPU circuit block 10 through the I/O interface 56 to the signal selector P40-6, which, in response, selects respectively the optical fiber interface 70, reader unit 500 or buffer memory 22. Similarly a signal SELECT FR or SELECT FM causes the signal selector F40-7 to respectively select the reader unit 500 or buffer memory 20. Also a signal SELECT MR or SELECT MF causes the signal selector M40-2 to respectively select the reader unit 500 or buffer memory 22.

Simultaneous output of the image signals from the reader unit 500 to the printer unit 600 of the present system and to a printer unit of another system on the optical fiber network 700 can be achieved by simultaneous activation of the signals SELECT PR and SELECT FR by the CPU circuit block 10. Also simultaneous output of the image signals from the buffer memory 22 to the printer unit 600 and to a printer unit of another system on the optical fiber network 700 can be achieved by simultaneous activation of the signals SELECT PM and SELECT FM. Similarly the CPU circuit block 10 can set up plural paths for the image signals by arbitrarily designating the source and destinations of the image signals.

The connector 48 for the DDX interface 60 and the signal lines relating to the optical fiber interface 70 will be explained later.

Figures 1, 12:
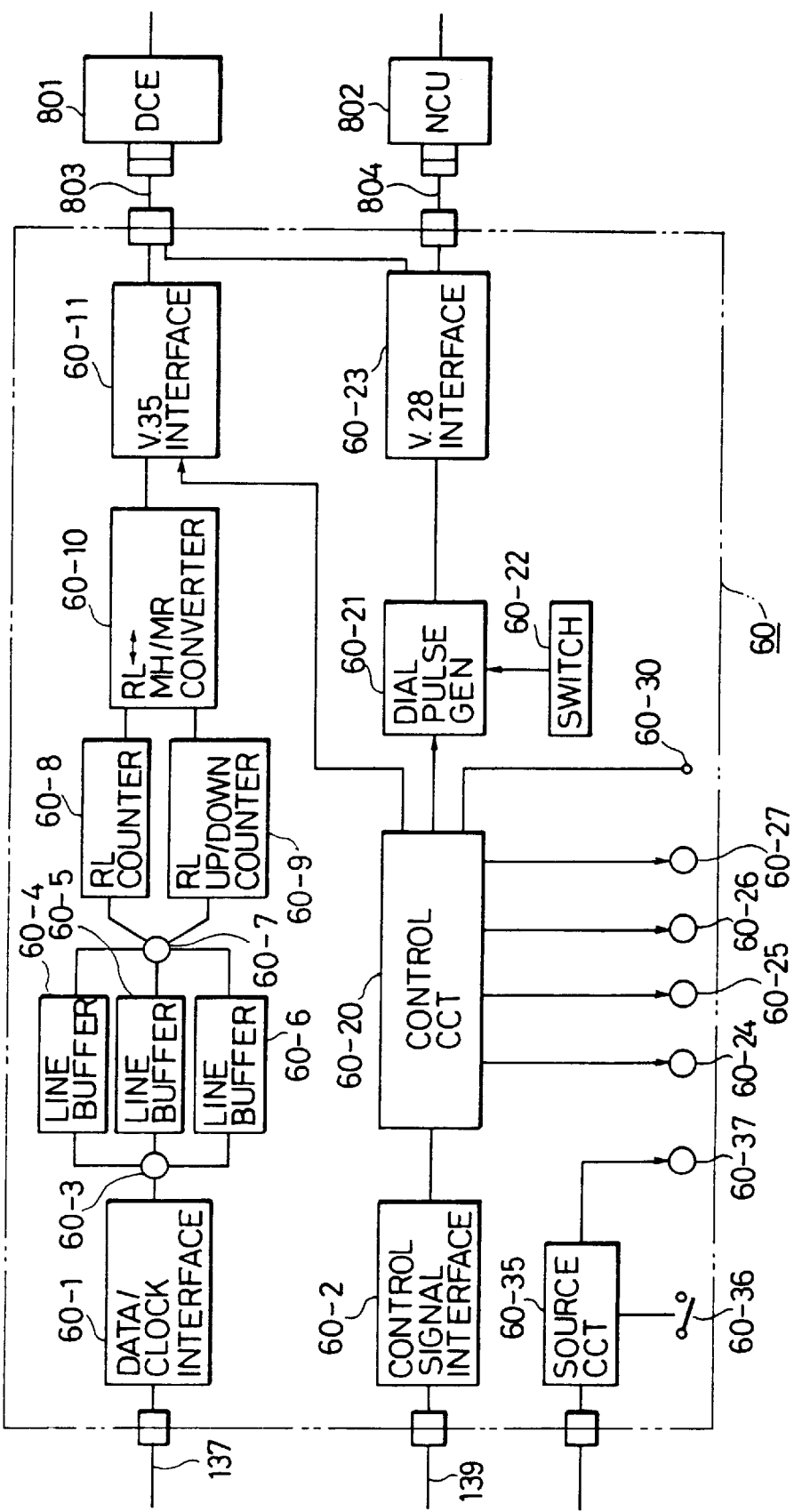
Figures 3, 4, 12:
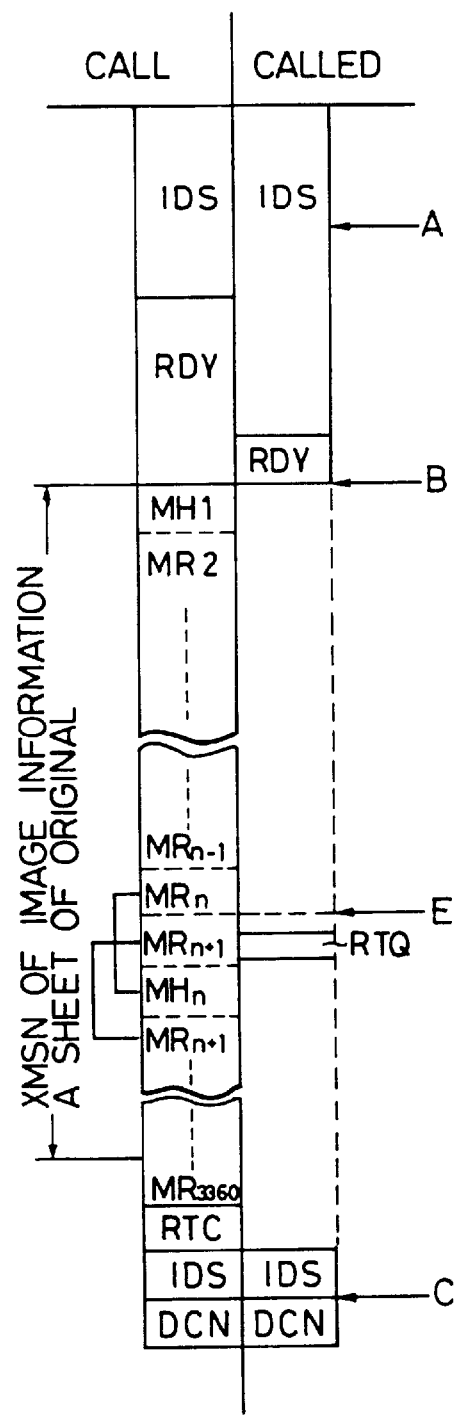
Figure 13:
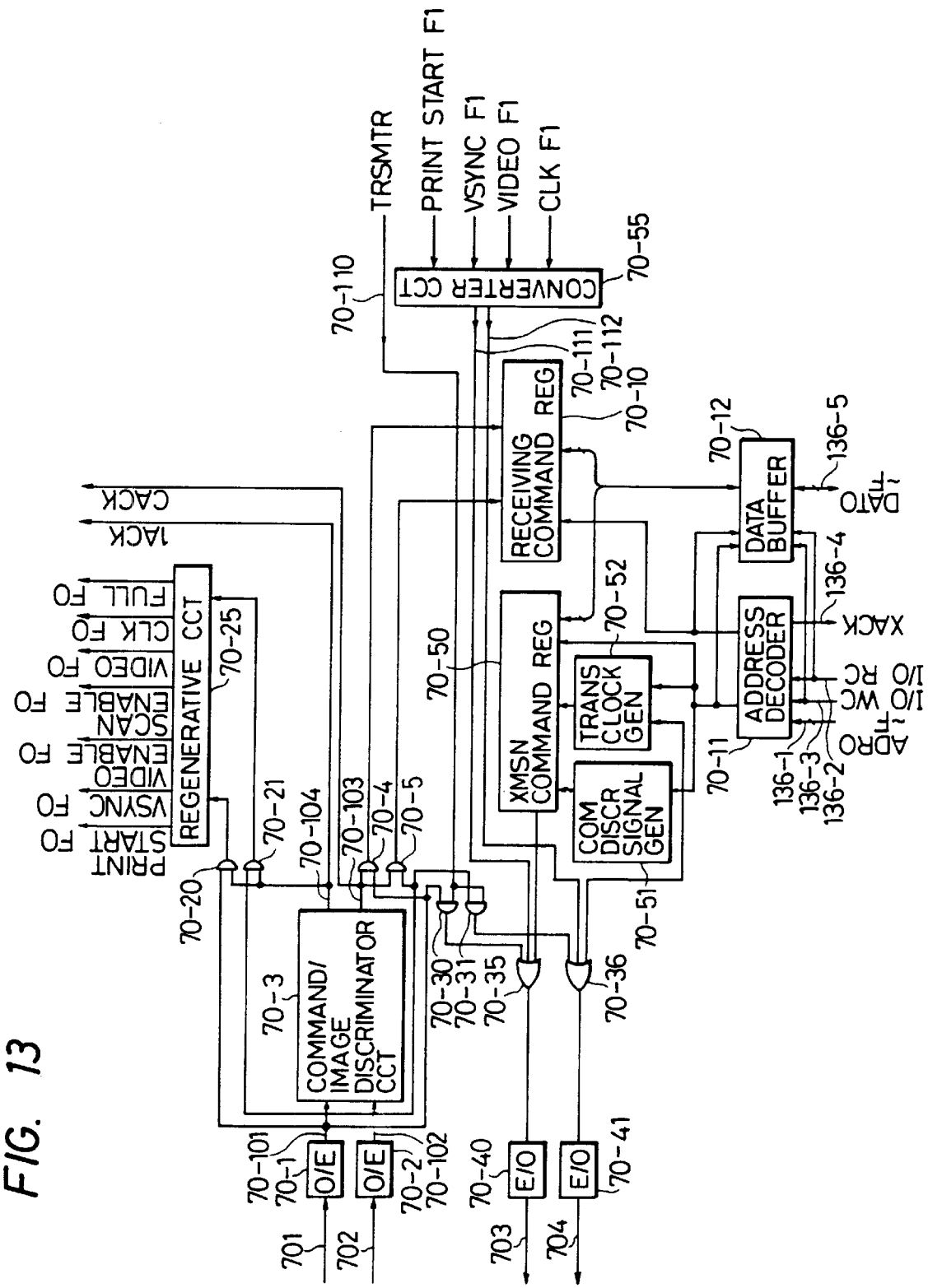
FIG. 13 is a block diagram showing an example of the optical fiber interface.

Now there will be given an explanation on the DDX interface. FIG. 12-1 is a block diagram showing an example of the DDX interface 60, wherein said DDX interface 60 is connected, through a data/clock interface 60-1 and a control signal interface 60-2, to a data/clock signal line 137 and a control signal line 139. There are also provided selectors 60-3, 60-7 and line buffers 60-4, 60-5, 60-6. As an example, in case of transmission of the image signals from the present system, the selector 60-3 functions as a write-in selector to achieve the storage of image signals by sequentially selecting the line buffers 60-4, 60-5 and 60-6. At the same time the selector 60-7 functions as a read-out selector for reading, during the storage of image signals into a line buffer, image signals from another line buffer and supplying said image signals to an RL counter 60-8 and an RL up/down counter 60-9.

An RL-MH/MR converter 60-10 converts the run length of the image signals of a line supplied from the RL counter 60-8 into one-dimensional modified Huffman (MH) codes, also converts the run length of the image signals of a line into two-dimensional modified Read (MR) codes by counting the relative position from a reference pixel to be supplied from the RL up/down counter 60-9, and supplies the obtained image data to a V.35 interface 60-11 after compression, which is a connecting circuit provided between the DDX line and the DDX interface 60.

A control circuit 60-20 controls the DDX transmission by suitably transmitting various control signals, to be supplied by the image processing unit 10 through the signal line 139 and a control signal interface 60-2, to the V.35 interface 60-11, and controls various units of the DDX interface 60.

A dial pulse generator 60-21 transmits a destination code for the image signals supplied from the control circuit 60-20 or from a dial setting test switch 60-22 to a V.28 interface thereby designating the destination.

Indicator lamps 60-24, 60-25, 60-26 and 60-26 respectively indicate the completion of preparation of the DDX interface 60, completion of connection with another system, transmission to another system and reception from another system.

An error count check line 60-30 transmits a signal for disconnecting the communication line from the control circuit 60-20 to the CPU circuit block 10 in case the number of errors counted by said control circuit 60-20 during a communication between the present system and another system reaches a determined value.

There are also provided a power supply circuit 60-35 for the DDX interface 60, a power switch 60-36 and an indicator lamp 60-37 for indicating the power supply.

A line terminal equipment (DCE) 801 instailled by the Telegram and Telephone Corporation of Japan is connected to the DDX interface 60 for converting the signals therefrom into signals suitable for transmission in the network, and transmitting the signals from the network to the DDX interface 60. In the present embodiment, said DEC 801 is composed of a model D-232 home-use terminal equipment. A network control unit (NCU) 802 connected to the DCE has the functions of controlling the connection and disconnection of the network, and is composed of a model NCU-21 capable of automatic transmission and automatic reception. The DCE 801 is connected through a connecting cable 803 to the V.35 interface 60-11 and to the V.28 interface 60-23, while the NCU 802 is connected through a connecting cable 804 to the V.28 interface 60-23.

The procedure of image signal transmission to another system with MH and MR encoding follows the T4 recommendation of CCITT, with the following considerations:

(1) In the present system, the maximum run length obtained when an entire line is composed of white or black pixels alone is equal to 4752 and exceeds the maximum expression range 2623 (=2560+63) of the expanded MH code since the scanning line runs along the longitudinal direction of the A4-sized original with a resolving power of 16 bits/mm: and (2) In the present system, the transmission is effected by a two-dimensional encoding with an infinite parameter K, namely by MH encoding the first line of an A4-sized original and by MR encoding the remaining 3359 lines.

With respect to the point (1), the scanning line is taken along the longitudinal direction in order (i) to reduce the time required for transmission by decreasing the number of lines to be transmitted, and (ii) to reduce the moving distance of the sensor in the subsidiary scanning direction thereby compactizing the reader unit 500.

With respect to the point (2), the parameter K is selected as infinite in order to avoid repetition of the MH encoding at every K cycles required when a small finite parameter K is employed. The use of such infinite parameter K is permitted since the image signals to be transmitted are already digitized in the CCD driver 50 and stored in the buffer memory 22, so that the use of a small finite parameter K for reducing the reading error is meaningless.

The transmission of image signals from the present system to another system through the DDX line 800 is conducted in the following manner.

At first, the image signals of a line (4752 bits) supplied from the buffer memory 22 and through the signal line 137 are transferred, through the data/clock interface 60-1 and the write-in selector 60-3, to a line buffer 60-4, 60-5 or 60-6 at a transfer rate of 1 bit per 0.1 microseconds, in synchronization with clock signals of 10 MHz. The time required for transmitting the image signals of a line is therefore 475.2 $\mu$sec. The image signals of the first line transmitted first are stored by the selector 60-3 in the line buffer 60-4, and, upon completion of said storage, the selector 60-7 opens the gate of said line buffer 60-4 while closes the gates of the line buffers 60-5 and 60-6. Thus the stored image signals are supplied to the RL counter 60-8 for counting the run lengths of white and black images, and said image signals of the first line are converted into the MH codes by the RL-MH/MR converter 60-10 according to the result of said counting. During the output of the image signals from the line buffer 60-4, the selector 60-3 closes the gates to the line buffers 60-4 and 60-6 while opens the gate to the line buffer 60-5 to supply the image signals of the second line thereto. If the image signals of the first line are all converted into the MH codes, the image signals of the second line are supplied by the selector 60-7 to the RL up/down counter 60-7 for counting the relative positional change from the first line and are converted into the MR codes in the RL-MH/MR converter 60-10. The image signals of the third line to be supplied to the line buffer 60-6 are processed in the same manner as those of the second line, and thereafter the image signals down to the 3360th line on the A4-sized original are converted, as they are released from the line buffers 60-4, 60-5 and 60-6, into the MR codes through the RL up/down counter 60-7 and the RL-MH/MR converter 60-10.

The image signals supplied in the form of run length codes to the RL-MH/MR converter 60-10 are compressed by MH or MR encoding.

In the present system the expanded MH codes are further expanded in the following manner since the maximum run length 4752 of the present system exceeds the maximum expression range 2623 of the expanded MH codes are already explained in the foregoing:

(1) Run length RL<2560:

In this range normal MH codes are used. Thus a run length in a range RL<64 is represented by a terminating code, and a run length in a range 64≦RL<2560 is represented by a make-up code and a terminating code:

(2) Run length RL≧2560:

In this range the encoding is achieved in the following cases (a) and (b), using a make-up code "00000001111" for a run length 2560 as a special code:

(a) Case of 2560≦RL≦2623=2560+63:

A run length in this range is represented by a make-up code (for a run length 2560) and a terminating code as in the above-mentioned case (1);

of 2623<RL<4752:

A run length is represented by the make-up code for a run length 2560, followed by an additional make-up code and a terminating code. In this case (2), therefore, the make-up code for a run length 2560 is either followed by a terminating code of a same color [case (a)] or by a make-up code of a same color and a terminating code [case (b)]. In the following there are given some examples of encoding in this case (2), in which the underlined figures indicate the additional make-up codes:

Examples

2560=2560+0
2561=2560+1
2623=2560+63
2624=2560+64+0
4289=2560+1728+1
2752=2560+2176+16

In following there will be given an explanation on the functions of various signals flowing in the signal lines connecting the image processing unit 10 and the DDX interface 60 as shown in FIGS. 11A, 11B, 11C and 12-1.

FIG. 12-2 summarizes the signals, names thereof and direction thereof between the image processing unit 10 and the DDX interface 60. Lines FG and SG are grounding lines respectively for security and signal. A call request signal CRQP is used for requesting, from the image processing unit 10 to the DDX interface 60, a connection or call with another system, is deactivated simultaneously with the activation of a connection signal CND, and is disregarded when a connection disabled signal NRYD is activated. A call signal CIP is used to indicate, from the DDX interface 60 to the image processing unit 10, the arrival of communication from another system, and is handled same as the signal CRQP in relation to the signals CND and NRYD.

A dial number signal DLN is activated simultaneously with the signal CRQP to transmit 7-digit telephone number of another system.

A connection request signal CNQ is used to request the connection of a DDX line from the image processing unit 10 to the DDX interface 60, is activated simultaneously with the activation of the signal CRQP or CIP, and is disregarded when the signal NRYD is activated. Said signal CNQ is activated as long as a line is to be secured, and said line is disconnected when said signal CNQ is deactivated.

A reception disabled signal NRYP is activated when the image processing unit 10 is unable to become ready for transmission or reception within 6 seconds. The signal NRYD indicates that the line cannot be connected when the DDX line 800 is busy or when a not-ready switch of the NCU 802 is actuated. Said signal NRYD is constantly activated or deactivated according to whether the line connection is disabled or enabled. Also the image processing unit 10 identifies a disabled connection if the signal CND is not activated within a determined time after the activation of the signal CRQP.

The signal CND is activated when the communicating conditions between the present system and another system are satisfied in response to the activations of the signal CRQP or CIP and of the signal CNQ, thus indicating that the line connection is completed to enable the communication of the present system. The signal CND is deactivated when the signal CNQ is deactivated or when said another system disconnects the line. A transmission enabled signal RDS and a reception enabled signal RDR respectively indicate that the image processing unit 10 can reach, within 6 seconds, a state of sending or receiving image information of an A4-sized original, and said signal RDS or RDR is activated simultaneously with the activation of the signal CNQ.

A transmission mode signal MDS or a reception mode signal MDR indicates that the present system is set to a transmitting or receiving mode, which is determined according to the signals RDS and PDR of the calling system and of the called system. A transmission or a reception may be conducted immediately after the completion of a reception or a transmission.

A transmission enabled signal RDT is activated within 6 seconds after the activation of the signal MDS or MDR, and indicates that the transmission of the image signals in the sending or receiving mode is enabled.

A transmission data request signal RQS is activated and deactivated at regular intervals, whereby the DDX interface 60 requests, to the image processing unit 10, the transmission of image signals of a line. In response to the activation of said signal RQS, the image processing unit 10 activates a transmission data effective signal SVA to transfer the image signals of a line from the buffer memory 20 to the DDX interface 60. The signal RQS is deactivated simultaneously with the completion of transfer of said signals SDT. The interval of the signal RQS is selected longer than the minimum time required for transmission. The signal SVA is activated in response to the signal RQS to permit the sampling of the signals SDT in synchronization with the transmission clock signals SCK, and is deactivated at the completion of the transmission of the signals SDT. The signal RVA is activated at regular intervals to request the reception of image signals (RDT) of a line received from another system and extended in the DDX interface 60, and to permit the sampling in synchronization with reception clock signals RCK. The interval of the signal RVA is selected in a similar manner as in the signal RQS.

The signals SDT and RDT are respective transmitted and received binary (black/white) image signals, and the signals SCK and RCK are sampling clock signals for said signals SDT and RDT.

In the communication between the present system and another system on the DDX line 800, the direction of transmission is determined as shown in FIG. 12-3 according to the states of the signals RDS and RDR both in the calling system or station and in the called system or station, in order to prevent errors in the direction of transmission. In FIG. 12-3, a symbol "O" indicates the activated state of the signal, while an arrow represents the direction of transmission, and a symbol "X" indicates the deactivated state and the transmission disabled state. The transmission is directed from the called station to the calling station in case the signal RDR alone of the called station and at least the signal RDS of the called station are activated, and in case the signals RDS and RDR of the calling station and the signal RDS alone of the called station are activated. Also the transmission is directed from the calling station to the called station in case the signal RDS alone of the calling station and at least the signal RDR of the called station are activated, and in case the signals RDS and RDR of the calling station and at least the signal RDR of the called station are activated. Besides the transmission is disabled in other combinations of the signals RDS and RDR of the calling and called stations.

FIG. 12-4 shows an example of the procedure for making transmission between the calling station and the called station, wherein a transmission function identifying signal IDS is used for mutually exchanging the transmitting functions, namely the states of the signals RDS and RDR, of the calling and called stations. For example said signal has an 8-bit format "0000 RDS RDR 10" to be transmitted from the uppermost bit to the lowermost bit, and both stations determine the direction of transmission as shown in FIG. 12-3 based on the signals RDS and RDR of the present system and the other system.

A transmission ready signal RDY, for example of a format "00010010" to be transmitted in the same manner as the signal IDS, indicates the completion of preparation for transmission or reception of the image signals of an original in a direction of transmission determined by the exchange of the signals IDS.

There are also provided MH encoded image signals MH1 of the first line; MR encoded image signals MR2–MRn+1 (1≦n≦3360) of the 2nd to (n+1)-th lines; MH encoded image signals of the n-th line; and MR encoded image signals MRn+1–MR3360 of the (n+1)-th to 3360th lines, wherein the image signals MH1–MR3360 represent information of an A4-sized original.

A repeated transmission requesting signal RTQ is used for requesting, from the called station to the calling station, a repeated transmission, in case the received image signals of a line contains an error, namely in case said image signals demodulated in the called station are not equal to 0 or 4752 bits and are not accepted in the buffer memory 22.

A transmission end signal RTC, composed of the line end code EOL according to the recommendation T4 of CCITT followed by "1", is emitted from the calling station to indicate the completion of the transmission of image signals of an original.

A line disconnect signal DCN, for example of a format "01000010" is transmitted in the same manner as the signal IDS to mutually inform the disconnection of the line.

Immediately after a line is connected, the calling station and called station initiate repeated mutual transmission of the signal IDS at least 3 times until each station becomes ready for the transmitting mode. If the direction of transmission cannot be determined at a timing A (cf. FIG. 12-3), a state of disabled transmission is identified and both stations mutually send the signal DCN to disconnect the line. When each station becomes ready, it releases the signal RDY at least 3 times until both stations become ready. When both stations become ready and release the signal RDY (timing B), the called station enters the receiving state by terminating the transmission of the control signals while the calling station enters the transmitting state.

In case there is generated, in the course of transmission of image signals of an A4-sized original, a transmission error in the image signals of the n-th line for example at a timing E, the called station provides the calling station with the signal RTQ, in response to which the calling station transmits the image signals of the n-th line in the MH codes and those of the (n+1)-th to 3360th lines in the MR codes.

Upon completion of the transmission of the image signals in this manner, the calling station sends the signal RTC to the called station, and both stations then exchange the signal IDS. If the transmitting conditions are satisfied in this state as shown in FIG. 12-3, transmission of other image signals is started from the timing C. On the other hand, if said conditions are not satisfied, both stations exchange to disconnect the line.

Figure 14:
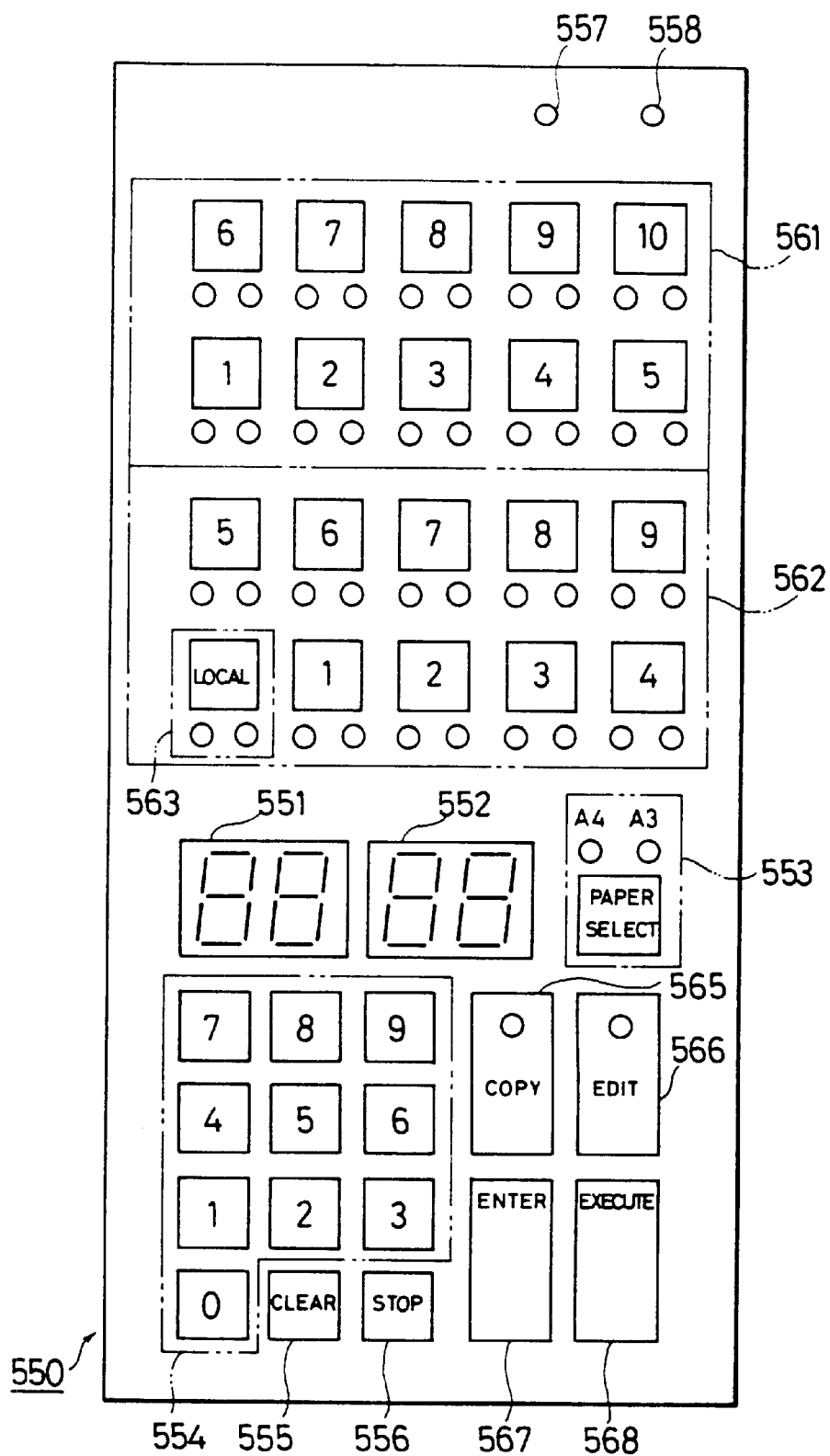
FIGS. 14 and 15 are plan views showing examples of key arrangement in a reader operating unit and in a printer status display unit.

FIG. 14 shows an example of the structure of the optical fiber interface 70. Optical video signals carrying the commands or image information and optical clock signals CLK synchronized with said video signals, transmitted from the optical fiber network 700 through optical fiber cables 701, 702, are respectively converted by optoelectric converters 70-1, 70-2 into electric signals, which are supplied through signal lines 70-101, 70-102 respectively to a command/image discriminating circuit 70-3 and AND gates 70-4, 70-20, 70-30 and to AND gates 70-5, 70-21, 70-31. Said command/image discriminating circuit 70-3 identifies whether the transmitted signal is a command indicating for example the original size, or the image information. More specifically the command/image discriminating circuit 70-3 identifies a command by a command code attached to the leading end of video signals representing a command, or identifies image information by clock signals of a determined frequency, for example 12.5 MHz, included therein.

Upon discrimination of a command in the transmitted video signals, the command/image discriminating circuit 70-3 supplies a command acknowledge signal CACK, during the reception of said command, through a signal line 70-103 to AND gates 70-4, 70-5 and to the CPU circuit block 10. Since the video signals and clock signals CLK are already supplied to the AND gates 70-4, 70-5 through signal lines 70-101, 70-102, in response to the signal CACK, said AND gates 70-4, 70-5 transmit the command signals and clock signals to a reception command register 70-10. Upon deactivation of the signal CACK at the termination of the command reception, the CPU circuit block 10 starts an interruption procedure to supply an address designating signal ADR through a signal line 136-1 and an address decoder 70-11 to the reception command register 70-10 thereby designating an address therein, and to supply an I/O read-out command signal I/O RC through a signal line 136-2 to a data buffer 70-12 thereby setting the same to the output mode. Through such operation the command stored in the reception command register 70-10 is read by the CPU circuit block 10 through the data buffer 70-12 and a signal line 136-5.

On the other hand, upon discrimination of image information in the video signals transmitted from the optical fiber network 700, the command/image discriminating circuit 70-3 supplies an image acknowledge signal IACK, during the reception of said image information, through a signal line 70-104 to AND gates 70-20, 70-21 and the CPU circuit block 10. Since the video signals and the clock signals CLK are already supplied to the AND gates 70-20, 70-21 through signal lines 70-101, 70-102, said AND gates 70-20, 70-21 supply the image signals and clock signals to a regenerating circuit 70-25 in response to said signal IACK. In response to an original size designating signal FULL FO supplied from the CPU circuit block 10, said regenerating circuit 70-25 regenerates, from the transmitted image signals, a signal PRINT START FO requesting the start of the printer unit 600, a vertical synchronization signal VSYNC FO, a signal VIDEO ENABLE FO indicating the effective output period of the image signals of a line, a signal SCAN ENABLE indicating the effective output period of the image signals of an original, image signals VIDEO FO transmitted to the present system, and clock signals CLK FO and supplies said signals to the exchange 40. In case the received image signals are to be transmitted to another system in the optical fiber network 700 or are not addressed to the present system, the CPU circuit block 10 discriminates such fact by decoding the command signal and supplies a transmission request signal TRSMTR through a signal line 70-110 to AND gates 70-30, 70-31, which thus transmit respectively the video signals and clock signals CLK to another system through OR gates 70-35, 70-36, electrooptical converters 70-40, 70-41 and optical fiber cables 703, 704.

In case of-a transmission from the present system to another system on the optical fiber network 700, the CPU circuit block 10 at first deactivates the signal TRSMTR to terminate the signal output from the AND gates 70-30, 70-31. Subsequently the signal ADR is supplied through a signal line 136-1 and the address decoder 70-11 to a transmission command register 70-50, a command discrimination signal generator 70-51 and a transmission clock generator 70-52 to designate the address, and an I/O write-in command signal I/O WC is supplied through a signal line 136-3 to the data buffer 70-12 to set the same to the input mode. Through these procedures the transmission command register 70-50 at first stores the command discriminating signal generated by the command discriminating signal generator 70-51, and then the command data supplied from the data buffer 70-12. Upon completion of the storage of the command data, the transmission clock generator 70-52 generates clock pulses of a number required for the serial transmission of the command data from the transmission command register 70-50 to the electro-optical converter, whereby the command data and the clock pulses are supplied, respectively as the video signals and clock signals, to the optical cables 703, 704 through the electrooptical converter 70-40, 70-41.

Then, for the transmission of the image information, the signals PRINT START FI, VSYNC FI, VIDEO FI and CLK FI released from a signal selector F in the exchange 40 are converted by a converting circuit 70-55 into serial video signals and clock signals, which are respectively supplied to the optical fiber cables 703, 704 through signal lines 70-111, 70-112, OR gates 70-35, 70-36 and electro-optical converters 70-40, 70-41.

Now there will be explained the reader operation unit 550 shown in FIG. 14, in which provided are an application file number indicator 551 for displaying the registration numbers of application files for editing work registered in the disk memory; a print number indicator 552 for indicating the number of prints which are to be made by the printer unit 600 (in case of local copying) or by another system on the optical fiber network 700 to which the image signals are to be transmitted; a paper size selecting key 553 which selects the A3 or A4 size whereupon indicator lamps indicate the selected size; numeral keys 554 for setting the number of copies or prints; a clear key 555 for erasing the set number and the file number; a stop key 556 for interrupting the printing operation; and indicator lamps 557, 558 respectively indicating that the image information is under transmission or under reception.

There are further provided selector keys 561 for selecting external systems to be connected through the DDX line; and selector keys 562 for selecting systems within the optical fiber network 700, including a selector key 563 for selecting the printer unit 600 of the present system. Each key is provided thereunder with two indicator lamps, the one at left being lighted when a destination of transmission or reception is selected by the actuation of a corresponding key, and the one at right being lighted in case of an error in the communication.

A COPY key 565 is actuated in case of local copying or in case of transmission, both being hereinafter called copy mode. An EDIT key 566 is actuated in case of image editing with the reader unit 500, which is hereinafter called the edit R mode. The above-mentioned keys are provided thereon with indicator lamps to be lighted to indicate the actuated key. An ENTER key 567 is actuated at the setting of the print number in the local copy mode or in the communication within the network. An EXECUTE key 568 is actuated at the start of execution of the copy mode or the edit R mode.

Figure 15:
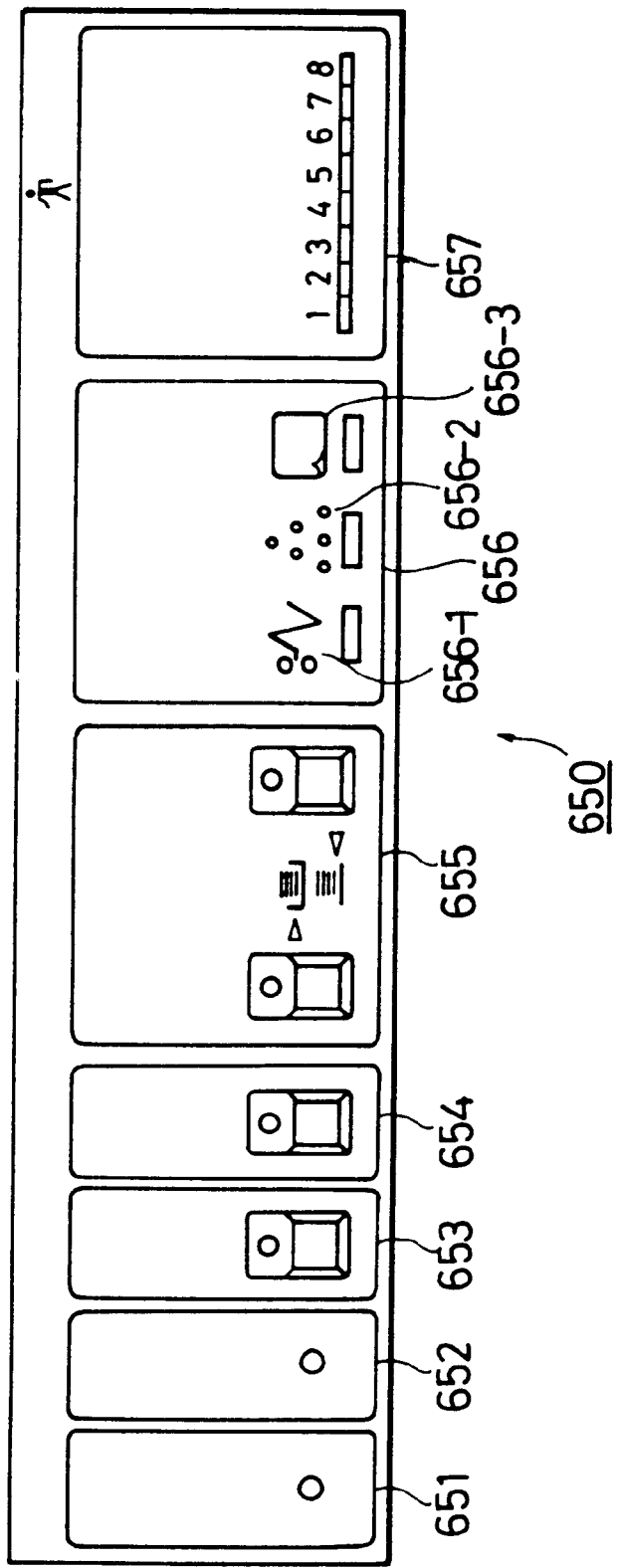

In the following explained is the printer status display unit 650 shown in FIG. 15, in which provided are a power supply indicator lamp 651 to be lighted when the power is supplied to the printer unit 600; and a ready lamp 652 to be lighted when the printer unit 600 is ready to receive the image signals from the image processing control unit 100.

An on-line selector key 653 is actuated when an on-line connection is to be made between the printer unit 600 and the image processing unit 100, whereby an indicator lamp provided thereon is lighted. A test print key 654 is actuated for checking the function of the printer unit 600, whereby said printer unit 600 prints a test pattern independently from the image processing control unit 100.

A unit 655 is used for displaying and selecting the original size but the original size selecting function is disabled in the above-described on-line state. Error indicators 656-1, 656-2, 656-3 respectively for indicating sheet jamming, absence of toner and absence of copying sheet indicate errors in the printer unit 600 that can be removed by the operator. An error indicator indicates for example eight different errors of the printer unit 600 that cannot be eliminated by the operator.

Now there will be given an explanation on the procedure of image editing. The image editing is conducted by suitable DMA transmissions between the buffer memory 22 and the disk memory 90. More specifically the image signals read in the reader unit 500 from an A4-sized original are stored at a determined address of the buffer memory 20, and a part of said image signals is stored through the DMA controller 80 in the disk memory 90. Then the signals in the buffer memory 22 are erased, and the image signals previously stored in the disk memory 90 are returned to a desired address space of the buffer memory 90 and are printed by the printer unit 600. In this manner there is obtained a print in which the unnecessary portion of the original is trimmed off and the image is moved to a desired position.

Such image editings as the positional change or trimming of image are conducted according to an image processing program prepared from commands to be explained later and to be entered from the command menu section shown in FIG. 3-2. Such image processing program can be stored in the disk memory 90, and such stored image processing program shall be defined as an application file. Also the image information stored in the disk memory 90 shall be defined as an image file. At the registration of these files in the disk memory 90, a 2-digit file number is given as the title of the file, and indicated also is whether said file should be erasable or not.

Figure 16:
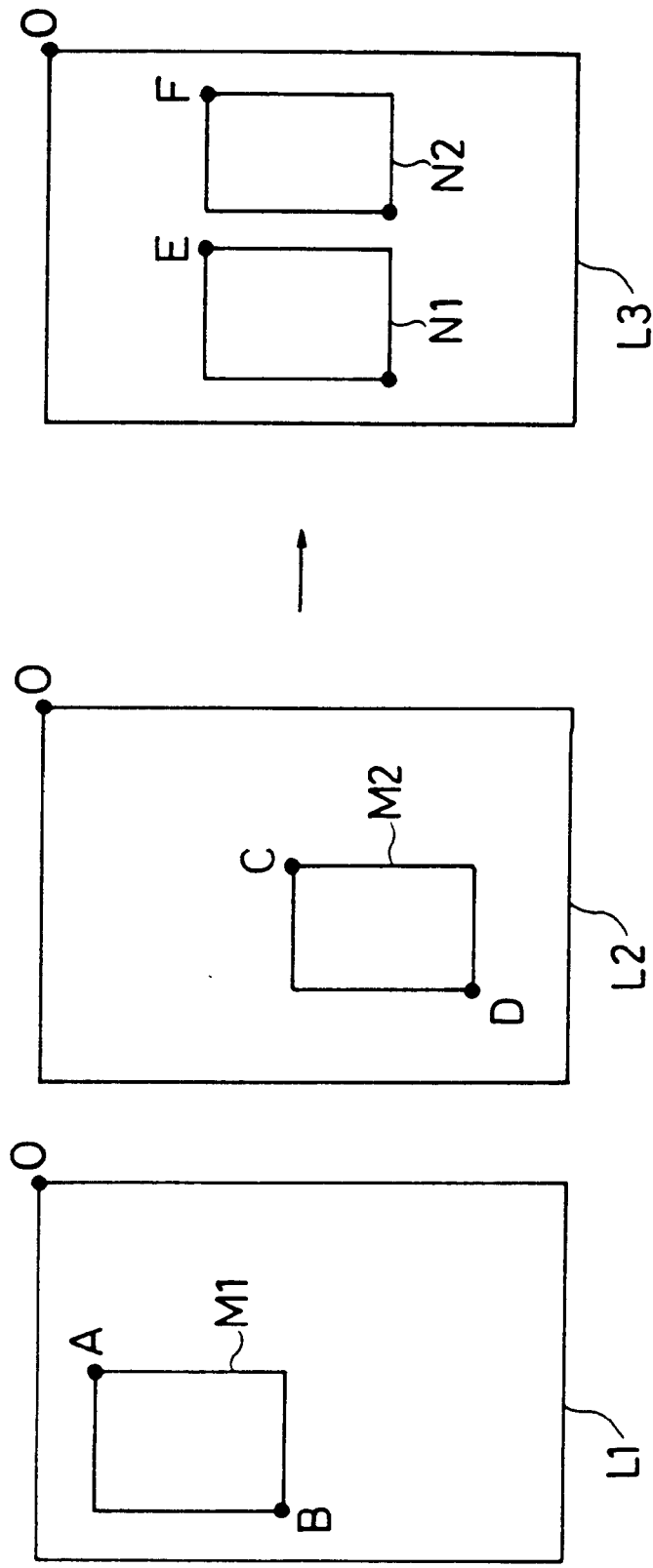
FIGS. 16A, 16B and 16C are schematic views showing an example of a simple image processing.
Figure 19:
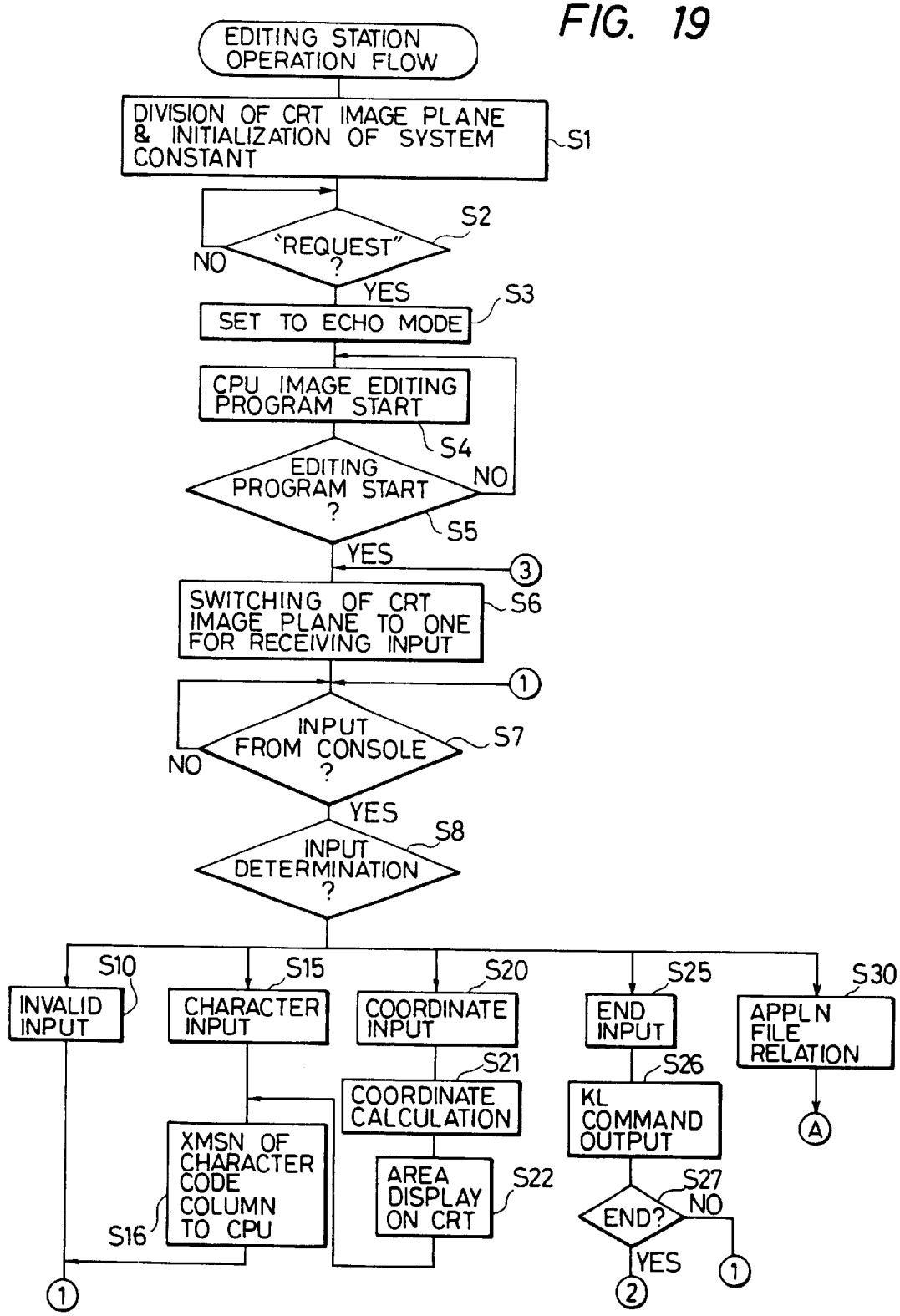
FIGS. 19, 20 and 21 are flow charts showing an example of image processing procedure.

FIGS. 16A, 16B and 16C show a simple example of image editing. At first a first original L1 shown in FIG. 16A is read by the reader unit 500 and stored in the buffer memory 22. On the original supporting area 240, the points A and B are designated with the stilus pen 280 to extract the image information within a frame M1 from the stored image information, and such extracted image information M1 is stored in the disk memory 90 with a file number, for example "01". A second original L2 is similarly processed, and the image information M2 extracted by designating points C and D as shown in FIG. 16B is stored in the disk memory 90 with a file number "02". Then the signals in the buffer memory 22 are entirely erased, and points E and F are designated as shown in FIG. 16C to move the image information of the areas M1 and M2 stored as image files "01" and "02" to address spaces corresponding to areas N1 and N2 in the buffer memory 22. Thus the buffer memory 22 stores the image information N1 and N2 positioned as shown in FIG. 16C, as image information of an A4-sized original.

The data in the buffer memory 22 are transferred to the printer unit 600 to obtain a desired edited image L3.

Figures 17, 18:
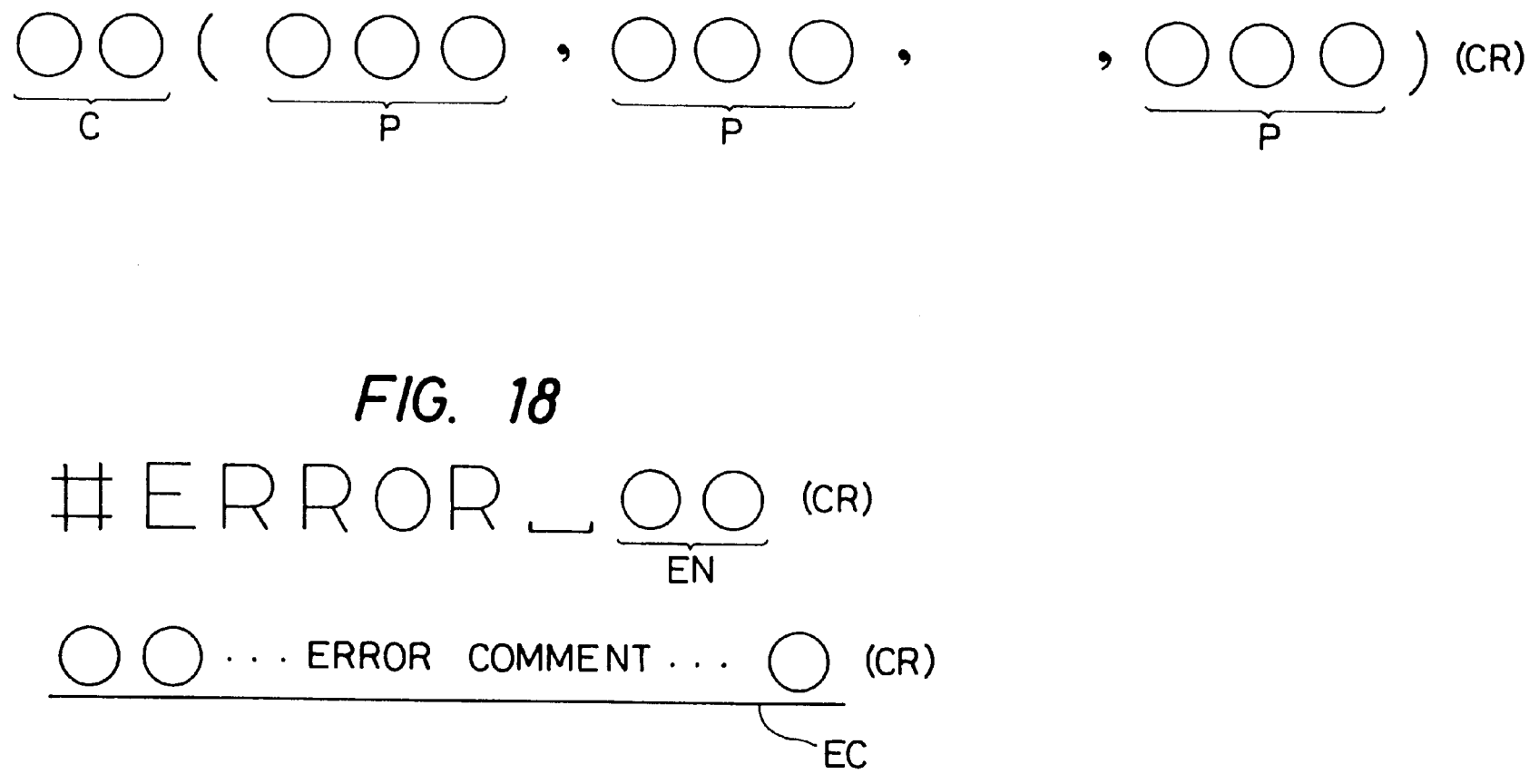

In the following there will be given an explanation on the editing commands utilized in the image editing. The editing commands are entered by selecting the command menu section 220 of the console 200 with the stilus pen 280 as shown in FIG. 17, and the CPU circuit block 10 executes the image editing according to thus entered commands. In FIG. 17, C is a command in the command keys 222 shown in FIG. 3-2 and can be entered by the actuation of a corresponding command key 222 or alphabet keys 223, in order to execute a corresponding image editing. P indicates a parameter for example designating coordinates. The entry of a parameter P is preceded by a command and an opening parenthesis and followed by a closing parenthesis. Several parameters, separated mutually by ",", may be entered if necessary in relation to the corresponding parameter. In FIG. 17, (CR) indicates a carriage return to be achieved by the actuation of the key 225 shown in FIG. 3-2 after the entry of an editing command. In the following listed are editing commands to be executed by the image processing unit 10 and the corresponding meanings. Symbol (CR) immediately following each command indicates that the carriage return key 225 should be actuated at the entry of the command:

(1) DZ (dither code A, dither code B, X0, Y0, X1, Y1) (CR):

This command indicates, to the dither controller 54 at the binary digitizing of the original image read in the reader unit 500, which dither pattern should be used in processing the entire original image and in processing the area designated by X0, Y0, X1 and Y1. The dither code A or B is selected for example from six dither patterns 00, 01, 02, 03, 04 and 05, including dither matrixes with a same threshold value. The codes 00 to 04 are used for adjusting the image density by selecting dither patterns of five different threshold values. The code 05 selects so-called dither processing capable of representing an intermediate tone for example in reading a photograph. There may be designated plural areas:

(2) RE (CR):

This command starts the reader unit 500 and stores the image information of an A4-sized original read by CCD's 570, 580 and 590. No parameters are attached to this command:

(3) CR (file number, file type, X0, Y0, X1, Y1)(CR):

This command secures a space for storing the image file on the disk memory 90, and registers the file data in the file index table (cf. FIG. 10-4). As parameters there are entered a 2-digit file number arbitrarily selected by the operator, a file type "00", address positions X0 (mm) and Y0 (mm) on the buffer memory 20, and image dimensions X1 (mm) and Y1 (mm):

(4) ST (file number, file type) (CR):

This command stores the image information of the buffer memory 22 in the disk memory 90, and is executed according to the file data registered in the index table of the disk memory 90 by the command CR:

(5) LO (file number, file type) (CR)

This command changes the image position, stored in the index table FIT2, of the image file of the entered file number. In response to this command, the CPU circuit block 10 searches the corresponding file data from the index table of the disk memory 90 through an open processing, and displays the coordinate data of said file on the cathode ray tube 300. The file type is "00" since this is an image file operating command:

(6) ADR (X0, Y0) (CR):

This command enters the changed position X0, Y0 of the image file designated by the foregoing command LO, and should be entered immediately following said command LO:

(7) CL (CR)

This command erases the image information stored in the buffer memory 20:

(8) LD (file number, file type "00") (CR)

This command stores an image file in the disk memory into the buffer memory 22 according to the position data X0, Y0 shown in the file index table in the disk memory 90 corresponding to said file:

(9) DE (file number, file type) (CR):

This command erases a file of the number and type, entered by this command, from the disk memory 90:

(10) PR (print number) (CR):

This command transfers the image information stored in the buffer memory 22 to the printer unit 600 and causes to print it by the entered number:

(11) XR (file number, file type "02") (CR):

This command is used when the editing station control unit 450 reads an application file from the disk memory 90. In response to this command, the image processing unit 10 searches a corresponding application file from the disk memory 90 and transfers it to the editing station control unit 450:

(12) ED (file number, file type "02") (CR):

This command is used when the operator registers an image editing program, prepared through the console 200 and composed of a group of commands stored in the RAM 456 of the editing station control unit 450, as an application file into the disk memory 90. In response to this command, the image processing unit 10 searches the index table of the disk memory 90, and, after confirming that an application file of a same file number has not been registered in the disk memory 90, releases an instruction signal to the editing station control unit 450 for transferring said group of commands:

(13) DIR (CR):

This command transfers the file number, file type and coordinate data of the application file or image file registered in the index table of the disk memory 90 to a CRT/console controller 470, and displays said data on the cathode ray tube 300:

(14) KL (CR):

In response to this command, the image processing unit 10 releases the editing station control unit 450 from the control.

In the foregoing commands, the file number, area (X0, Y0, X1, Y1), position (X0, Y0) and print number may either be entered directly by numerals, or be entered as variables. In the preparation of the application file to be explained later, the file number, area, position and print number may be entered for example as N, F, P and S respectively.

In the following there are explained error messages. In case the image processing unit 100 identifies an error in the course of the execution of the foregoing commands, said unit 10 sends an error code and an error comment to the editing station control unit 450 to cause a display, including, as shown in FIG. 18, an error code EN in hexadecimal number and an error comment EC, on the cathode ray tube 300.

In the following listed are error codes, error comments and meanings thereof:

(1) Error code 01: FILE NOT FOUND:

This code indicates that a file designated by the operator is not found in the disk memory 90:

(2) Error code 02: COORDINATE ERROR:

This code indicates an error in the coordinate data X0, Y0, X1 and Y1 entered by the operator. This error code is related with the command CR or ADR, and may occur, for example, if the entered coordinate data include a negative number or other characters than the numerals 0–9 and the variables F and P, or if the image size exceeds the A4 size editable in the present embodiment, as represented by the following relations (2):

$$X0+X1>297 \text{ mm or } Y0+Y1>210 \text{ mm} \qquad (2):$$

(3) Error code 06: INDEX BLOCK OVER:

This code indicates that the total number of the files registered in the disk memory 90 exceeds a predetermined value, i.e. 50 in the present embodiment. At the registration of a new file by the command CR or ED, this error code indicates that a new registration cannot be accepted since the number of files already stored in the disk memory 90 is equal to 50:

(4) Error code 07: NO VACANT SECTOR:

This code indicates the absence of vacant sectors necessary for registering a new file, in reference to the sector bit map table indicating, as shown in FIG. 10-3, the status of use of the disk memory 90. Thus this error code indicates that the disk memory 90 is fully occupied and is not available for the new file registration by the command CR or ED.

(5) Error code 08: FILE ALREADY REGISTERED:

This code indicates, at the registration of a new file with a file number, that another file with a same file number is already registered in the disk memory 90:

(6) Error code 0A: FILE TYPE ERROR:

This code indicates the use of an erroneous file type for a file to be registered. For example, this code is generated if a file type "02" indicating an application file is used in relation to the entry of a command CR for the image file!

(7) Error code 0B: VACANT FILE INDEX:

This code indicates the absence of any file in the disk memory 90 after the search of the index table by the command DIR:

(8) Error code 0C: PRINTER ERROR:

This code indicates a mechanical error, such as sheet jamming, in the printer unit 600, when it is started by the command PR:

(9) Error code 0D: ILLEGAL COPY VOLUME:

This code indicates that the print number instructed by the command PR exceeds the continuously printable number, for example 99 prints, of the printer unit 600:

(10) Error code 0E : READER ERROR:

This code indicates that the reader unit 500 is not under the control of the image processing unit 10, for example by the absence of power supply in the reader unit 500 or by the absence of connection of the signal line 501:

(11) Error code 0F: PRINTER NOT READY:

This code indicates that an unrepresented fixing device in the printer unit 600 does not reach a determined value:

(12) Error code 10: PRINTER NOT ON LINE:

This code indicates that the printer unit 600 is not under the control of the image processing unit 10, in the same manner as indicated by the error code 0E.

Now reference is made to FIGS. 19, 20, 21 and 22-1 to 22-6 for explaining the image editing procedure through the editing station 400.

Figures 1, 22:
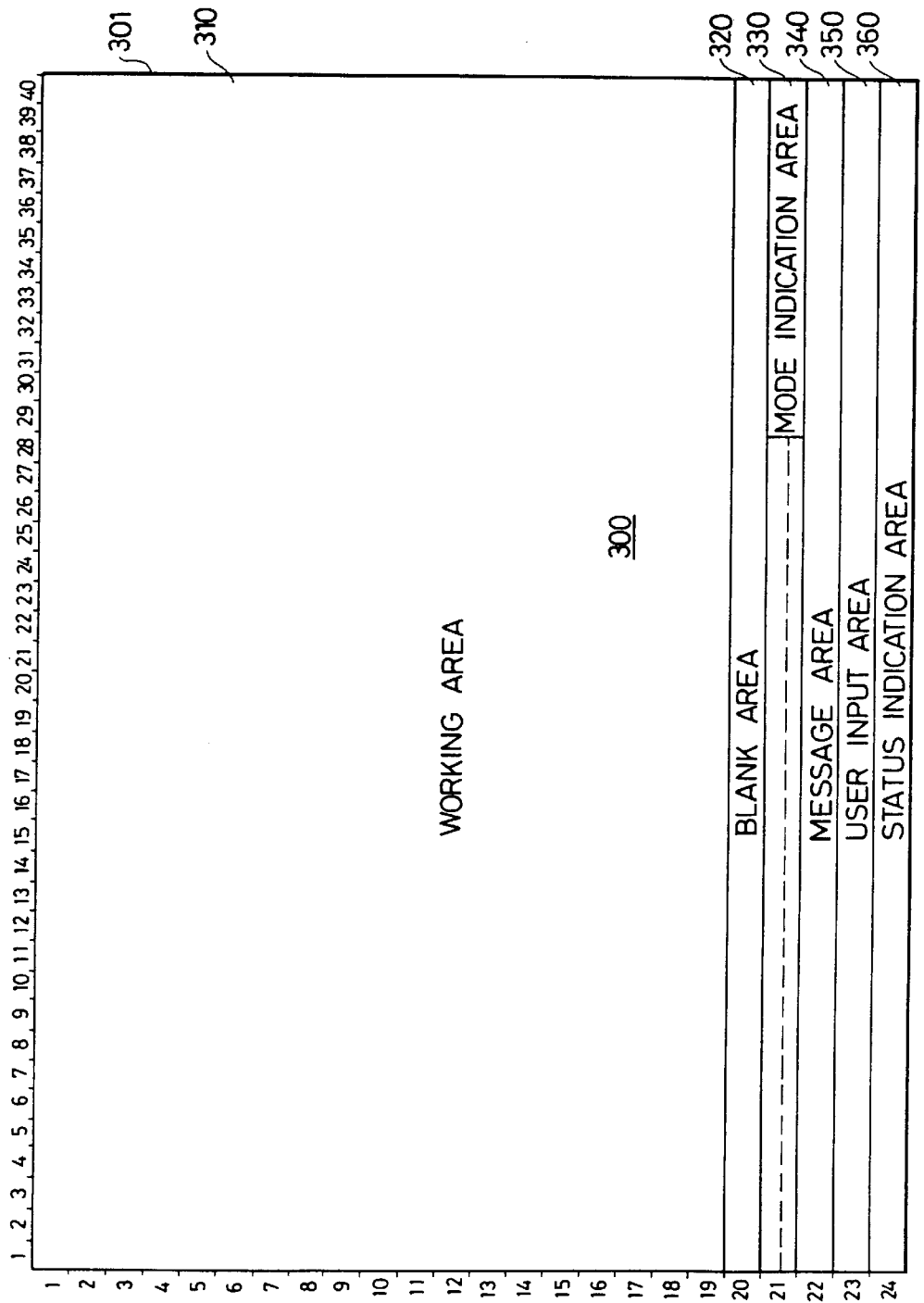
Figures 2, 22:
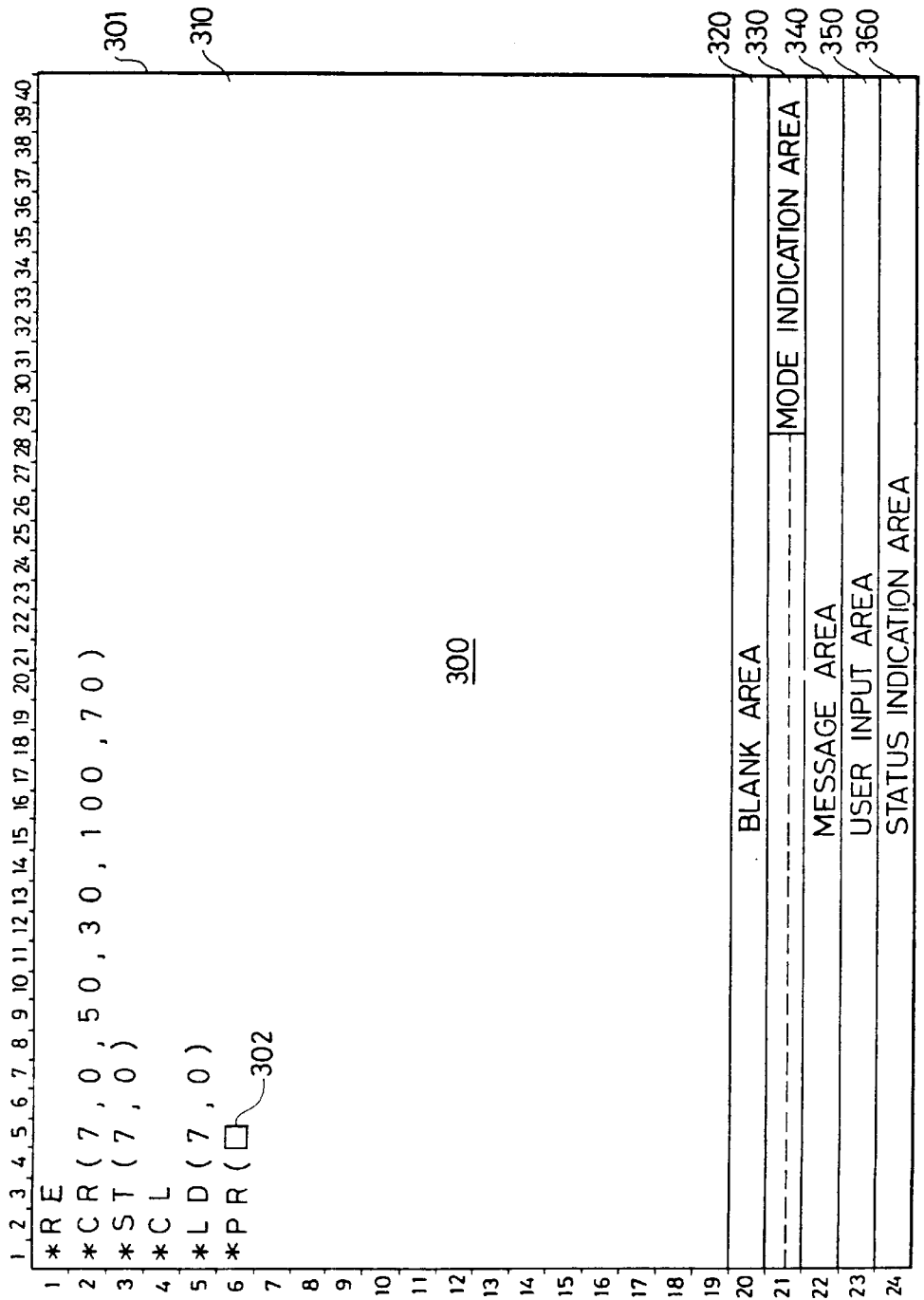
Figures 3, 22:
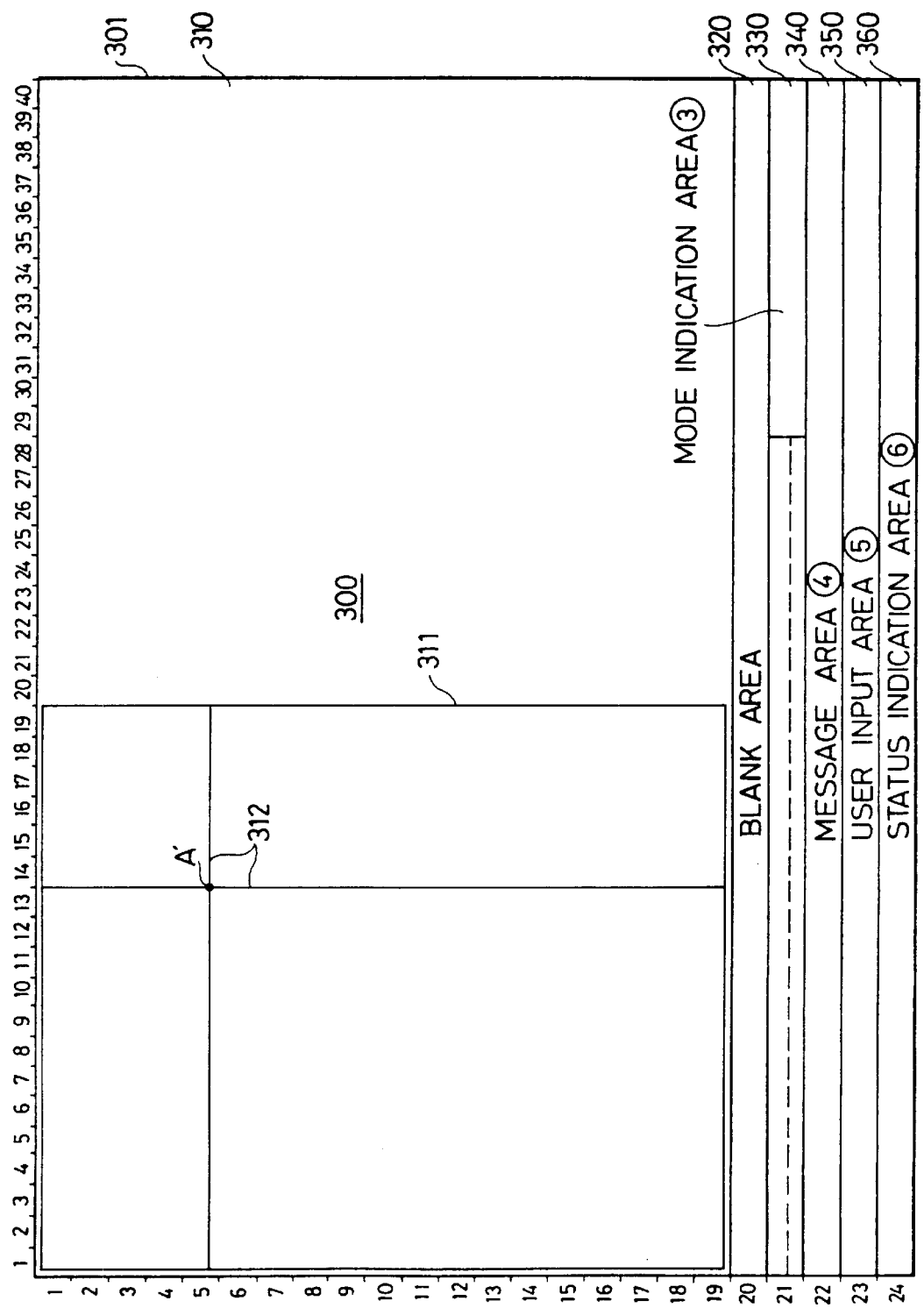
Figures 4, 22:
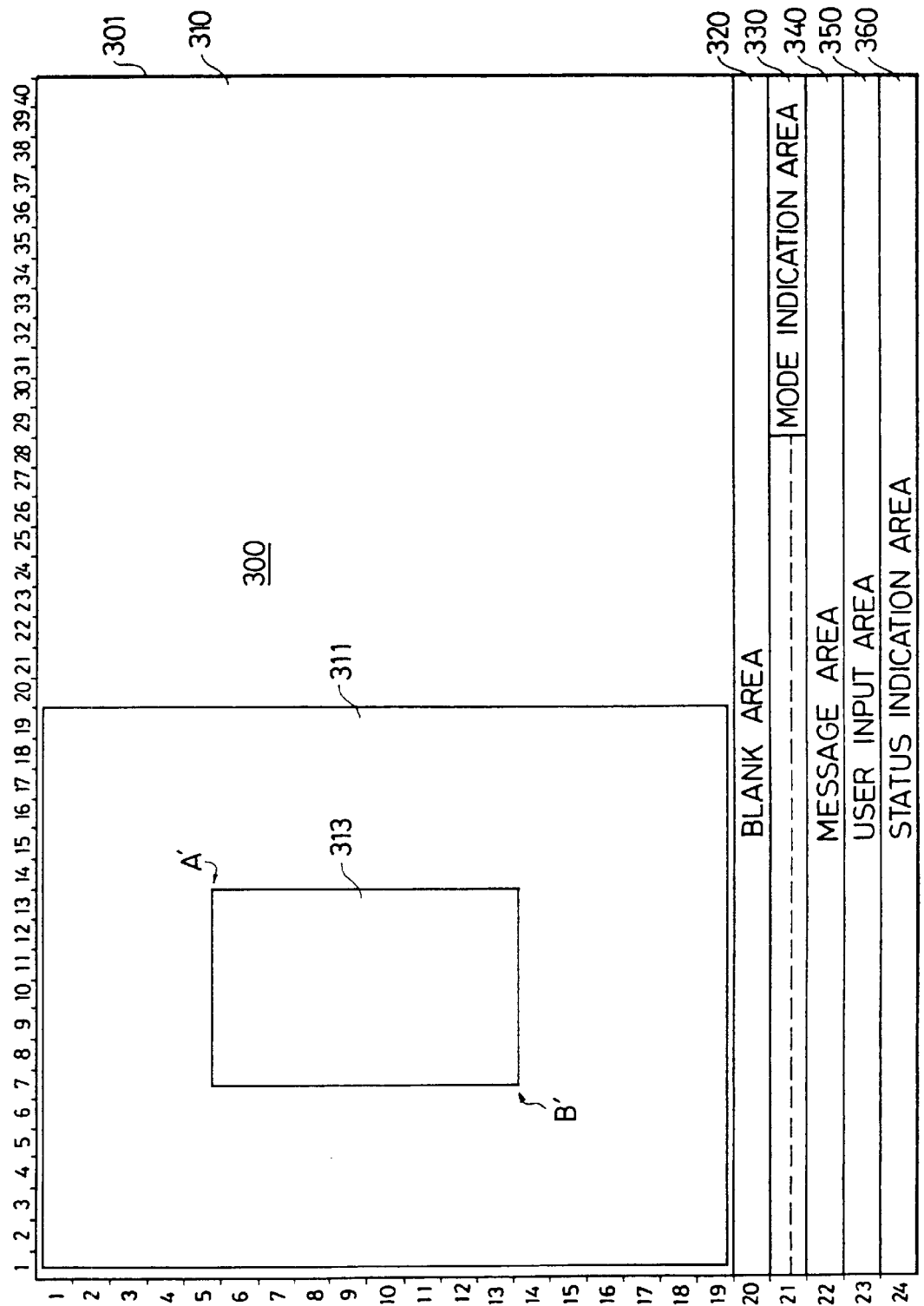
Figures 6, 22:
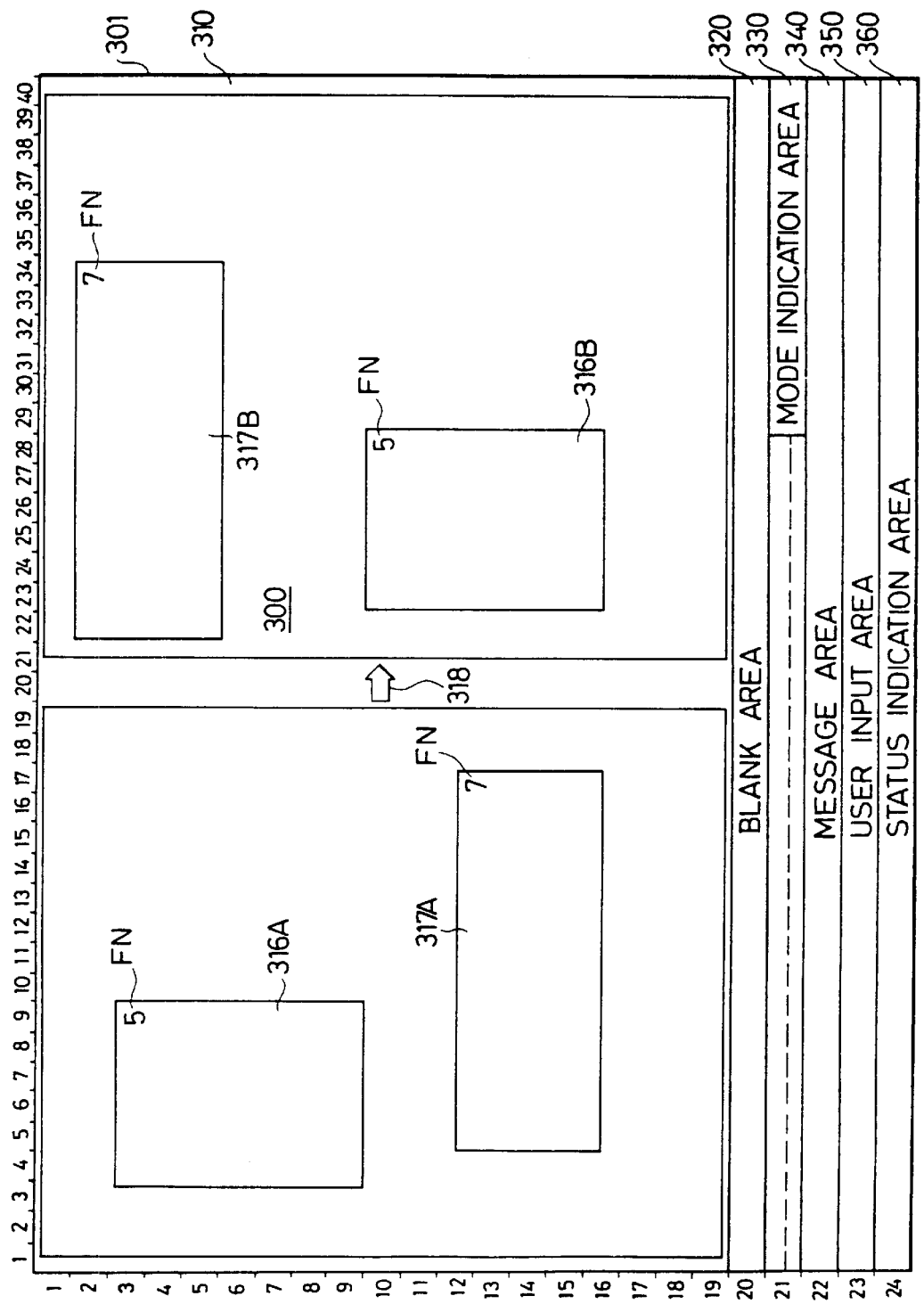

At the activation of the editing station 400, a step S1 executes the initialization of the divided display on the cathode ray tube 300 and of the system constants. The cathode ray tube 300 has a display frame with a capacity of 24 horizontal rows containing 40 characters each. FIG. 22-1 shows an example of divided display on the display frame 301, including a working area 310 from 1st to 19th row for displaying characters etc. transmitted from the image processing unit 10 to the editing station 400; a blank area 320 in a 20th row without any display for making a clear boundary between said working area 310 and other lower areas to be explained in the following; a mode indicating area 330 in a 21st row for displaying the working mode, to be explained later, of the editing station 400 employed by the operator; a message area 340 in a 22nd row for indicating a command or a parameter to be entered by the operator or indicating an error code; a user input area 350 in a 23rd row for indicating, for monitoring by the operator, the characters such as file number entered by the operator; and a status indicating area 360 in a 24th row for indicating the status of the image processing unit 10.

Also the display mode is initialized in such a manner that an entered command is displayed in the working area 310 when it is sent back from the image processing unit 10, that a new command sent back from the image processing unit 10 following a carriage return code is displayed from the left-hand end of a new row, and that the display in the working area 310 is scrolled up, if the 1st to 19th rows are filled with commands, to accommodate a newly entered command always in the working area 310.

If the editing station 400 is not on-line connected with the image processing control unit 100, the frame 301 shown in FIG. 22-1 is entirely displayed for example in blue, and the message area 340 displays a message "NOT READY ENTER REQUEST KEY" for awaiting the request for on-line connection from the operator, and a step S2 awaits the actuation of the REQUEST key for this purpose.

The editing station 400 functions, in general, in one of two modes, i.e. the echo mode and the edit mode. In the echo mode, the characters entered by the operator through the console 200 are transferred to the image processing unit 10, and the characters transferred therefrom to the editing station 400 are displayed on the cathode ray tube 300. The edit mode is used for the preparation and modification of the application files and for providing the image processing unit 10 with commands, and, in this mode, the 15 characters entered by the operator are at first temporarily stored in the RAM 456 of the editing station control unit 450, and are transferred to the image processing unit 10 after arbitrary corrections on the cathode ray tube 300. In the edit mode, a period of reception of an application file to be transmitted from the disk memory 90 to the editing station control unit 450 through the image processing unit 10 is particularly defined as a command mode.

Figure 21:
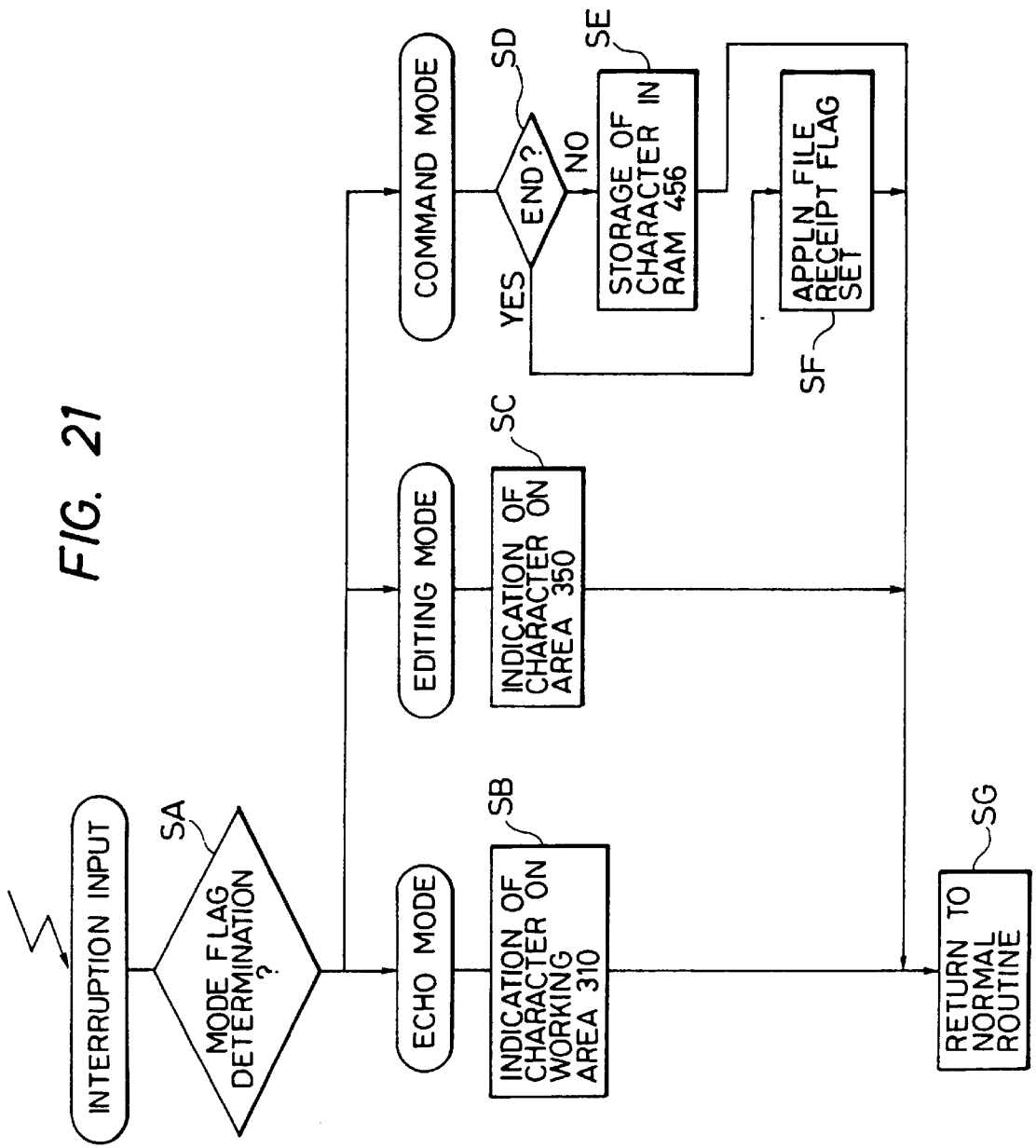

FIG. 21 shows the function of the editing station control unit 450 in response to a key entry in each mode. At first a step SA discriminates the working mode, and, if the echo mode is identified, the program proceeds to a step SB for displaying the characters sent back from the image processing unit 10 in the working area 310. Thereafter the program proceeds to a step SG and returns to the normal routine shown in FIG. 19. On the other hand, if the edit mode is identified, the program proceeds to a step SC for displaying the characters in the user input area 350 since the working area 310 is occupied in this mode by the screen editor. Thereafter the program proceeds to the step SG. If the command mode is identified, the program proceeds to a step SD for identifying whether the reception of the application file has been completed, and, if affirmative, the program proceeds to a step SF for setting a flag indicating the completion of reception of application file, and the program proceeds thereafter to the step SG. In case of a negative identification, the program proceeds to a step SE for storing the transmitted characters in the RAM 456 in succession, and the program proceeds to the step SG.

In response to the actuation of the REQUEST key, the program proceeds to a step S3 for setting the editing station 400 to the echo mode, and a step S4 provides the image processing unit 10 with a signal requesting the start of the image editing program. A subsequent step S5 confirms the start of the image editing program, and the program either returns to the step S4 in case of negative confirmation or proceeds to a step S6 in case of positive confirmation. The step S6 turns the display on the cathode ray tube 300 for example to black over the entire frame, displays a message "ON-LINE" in green characters in the message area 340 to advise the operator of a face that the request for starting the editing program has become effective, and displays a message "ECHO MODE" in the mode indicating area 330, thus indicating the function of the editing station 400 in the echo mode. A subsequent step S7 awaits the entry of a command.

A subsequent step S8 discriminates the input of the command key of the console 200, and program proceeds to a step S10, S15, S20, S25 or S30 according to the result of said discrimination.

In the echo mode which lacks the screen editing function with the cathode ray tube 300, any entry with keys 229 relating to such editing function is disregarded in a step S10, and the program proceeds to a step S7 for awaiting the next entry. Also the actuation of keys for ending the edit mode, namely the editing reset key and the editing end key, is treated in the same manner.

In case of an entry of command characters through the keys 222, the program proceeds through a step S15 to a step S16, whereby the entered command is transferred to the image processing unit 10 and the present system is controlled by said command. As an example, in response to the entry of characters "RE" as shown in FIG. 22-2, the frame displays said characters "RE", and, in response to a subsequent actuation of the carriage return key 225, a reader driving signal is supplied to the reader unit 500 to effect the reading of an original image.

In response to the actuation of the coordinate input request keys 227, namely the "POSITION DESIGNATION" key and the "AREA DESIGNATION" key, the program proceeds to a step S20 to enable designation of an arbitrary point on the original supporting unit 240 with the stilus pen 280. In case of image editing with a designated editing area, in response to the actuation of the "AREA DESIGNATION" key, the message area 340 displays a sentence "ENTER TOP RIGHT POSITION" and the left-hand half of the working area 310 is changed to white, thus requesting the operator to designate the point A (FIG. 10-5) and displaying the editing area 315.

In response to the designation of the point A by the operator, there are displayed, as shown in FIG. 22-3, vertical and horizontal coordinate lines 312, for example in green color, passing through a point A' corresponding to said point A, and the user input area 350 displays the X- and Y-coordinates of the point A, namely the values of X0 and Y0 in millimeters. Subsequently the message area 330 displays "ENTER BOTTOM LEFT POSITION" to request the designation of the point B. In response to the entry of the point B, a step S21 is executed to calculate the vertical and horizontal lengths X1, Y1 of the image to be edited from the coordinates of the points B and A, and a subsequent step S21 displays, as shown in FIG. 22-4, the editing area 313 designated by the points B and A, for example in red color, in the area 311. Simultaneously the message area 330 displays a sentence "OK! AREA IS RECOGNIZED" to indicate the completion of the designation of the editing area, and the user input area 350 displays the values of X0, Y0, X1 and Y1 in millimeters. Then the program proceeds to a step S16 to transfer these figures to the image processing unit 10.

The POSITION DESIGNATE key is selected in case of image editing with a designated position. In this case only one point, namely the point A in the area designation, is designated. In response to the entry of said point, the coordinate lines 312 are displayed for example in red color, and the user input area displays the values of X0 and Y0 in millimeters. When the designated position is recognized in this manner by the editing station 400, the message area 330 displays a message "OK! POSITION IN RECOGNIZED" to indicate effective entry of the coordinates, and the figures of X0 and Y0 are transferred to the image processing unit 10.

Upon completion of the designation of the area or position, the program returns to the step S7 whereby the editing station 400 again awaits the signal entry from the console 200, and, in response to the entry of a new command, the command displayed before the execution of the area of position designation and the designated coordinates are displayed in the working area 310 as shown in FIG. 22-2. In case another command key is actuated by the operator after the actuation of the AREA DESIGNATE or POSITION DESIGNATE key and before the entry of the coordinates, the waiting state for the entry of coordinates is cancelled and a command displayed before the actuation of the AREA DESIGNATE or POSITION DESIGNATE key is displayed again in the working area 310.

In order to release the editing station 400 from the control of the image processing unit 10, thus cancelling the on-line connection, a command KL is entered by the alphabet keys 223. In this case the program proceeds through a step S25 to a step S26 to supply characters "KL" to the image processing unit 10 thus requesting the termination of the image editing program, and the program proceeds further to a step S27. In case of a negative discrimination in said step S27, indicating that the editing station control unit 450 has not completed the editing program of the image processing unit 10, the entry of the terminating entry is disregarded and the program proceeds to the step S7. On the other hand, in case of an affirmative discrimination, the on-line connection is terminated and the program proceeds to the step S1.

In case of the actuation of keys 228 relating to the application files, namely the FIXED FORM WORK key, APPLICATION FILE CALL key, and APPLICATION FILE PREPARATION key, the editing station 400 is set to the edit mode in a step S30 as shown in FIG. 21.

The APPLICATION FILE PREPARATION key is selected in case of making a new application file, while the APPLICATION FILE CALL key is selected in case of calling an application file registered in the disk memory 90 for modification, and the FIXED FORM WORK key is selected in case of calling an application file and transferring the commands thereof in succession to the image processing unit 10 for image editing.

In response to the actuation of any of these keys, a step S31 identifies the entry of the fixed form work, application file calling or application file preparation. In the edit mode, indication of the file number is indispensable in order to handle the application files. Therefore, in any of these cases, a step S32 is executed whereby the editing station control unit 450 changes the frame of the cathode ray tube 300 for example to blue color, and the message area 340 display a sentence "ENTER FILE NO. AND CARRIAGE RETURN" to request the entry of the file number to the operator. Then the mode indicating area 330 displays "EDIT MODE" to indicate that the editing station 400 is in the edit mode, and the display on the cathode ray tube 300 is returned to black color. Subsequently executed are following procedures in respective cases.

In case of the application file preparation, in response to the entry of a file number in a step S32, a step S40 causes the editing station control unit 450 to display "ENTER MENU!" on the message area 340, thus requesting the preparation of an application file to the operator. In this state a cursor 302 is flashed at the left top corner of the working area 310 to await the entry of commands, and the operator prepares an editing program by entering desired commands. In response to the actuation of the carriage return key, a preceding command is transferred to the RAM 456 of the editing station control unit 450 and is simultaneously displayed in the working area 310. As the commands thus entered are stored in the RAM 456, the operator may operate the screen edit keys 229 to achieve screen editing functions, such as the erasure of a line or a character or insertion of a new line or a new character where the cursor 302 is flashing, or the displacement of the cursor 302. If the displayed editing program exceeds the capacity of the working area by the preparation of a new line, the display in the working area 310 is scrolled upwards line by line in the same manner as in the echo mode. Said display is also scrolled upwards or downwards by an upward or downward movement of the cursor 302.

In the preparation of an application file, the entry for designating area is executed in the same manner as in the echo mode, but the entry for designating position is processed in the following manner. As the position designation in this case is related to the coordinates X0 and Y0 for the command ADR to be entered following the command LO, the preceding entry of said command LO is confirmed, and the command CR is searched from the already entered commands to extract the coordinate data X0, Y0, X1, Y1 of a same file number. If such coordinate data cannot be extracted, a process shown in FIG. 22-2 is executed in the same manner as in the echo mode. On the other hand, if said coordinate data are extracted, the right-hand half of the working area 310 is changed for example to white color as shown in FIG. 22-5 in which an area 314A defined by X0, Y0, X1, Y1 is displayed for example in green color, and the left-hand half of said working area 310 is changed to white color in which an area 314B defined by new coordinates X0', Y0' designated by the commands LO and ADR is displayed in red color. At the right top corners of said areas 314A and 314B displayed are the file numbers FN of the image file.

In case the new editing area defined by X0', Y0', X1 and Y1 exceeds the editable area, the entries of X0' and Y0' are invalidated and new effective entries are awaited. The image area displayed in response to the entry of coordinate data is turned off by the entry of a new command, whereupon the commands in preparation are displayed again.

Upon actuation of the TRACE key, the command LO and the command CR having a same file number are searched from the commands of a program under preparation, whereby the left-hand half of the frame of the cathode ray tube 300 is turned for example to white color in which areas 316A and 317A defined by the coordinate data X0, Y0, X1, Y1 are displayed in red color with indications of the file number of the image file at the right top corners. The right-hand half of the frame is changed for example to blue color, in which areas 316B and 317B defined by the modified coordinate data X0', Y0', X1 and Y1 are displayed in green color. Also at the center of the display an arrow 318 directing on right is displayed to indicate the image movement.

Upon completion of the display for image file displacement, the message area 340 display "END OF TRACE MODE" to indicate the end of the tracing operation. In response to the designation of an arbitrary point on the console 200 by the operator, there are again displayed the commands of an application file under preparation.

In this manner the movement of the image information can be visually confirmed by the application file in the tracing operation.

In the preparation of an application file, in addition to the numeral designation of the image file number, editing image area (X0, Y0, X1, Y1), modified position of the image (X0', Y0') and print number, the operator can add flexibility to the image editing by employing these data as variables as explained before. For example, following commands may be employed in an application file for image trimming with variables:

(1) RE (CR):

For reading an original with the reader unit 500 and storing the information in the buffer memory 22:

(2) CR(N, 0, F) (CR):

For securing a space in the disk memory 90 for storing an image file with a file number N and an area F(X0, Y0, X1, Y1):

(3) ST(N, 0) (CR):

For registering the image file defined in (2) in the disk memory 90 under a file number N:

(4) LO(N, 0) (CR):

For changing the position of an image file of a file number N:

(5) ADR(P) (CR):

For changing the position to P(X0', Y0'):

(6) CL (CR):

For erasing the content of the buffer memory 22:

(7) LD(N, 0) (CR):

For storing an image file of a file number N into the buffer memory 22:

(8) DE(N, 0) (CR):

For erasing an image file of a file number N:

(9) PR(S) (CR):

For making prints of a number S from the image information stored in the buffer memory 22.

In this manner the application file can be prepared with the file number N, editing image area F, image position P and print number S.

Upon completion of the preparation of an application file, the operator actuates the editing end key in a step S34, whereby the program proceeds to a step S35 to cause the editing station control unit 450 to display a message "STORE THIS COMMAND FILE" in the message area 340, thus asking whether the application program stored in the RAM 456 is to be registered as a file in the disk memory 90. If the operator negate this question by actuation the "N" key, a step S36 identifies this negation, whereby the editing station control unit 450 terminates the edit mode and erases the display in the frame 301. Thus the program returns to the echo mode in a step S37.

On the other hand, if the operator requests the file registration by actuating the "Y" key, said step S36 identifies this affirmative response and the program proceeds to a step S38 in which the editing station control unit 450 releases a command ED according to a file number previously selected in the step S32 to the image processing unit 10, thus requesting a permission for transferring the application file. If a step S39 identifies that a file of a same file number has not been registered in the disk memory 90, a step #40 causes the image processing unit 10 to permit the file registration to the editing station control unit 450, whereupon the file transfer is executed.

Upon completion of the file registration, the program returns to the echo mode in the step S37. On the other hand, if the image processing unit 10 supplies the editing station control unit 450 with a signal indicating that a file of a same file number has already been registered, the program proceeds from the step S39 to a step S40 for causing a display "FILE ALREADY REGISTERED. DELETE OLD?" in the message area 340, thus asking whether the file of the same file number in the disk memory 90 should be deleted.

In case the operator gives an affirmative response, a step S42 is executed to sent the command DE from the editing station control unit 450 to the image processing unit 10, and the program returns to the step S38. On the other hand, if the operator gives a negative response, a step S43 is executed to cause the editing station control unit 450 to display "ENTER FILE NO. AND CARRIAGE RETURN" in the message area 340, thus requesting the entry of a new file number. In response to the entry of a new file number, the program proceeds to a step S38.

In case the image processing unit 10 provides a response other than the error code "08" in response to the command ED, the editing station control unit 450 identifies a disabled transfer of the application file, erases the display, moves the echo mode and display a corresponding error code on the message area 340.

The procedure in case of application file calling is as follows. In response to the entry of a file number in the step S32, the editing station 400 is set to the command mode, and the editing station control unit 450 supplies the command XR to the image processing unit 10 according to the entered file number. Then a step S46 is executed whereby the image processing unit 10 calls a corresponding application file from the disk memory 90 and transfers the same to the RAM 456. Upon completion of the reception of the application file, the editing station control unit 450 is reset to the edit mode in a step S47, and the program proceeds to a step S33 for the modification of the application file for example by erasure or insertion of lines or characters in a similar procedure as in the preparation of the application file. In case an error code is sent from the image processing unit 10, the editing station control unit 450 erases the display on the cathode ray tube 300, returns to the echo mode and displays an error code, a corresponding error message and a status thereof in the message area 340 and in the status indicating area 360.

The procedure in the fixed form work is as follows. In response to the actuation of the FIXED FORM WORK key and the entry of the file number of a desired application file, the editing station control unit 450 stored the designated file in the RAM 456 (steps S32, S45–S47) in the same manner as in the application file calling operation. Then, in a step S48, the editing station control unit 450 searches the commands stored in the RAM 456 from the top to look for the variables N, F, P and S. If such variables are not found in a step S49, the program proceeds to a step S53 in which the commands of the application file are transferred one by one to the image processing unit 10. On the other hand, if any variable is found, the program proceeds to a step S50. Upon discovery of the variable N in said step S50, the editing station control unit 450 displays a comment in the message area 340 requesting the entry of a file number, and replaces the variable N by a number entered by the operator. Then, upon discovery of the variable F, a display is given in the message area 340 for requesting the designation of area, and the variable F is replaced by the values X0, Y0, X1, Y1 entered by the operator. Then, upon discovery of the variable P, a display is given in the message area 340 for requesting the designation of the image position, and the variable P is replaced by the values X0', Y0' entered by the operator. Besides the process shown in FIG. 22-5 is executed if said values are related to the combination of the commands LO and CR, or the process shown in FIG. 22-5 is executed if said values are related solely to the command LO. Finally, upon discovery of the variable S, a display is given in the message area 340 requesting a desired print number, and the variable S is replaced by the number entered by the operator.

When all the variables in the commands are replaced with numbers by the operator, the program proceeds to a step S51 in which the editing station control unit 450 executes a tracing operation as shown in FIG. 22-6 to display the editing form in the working area 310, and a subsequent step S52 displays "OK?" in the message area 340, thus requesting the confirmation of the operator whether the image editing form is adequate. If the operator negates the question by actuating the "N" key, the editing station control unit 450 erases the display on the cathode ray tube 300 and the program proceeds to the step S37. On the other hand, if the operator gives an affirmative reply by actuating the "Y" key, the program proceeds to a step S53 in which the editing station control unit 450 retains the display and transfers the commands in succession to the image processing unit 10 for execution.

The image processing unit 10 returns the transferred command characters to the editing station control unit 450, which displays said command characters in the status indicating area 360 to inform the status of the present system to the operator. When the image processing unit 10 completes the execution of a series of commands, the program returns to the step S37, thus completing the fixed form work and returning to the echo mode. If an error occurs in the course of execution of commands by the image processing unit 10, the editing station control unit 450 interrupts the transmission of commands, erases the display on the cathode ray tube 300, displays an error code in the message area 340 and moves to the echo mode.

In the above-described procedures in the edit mode, namely in the procedures of command file preparation, command file calling and fixed form work, if the operator selects the editing reset key during the input process in the step S33 or S50, the display on the cathode ray tube 300 is immediately turned off and the program returns to the echo mode in the step S37. Also in response to the entry of an end signal, the command KL is supplied to the image processing unit 10, thus terminating the on-line connection between the image processing unit 10 and the editing station 400, and the program returns to the step S2.

Now there will be explained the editing and transmission through the reader operation unit. In the present system, the reader operation unit 550 shown in FIG. 14 may be employed not only for reading an original image but also for copying, communication within the network or with outside, and image editing with the application files. As explained before, the reader unit 500 functions either in the copy mode or in the edit R mode. The procedure of copying, communication and image editing in either mode, to be selected by the operator, is explained in the following:

(A) Copy mode:
(1) The COPY key 565 is actuated.
(2) The count indicator 552 displays "01" in flashing manner.
(3) Any of the intra-network selecting keys, extra-network selecting keys and LOCAL key is actuated.
(4) A copy number at the destination selected in the step (3) is set by the copy number setting keys, and the set number is displayed on the count indicator 550. However only one copy can be obtained in the communication outside the network, and in this case the indicator 552 displays "01".
(5) The ENTER key is actuated, whereby the destination and the set copy number are entered into the image processing unit 100.
(6) The steps (3), (4) and (5) are repeated in case the transmission is to be simultaneously made to another destination than that selected in the step (3).
(7) The PAPER SELECT key 553 is actuated to select either A3 size or A4 size as the original size. However the original size is limited to A4 in case a destination outside the network is involved.
(8) The EXECUTE key is actuated to initiate the operation of copying and transmission. In case of designating different copy numbers to different destinations in the transmission within the network, the reader unit 500 repeats the original scanning operation by a number equal to the maximum copy number.

(B) Edit R mode:
(1) The EDT key 566 is actuated.
(2) The application file number indicator 551 flashes.
(3) The application file number is entered by the numeral keys 554, whereby the indicator 551 displays the entered file number.
(4) The EXECUTE key 568 is actuated.
(5) The image processing unit 10 transfers an application file of a file number indicated by the reader operation unit 550, from the disk memory 90 to the RAM 10-3 and executes the commands according to said application file, thus achieving image editing.

In case the application file designated by the reader operation unit 550 is not registered in the disk memory 90, the indicator 551 simply repeats flashing. In such case the CLEAR key 555 is actuated, and the registration in the disk memory 90 can be checked by means of the DIR key on the console 200.

As explained in the foregoing, the image processing apparatus of the present invention can provide the following advantages:

(1) The image processing apparatus, being composed of a reader unit for reading an original image, an image processing unit for controlling the image processing and storing the processed image, an editing station for editing image information, an optical fiber interface for conducting mutual communication of image information between said apparatus and another system on the optical fiber network, a DDX interface for conducting mutual communication of image information between said apparatus and another system on the DDX network, and a printer unit for copying the image information, is capable of image information reading, image information processing such as image editing, short distance communication of image information through optical fiber network, long distance communication of image information through DDX lines and copying of image information in easy, rapid and inexpensive manner.

(2) The image processing control unit is equipped with the buffer memory for temporary storage of the image information, and equipped also with the exchange for switching the flow of image information within the present apparatus and image information transmitted from other system through optical fiber cable, thereby enabling the transmission of image information to either one or more of the buffer memory, optical fiber interface and printer unit. It is therefore rendered possible to effect the image information reading, short distance communication and copying in parallel manner, thereby reducing the time required for image processing.

(3) As the image information transmitted from another system on the DDX network through said network and the DDX interface is stored in the buffer memory, the same advantages as enumerated in the foregoing item (2) in the processing of such image information stored in the buffer memory.

(4) At the communication of image information between the present apparatus and another system through the DDX network, a signal RDS indicating the readiness for transmitting the image information of an original of a determined size within a determined time and a signal RDR indicating the readiness for receiving such image information are mutually exchanged, and the direction of transmission of image information is determined, in each apparatus, from the combinations of said signals RDS and RDR. It is therefore rendered possible to prevent errors in the direction of transmission and to reduce the time of transmission of image information through the DDX line.

(5) The DDX interface converts the image information of a line in the longitudinal direction of the original image into run length codes, and achieves data compression by two-dimensional encoding of said image information in the form of run length codes. Said data compression is achieved, in case the run length of image information of a line exceeds 2623, by employing a make-up code corresponding to a run length 2560 followed by a make-up code corresponding to a necessary run length and a terminating code. In this manner the transmitting time in the communication through the DDX line can be reduced since the total number of lines of the original image to be transmitted can be decreased and since the data compression can be efficiently achieved.

(6) At the communication of image information between the present apparatus and another system through the DDX network, the image processing control unit supplies the DDX interface with a signal CRQP requesting the connection to another system, a signal CNQ requesting to fetch the DDX line, a signal NRYP indicating that the image processing control unit cannot become ready for transmitting or receiving the image information within a determined time, signals RDS and RDR indicating that it can become ready for respectively transmitting or receiving the image information within a determined time, a signal RQS indicating the duration of effective time for supplying the image information of a line to the DDX interface, and image information SDT. Also the DDX interface supplies the image processing control unit with a signal CIP indicating the signal reception from another system, a signal NRYD indicating the disabled connection of the DDX line, a signal CND indicating the completion of connection of the DDX line enabling the communication, a signal MDS indicating that the DDX interface has reached a mode for transmitting the image information to another system, a signal MDR indicating that it has reached a mode for receiving the image information from another system, a signal RQS for requesting the transmission of image information of a line, a signal RVA for requesting the reception of image information of a line received from another system and demodulated by the DDX interface, and the image information received from another system and demodulated. These signals ensure the communication of the image information between the present apparatus and another system.

(7) In the communication of the image information through the DDX line, when a calling station and a called station are determined between the present apparatus and another system, both stations mutually inform the transmitting conditions. When the transmitting conditions of both systems are established, both stations release signals indicating the completion of preparation for transmission, and the calling station starts the transmission of image information line by line, while the called station inspects errors in the transmission for each transmitted line. Upon discovery of an error in transmission, the called station requests the repeated transmission of the image information after the line of error to the calling station. In response to such request, the calling station converts the line of said error into one-dimentional codes, and converts the subsequent lines into two-dimensional codes for achieving data compression, and re-starts the transmission of image information. In this manner the transmission of image information can be achieved in secure manner, and eventual errors in the transmission can be rapidly eliminated.

(8) The optical fiber interface converts the optical signals serially transmitted from another system on the optical fiber network into electric signals, and regenerates the commands relating to the image recording and the image information from said signals for supply to the image processing control unit. Besides it converts the commands relating to the image recording in another system and the image information supplied from the image processing control unit into optical signals for supply to the optical fiber network. Consequently the image processing can be achieved at a high speed since the image information recording can be realized without any operation in the station conducting the image recording.

(9) The image processing unit (CPU circuit block) supplies the printer unit with a status request, in response to which the printer unit informs the image processing unit of the status of said printer unit. According to said status the image processing unit releases the commands for preparation for the recording, and in response thereto the printer unit effects the recording of the image information. Consequently the image recording can be controlled from the unit generating the image processing information while inspecting the status of the printer unit. In this manner the image recording can be effectively conducted.

(10) The image processing control unit is equipped with the disk memory for storing image files, application files and control programs for the image processing control unit. In this manner the storage and editing of many image information can be easily achieved.

(11) The image processing control unit supplies the reader unit with the command for starting the scanning operation, in response to which the reader unit performs the scanning of an original image and supplies the image information to the image processing control unit. It is therefore rendered possible to control the original image reading from the station generating the image processing information, thereby achieving efficient image reading.

(12) The reader unit is equipped with the reader operation unit for activating therefrom the application files stored in the disk memory, so that the fixed form image editing can be easily realized in the reader unit.

(13) The reader operation unit can send the image information to plural designated systems on the optical fiber network and on the DDX lines, with additional possibility of designating the number of prints for each destination on the optical fiber network. Therefore the transmission of the image information can be achieved easily and rapidly.

(14) The editing station is equipped with the command menu section for entering commands for image editing by the operator and the digitizer for entering the coordinates of the image to be edited, thereby facilitating the entry of information required for image editing.

(15) The editing station is provided with display means such as a cathode ray tube for displaying information for image editing and messages generated from the image processing control unit. Consequently the operator can continue work through dialogues with the editing station, can easily achieve image editing and other works such as the preparation of the application files for image editing, and can rapidly cope with eventual errors in the entered information, thus achieving efficient image editing.

(16) The command menu section of the editing station is equipped with the command for starting the reader unit, said reader unit being activated to read the original image by the entry of said command. It is thus rendered possible to cause the reader unit to effect the reading operation, if required during an image editing operation, by means of the manipulation of the command menu section alone, thus simplifying the image editing operation.

(17) The command menu section is provided with the commands for selecting dither patterns, whereby such selection can be achieved by the operation of said command menu section alone, thus achieving the same effects as explained in the item (16).

(18) The command menu section is provided with the commands for designating, at the original image reading, the area for image density processing and the area for dither processing, thus significantly improving and facilitating the image processing work.

(19) The command menu section is provided with the command for starting the printer unit, whereby the image recording operation of the printer unit can be started by the entry of said command. It is therefore made possible to achieve the effects explained in the item (16) in case a recording operation is required in the printer unit in the course of an image editing work.

(20) The command menu section is provided with the command for entering the file number as the title of the image file, the command for registering the image file with said title in the disk memory, and the command for temporarily storing thus registered image file in the buffer memory, thus achieving the image editing in easy, secure and rapid manner.

(21) The area on the digitizer is made to correspond to the addresses of the buffer memory, thus enabling to achieve the image editing easily and without error.

(22) In the image editing, preparation of editing programs etc., the cathode ray tube display indicates what should be done next by the operator. Thus even an operator inexperienced in the image editing can understand the operation procedure and can easily and rapidly achieve the image editing.

(23) In case the image editing area designated by the editing station exceeds the editable area of the apparatus, an alarm is shown on the cathode ray tube, thus enabling secure image editing.

(24) At the image editing etc., each designated editing area is given an identification number, and the cathode ray tube displays said area as a frame with said identification number. Thus the operator can visually confirm the editing area and can therefore achieve the image editing or other works easily and secure manner.

(25) The execution of the editing program can be traced on the cathode ray tube display for visual confirmation. Consequently, not only an operator who has prepared said program but also other operators can perform the image editing easily and securely.

(26) At the preparation of the editing program, print number, editing areas etc. can be incorporated as variables. Consequently the system is rendered flexible and the image editing work is easily achieved.

What is claimed is:

1. An image processing system comprising:

reading means for reading an original image and outputting an image signal based on the original image;

printing means for printing an image based on one of the image signal and data from an external device;

control means for controlling said printing means to print the image in accordance with the data from the external device and for controlling said reading means to output the image signal to the external device;

detection means for detecting whether said reading means is in a state of being ready to communicate under the control of said control means with the external device, whether said printing means is in a state of being ready to communicate under the control of said control means with the external device, and whether said printing means is in an operation-ready state or in an error state; and display means for displaying status information indicative of the states of each of said reading means and said printing means detected by said detection means.

2. A system according to claim 1, wherein said control means edits an image based on the image signal outputted from said reading means and outputs the edited image to the external device.

3. A system according to claim 1, wherein said control means edits an image based on the image signal and controls said printing means to print the edited image.

4. A system according to claim 1, wherein said display means displays the status conditions when a command for editing an image based on the image signal is processed.

5. A method of controlling an image processing apparatus, the apparatus including reading means for reading an original image and outputting an image signal based on the original image, printing means for printing an image based on one of the image signal and data from an external device, and control means for controlling the printing means to print the image in accordance with the data from the external device and for controlling the reading means to output the image signal to the external device, said method comprising the steps of:

detecting whether the reading means is in a state of being ready to communicate under the control of the control means with the external device, whether the printing means is in a state of being ready to communicate under the control of the control means with the external device, and whether the printing means is in an operation-ready state or in an error state; and displaying status information indicative of the states of each of the reading means and the printing means detected in said detecting step.

6. A method according to claim 5, further comprising editing, by the control means, an image based on the image signal outputted from the reading means and outputting the edited image to the external device.

7. A method according to claim 5, further comprising editing, by the control means, an image based on the image signal and controlling the printing means to print the edited image.

8. A method according to claim 5, wherein said displaying step includes displaying the status information when a command for editing an image based on the image signal is processed.

* * * * *

UNITED STATES PATENT AND TRADEMARK OFFICE
CERTIFICATE OF CORRECTION

PATENT NO.     : 6,393,164 B2
DATED          : May 21, 2002
INVENTOR(S)    : Katsuichi Shimizu et al.

It is certified that error appears in the above-identified patent and that said Letters Patent is hereby corrected as shown below:

<u>Title page,</u>
Item "[76], Inventors: Katsuichi Shimizu; Tadashi Yoshida; Shinobu Arimoto; Katsuyoshi Maeshima; Nao Nagashima; Asao Watanabe, all of c/o Canon Kabushiki Kaisha, 30-2, 3-chome, Shimomaruko, Ohta-ku, Tokyo (JP)" should read -- [75] Inventors: Katsuichi Shimizu, Kunitachi; Tadashi Yoshida, Tokyo; Nagashima, Yokohama; Asao Watanabe, Higashikureme; all of (JP) --.

Insert: -- [73] Assignee: Canon Kabushiki Kaisha, Tokyo (JP) --.

Item [56], FOREIGN PATENT DOCUMENTS, "5745777" should read -- 57-45777 --.
U.S. PATENT DOCUMENTS, insert -- 4,520,824 5/1984 Schayes et al. --.

Figure 20:
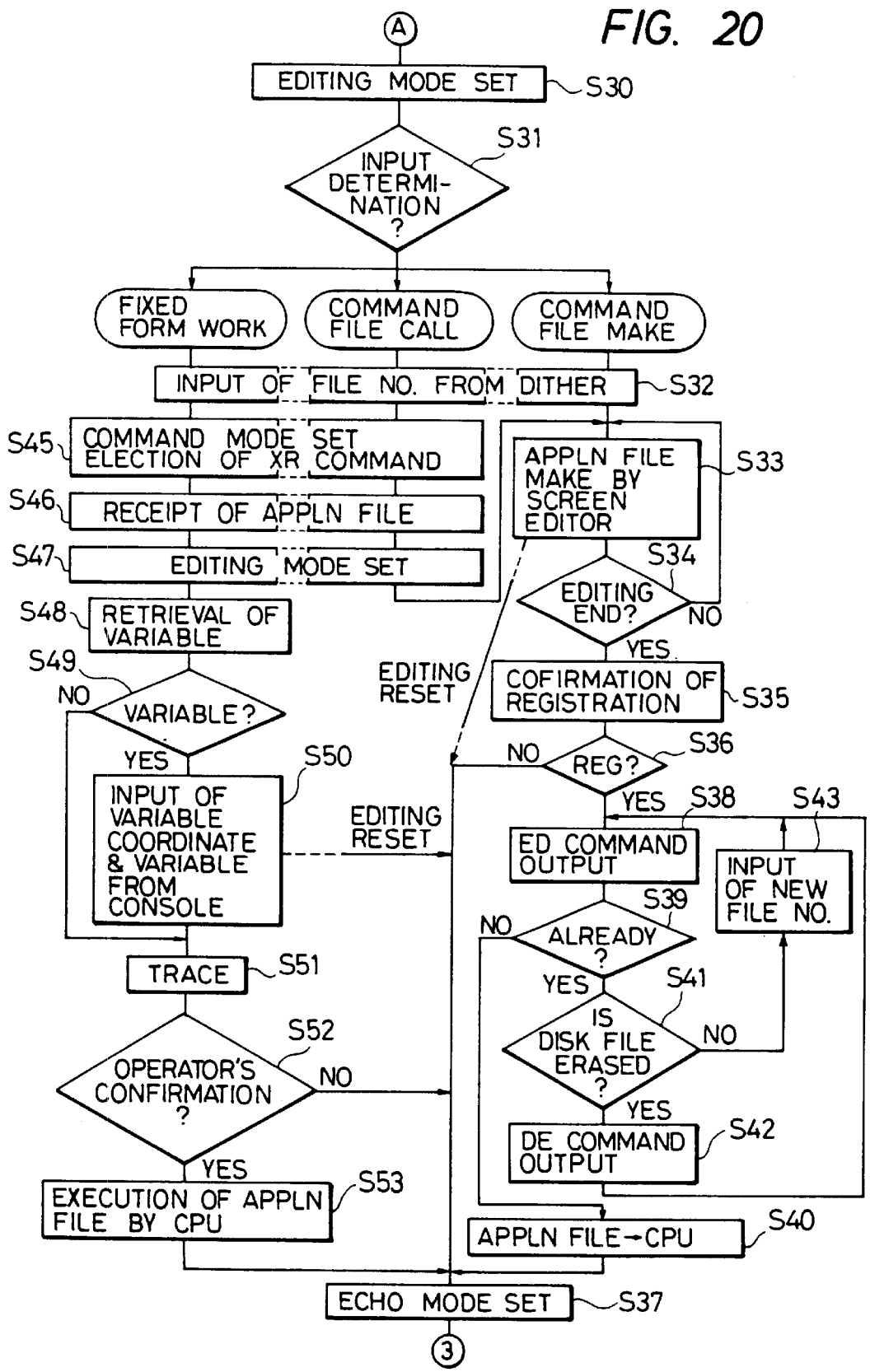

<u>Drawings,</u>
Sheet 30, FIG. 20, "COFIRMATION" should read -- CONFIRMATION --.

<u>Column 1,</u>
Line 41, "leads" should read -- lead --;
Line 48, "lack" should read -- lacks --.

<u>Column 4,</u>
Lines 14, 24 and 66, "stilus" should read -- stylus --;
Line 21, "stiluspen" should read -- stylus pen --;

<u>Column 5,</u>
Line 58, "driging" should read -- driving --.

<u>Column 8,</u>
Line 32, "laternately" should read -- alternatively --.

<u>Column 12,</u>
Line 65, "80-142" should read -- 80-142, --;
Line 67, "three" should read -- three pieces of --.

UNITED STATES PATENT AND TRADEMARK OFFICE
CERTIFICATE OF CORRECTION

PATENT NO.    : 6,393,164 B2
DATED         : May 21, 2002
INVENTOR(S)   : Katsuichi Shimizu et al.

It is certified that error appears in the above-identified patent and that said Letters Patent is hereby corrected as shown below:

<u>Column 13,</u>
Line 53, "megabytes" should read -- megabyte --.

<u>Column 15,</u>
Line 44, "megabytes," should read -- megabyte, --.

<u>Column 16,</u>
Line 41, "prohibition" should read -- prohibiting --.

<u>Column 17,</u>
Line 32, "stilus" should read -- stylus --;
Line 47, "is" should read -- are --.

<u>Column 18,</u>
Line 6, "llo" should be deleted.

<u>Column 19,</u>
Line 39, "60-26" (second occurrence) should read -- 60-27 --;
Line 53, "instailled" should read -- installed --.

<u>Column 21,</u>
Line 17, "of 2623<RL<4752:" should read -- (b) Case of $2623 < RL \leqq 4752$: --;
Line 35, "In" should read -- In the --.

<u>Column 25,</u>
Line 13, "of-a" should read -- of a --.

<u>Column 26,</u>
Line 65, "stilus" should read -- stylus --.

<u>Column 27,</u>
Line 18, "stilus" should read -- stylus --.

<u>Column 28,</u>
Lines 1, 14 and 17, "(CR)" should read -- (CR): --.

UNITED STATES PATENT AND TRADEMARK OFFICE
CERTIFICATE OF CORRECTION

PATENT NO.   : 6,393,164 B2
DATED         : May 21, 2002
INVENTOR(S)  : Katsuichi Shimizu et al.

It is certified that error appears in the above-identified patent and that said Letters Patent is hereby corrected as shown below:

Column 29,
Line 43, "file!" should read -- file: --.

Column 31,
Line 23, "face" should read -- fact --;
Line 53, "stilus" should read -- stylus --.

Signed and Sealed this

Twenty-fifth Day of March, 2003

JAMES E. ROGAN
*Director of the United States Patent and Trademark Office*